(12) United States Patent
Prichard-Fox

(10) Patent No.: US 11,604,905 B1
(45) Date of Patent: Mar. 14, 2023

(54) SMART RENDER DESIGN TOOL AND METHOD

(71) Applicant: Tiver Built LLC, Rochester, NY (US)

(72) Inventor: Lindsay Prichard-Fox, Rochester, NY (US)

(73) Assignee: Tiver Built LLC, Rochester, NY (US)

(*) Notice: Subject to any disclaimer, the term of this patent is extended or adjusted under 35 U.S.C. 154(b) by 0 days.

(21) Appl. No.: 17/545,585

(22) Filed: Dec. 8, 2021

(51) Int. Cl.
| | |
|---|---|
| *G06F 30/13* | (2020.01) |
| *G06F 9/445* | (2018.01) |
| *G06F 30/12* | (2020.01) |
| *G06Q 30/06* | (2012.01) |
| *G06T 19/20* | (2011.01) |
| *G06Q 30/0601* | (2023.01) |

(52) U.S. Cl.
CPC .......... *G06F 30/13* (2020.01); *G06F 9/44526* (2013.01); *G06F 30/12* (2020.01); *G06Q 30/0633* (2013.01); *G06Q 30/0641* (2013.01); *G06T 19/20* (2013.01); *G06T 2200/24* (2013.01); *G06T 2210/04* (2013.01)

(58) Field of Classification Search
CPC ...... G06F 30/13; G06F 30/12; G06F 9/44526; G06Q 30/0633; G06Q 30/0641; G06T 19/20
USPC .......................................................... 703/1
See application file for complete search history.

(56) References Cited

U.S. PATENT DOCUMENTS

| | | | | |
|---|---|---|---|---|
| 9,213,785 | B2* | 12/2015 | Plewe | G06T 19/20 |
| 10,748,311 | B1* | 8/2020 | Chu | G06T 15/08 |
| 10,878,138 | B2* | 12/2020 | Ullom | G06F 30/00 |
| 10,977,395 | B1* | 4/2021 | Bagate | G06Q 10/0637 |
| 11,182,513 | B2* | 11/2021 | Myers | G06T 19/00 |
| 11,222,145 | B2* | 1/2022 | Vanker | G06F 3/04847 |
| 11,250,175 | B2* | 2/2022 | Ishii | G06F 30/13 |
| 11,250,176 | B2* | 2/2022 | Schwartz | G06T 19/00 |
| 2004/0145614 | A1* | 7/2004 | Takagaki | G06F 30/13 |
| | | | | 345/420 |
| 2005/0081161 | A1* | 4/2005 | MacInnes | G06K 9/00 |
| | | | | 715/848 |

(Continued)

OTHER PUBLICATIONS

Wang et al. (BIM-Enabled Design Collaboration for Complex Building, 2014, Springer International Publishing, pp. 238-244) (Year: 2014).*

*Primary Examiner* — Iftekhar A Khan
(74) *Attorney, Agent, or Firm* — Woods Oviatt Gilman LLP; Dennis B. Danella, Esq.

(57) ABSTRACT

A smart render design tool includes: (a) a designer side plug-in enabling a designer to generate credentials for a client and associate the credentials with a model for the client, add one or more camera views to the model, select one or more surfaces in the one or more camera views to add in the model, specify one or more materials for each surface of the one or more surfaces of the model, and publish the model including the specified materials for the one or more surfaces of the model; and (b) a client side portal associated with the credentials and the model enabling the client to access the published model using the generated credentials, select desired materials from among the materials specified by the designer for each surface of the published model, and save the desired materials selections of the client for review by the designer using a synchronization function of the designer side plug-in.

25 Claims, 48 Drawing Sheets

(56) References Cited

U.S. PATENT DOCUMENTS

| | | | |
|---|---|---|---|
| 2005/0209831 A1* | 9/2005 | Jungreis | G06F 30/13 703/1 |
| 2007/0165044 A1* | 7/2007 | Wells | G06F 30/13 345/581 |
| 2007/0174026 A1* | 7/2007 | Mangon | G06F 30/20 703/1 |
| 2008/0059220 A1* | 3/2008 | Roth | G06Q 50/18 705/317 |
| 2008/0174598 A1* | 7/2008 | Risenhoover | G06F 30/13 709/204 |
| 2010/0045670 A1* | 2/2010 | O'Brien | G06T 15/04 345/420 |
| 2012/0022700 A1* | 1/2012 | Drees | H02J 13/00004 705/412 |
| 2012/0064204 A1* | 3/2012 | Davila | A21D 13/47 358/1.14 |
| 2012/0116728 A1* | 5/2012 | Shear | G06F 30/00 703/1 |
| 2012/0310906 A1* | 12/2012 | Miller | G06F 30/13 707/E17.044 |
| 2014/0163931 A1* | 6/2014 | Snyder | G06F 3/0488 703/1 |
| 2014/0218360 A1* | 8/2014 | Dalgaard Larsen | G06T 15/20 345/420 |
| 2015/0242095 A1* | 8/2015 | Sonnenberg | G06F 3/04842 715/810 |
| 2015/0249872 A1* | 9/2015 | Lee | H04N 21/8545 725/32 |
| 2015/0310135 A1* | 10/2015 | Forsyth | G06F 30/13 703/1 |
| 2016/0210377 A1* | 7/2016 | Bumbalough | G06F 30/13 |
| 2016/0262442 A1* | 9/2016 | Davila | H04N 1/00411 |
| 2016/0292918 A1* | 10/2016 | Cummings | H04N 13/344 |
| 2017/0115642 A1* | 4/2017 | Sridharan | G05B 13/04 |
| 2017/0132567 A1* | 5/2017 | Glunz | G06T 17/05 |
| 2017/0132568 A1* | 5/2017 | Glunz | H04L 67/10 |
| 2018/0075168 A1* | 3/2018 | Tiwari | G06T 3/0068 |
| 2018/0120793 A1* | 5/2018 | Tiwari | G06Q 10/06 |
| 2019/0228578 A1* | 7/2019 | Moschini | B33Y 50/00 |
| 2019/0318048 A1* | 10/2019 | Kubicki | G06F 30/13 |
| 2019/0354075 A1* | 11/2019 | Christiansen | G05B 15/02 |
| 2020/0074727 A1* | 3/2020 | Mulchandani | G06T 17/10 |
| 2020/0097875 A1* | 3/2020 | Dhandapani | H04L 63/102 |
| 2020/0104430 A1* | 4/2020 | Haddad | G06F 21/105 |
| 2020/0134560 A1* | 4/2020 | McLinden | G06T 17/05 |
| 2020/0380080 A1* | 12/2020 | Glunz | G06Q 30/0621 |
| 2021/0073449 A1* | 3/2021 | Segev | G06F 30/20 |
| 2021/0149353 A1* | 5/2021 | Suindykov | G06F 30/13 |
| 2021/0200713 A1* | 7/2021 | Sridharan | G06F 40/30 |
| 2021/0225083 A1* | 7/2021 | McKee | G06T 19/006 |
| 2021/0279957 A1* | 9/2021 | Eder | G06Q 30/0205 |
| 2021/0295266 A1* | 9/2021 | McKee | G06T 17/20 |
| 2021/0312098 A1* | 10/2021 | Jones | G06F 30/13 |
| 2021/0334422 A1* | 10/2021 | El-Diraby | G06F 30/12 |
| 2022/0019184 A1* | 1/2022 | Kan | G06F 9/44505 |
| 2022/0019595 A1* | 1/2022 | Tsai | G06F 9/44505 |

* cited by examiner

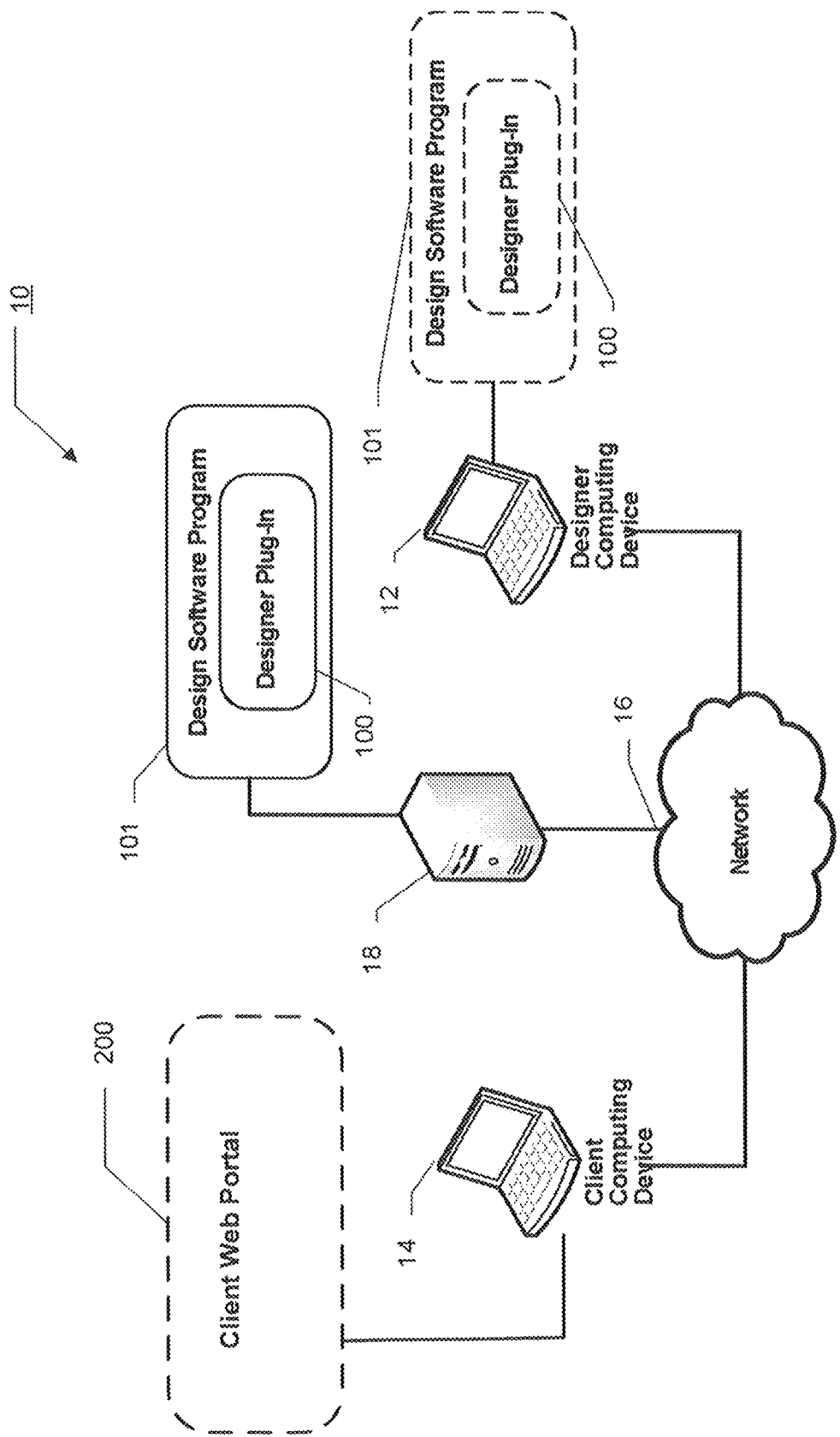

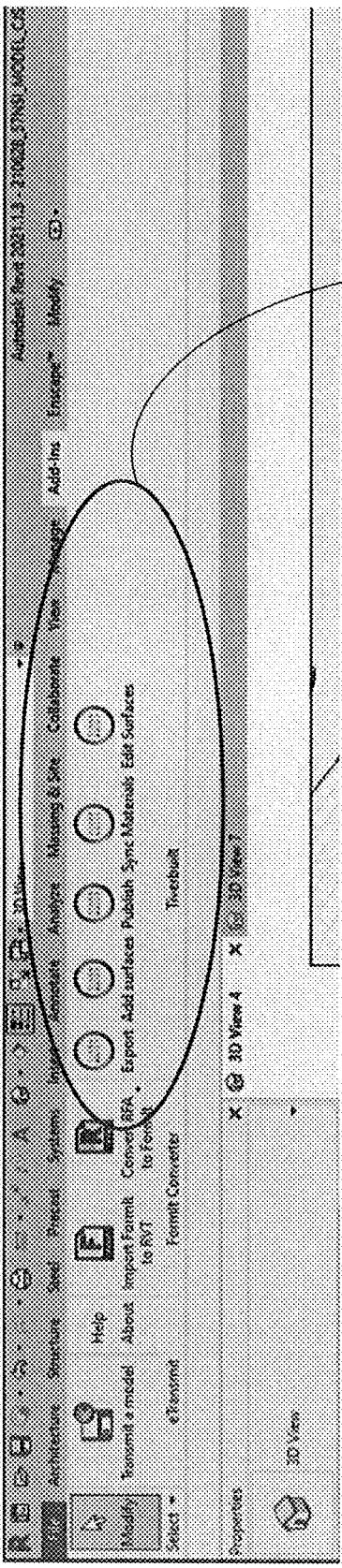
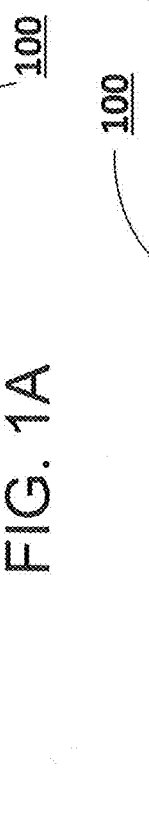
FIG. 1A
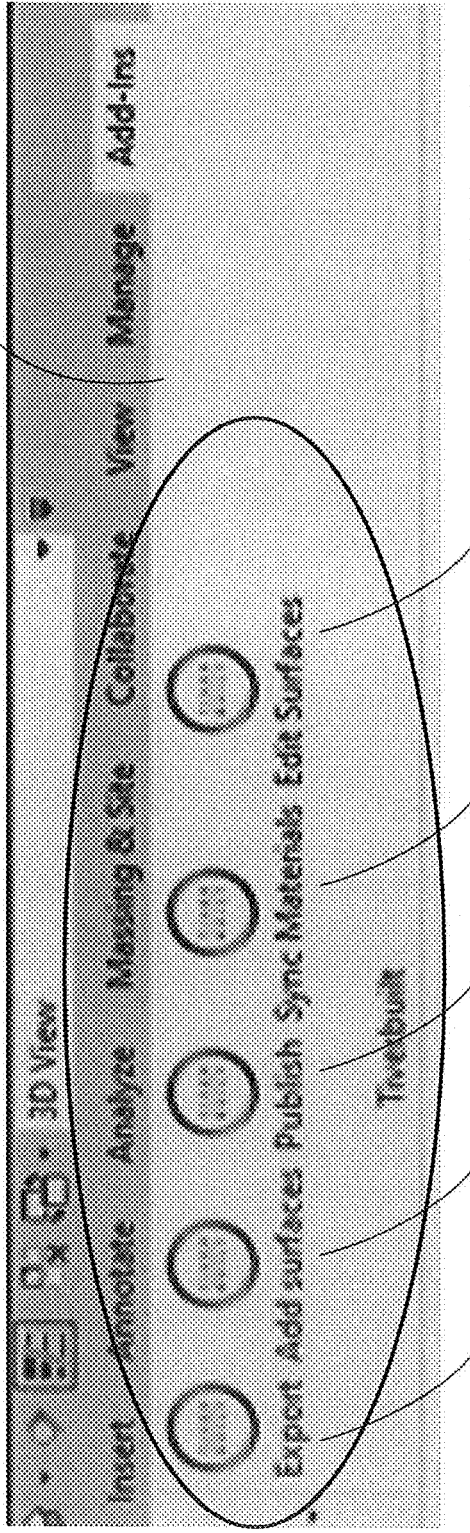
FIG. 1B

Client Side GUI

200

Smart Render Design Tool
(client side web-based portal)

200

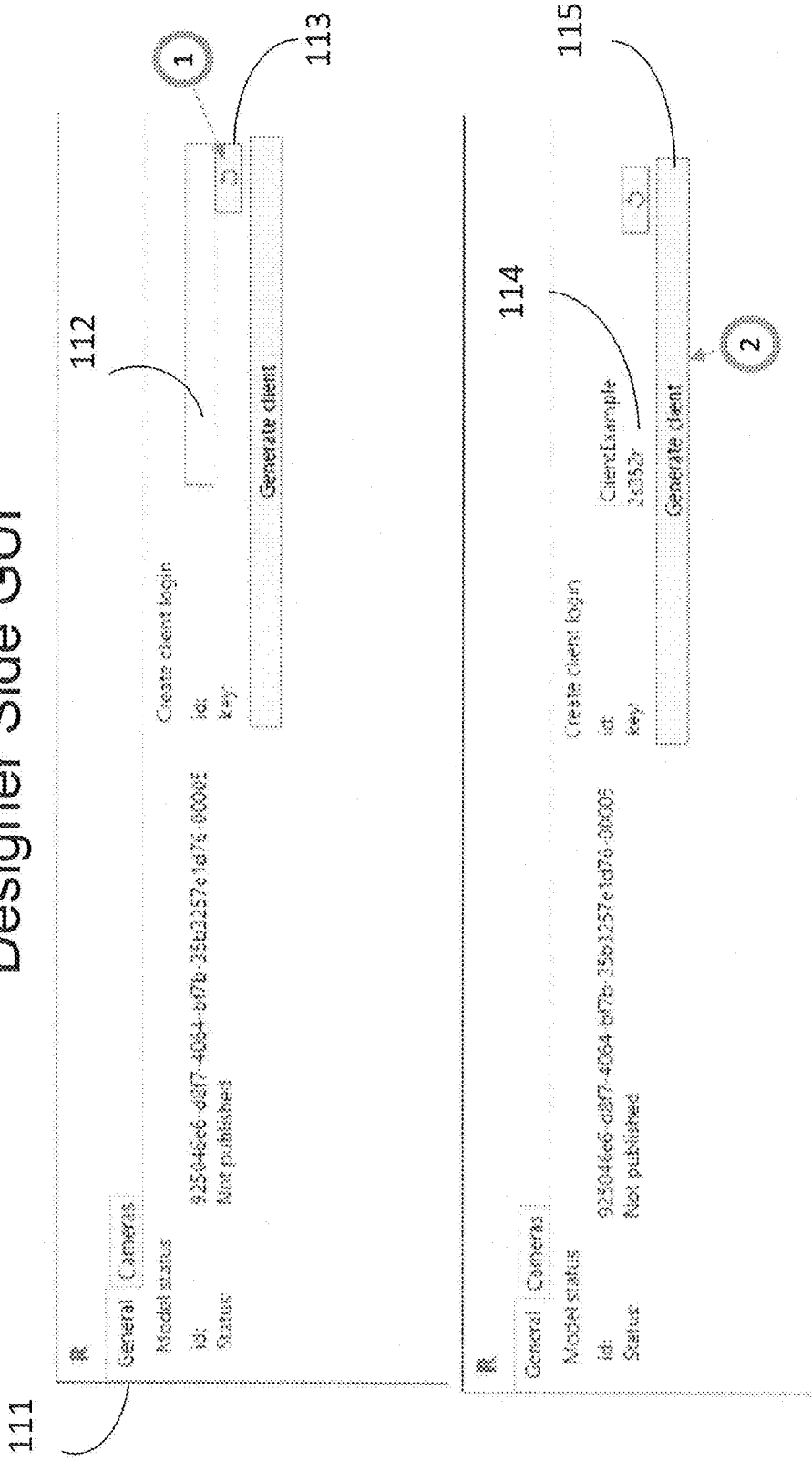

Designer Side GUI

Finish surface selection process
(to make corresponding materials selections next)

FIG. 11 Select corresponding materials for each selected surface

Publish model with selected surfaces and corresponding materials

Client Side GUI

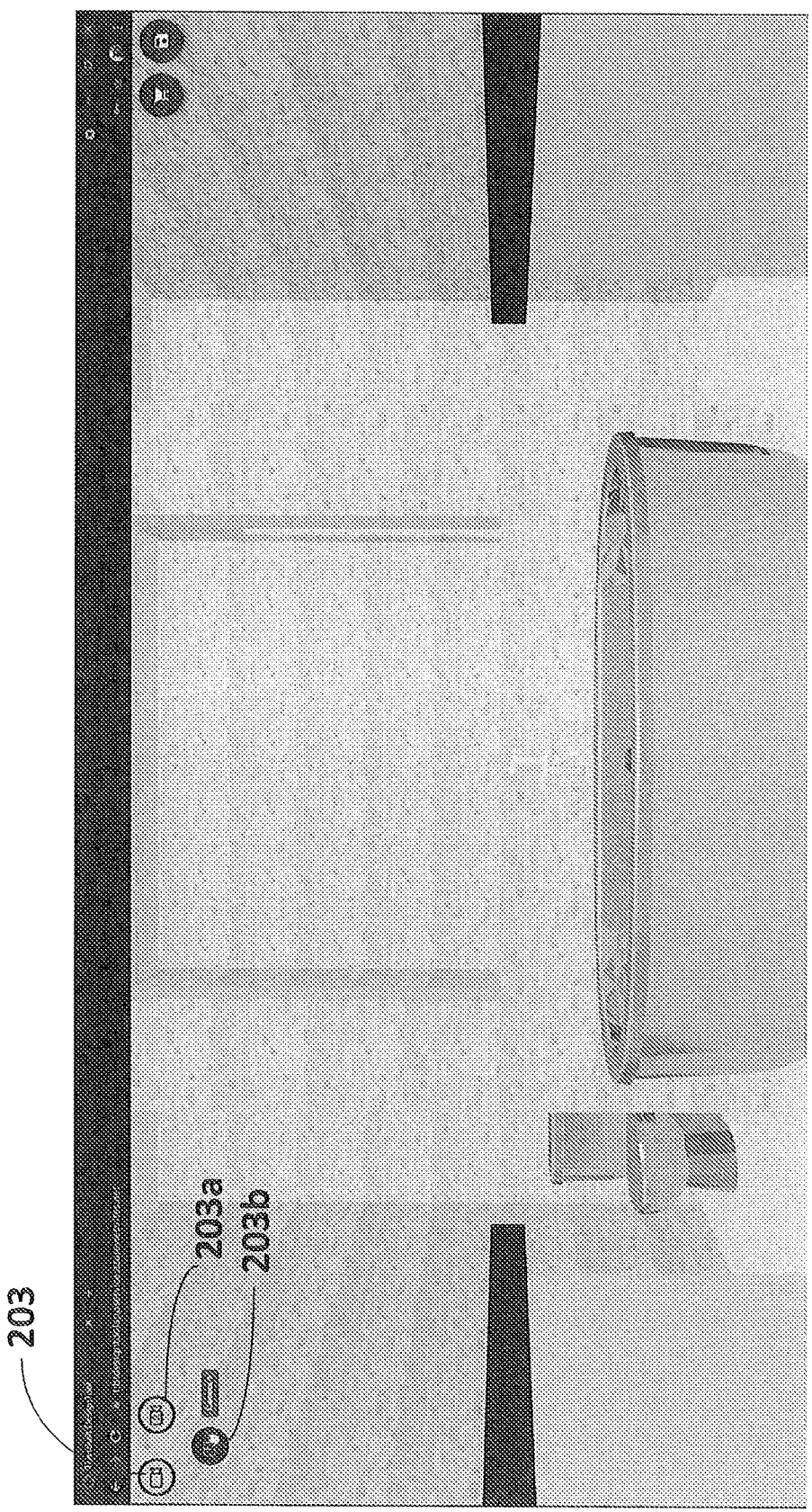

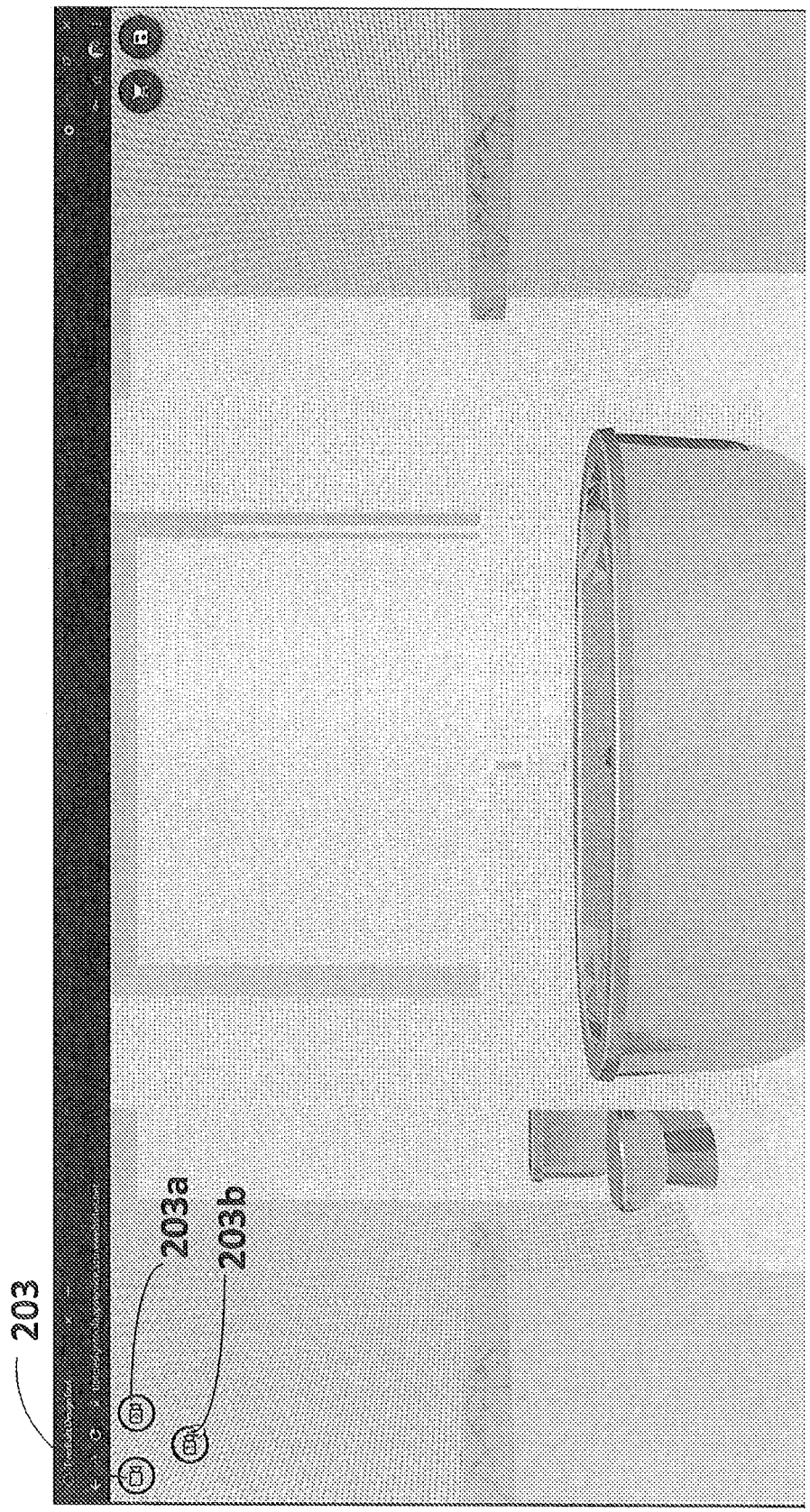

Client Side GUI
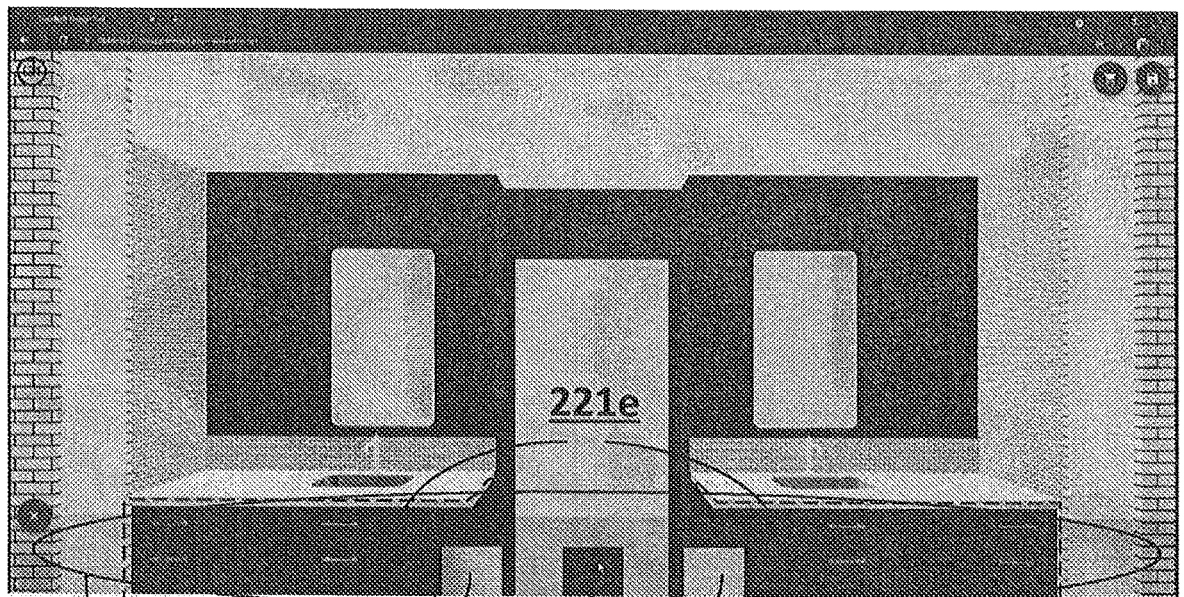
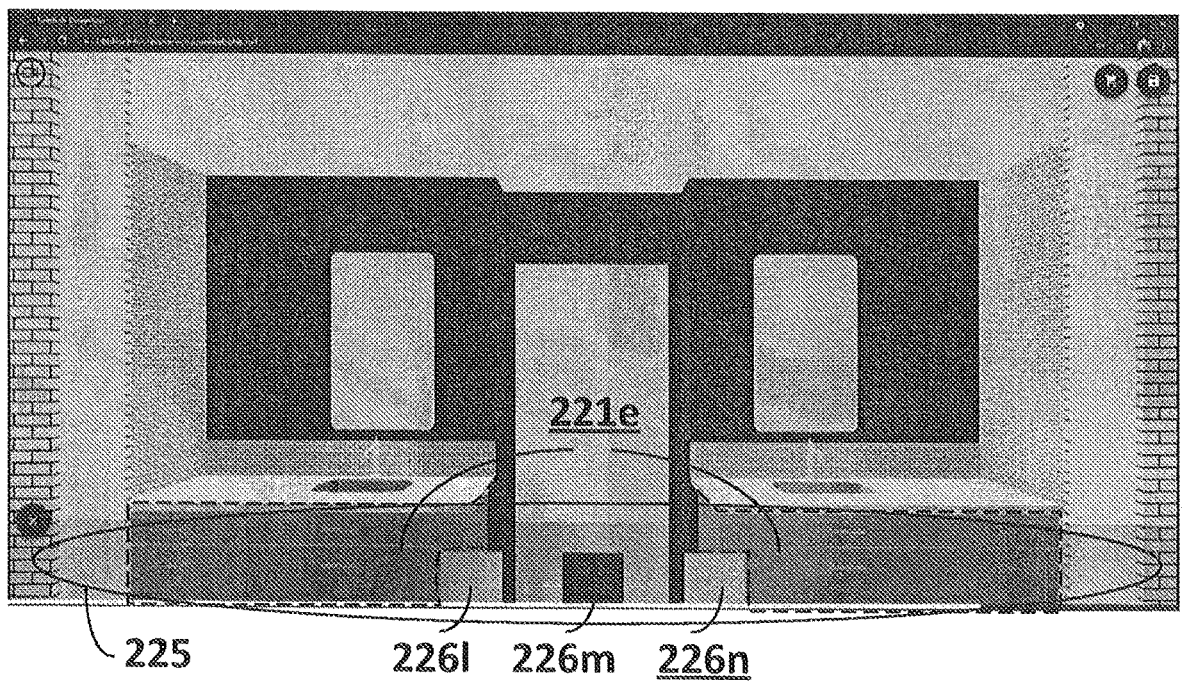
FIG. 16I

Client Side GUI

SMART RENDER DESIGN TOOL AND METHOD

FIELD OF THE DISCLOSURE

A smart render design tool and method described herein is a technological mechanism that provides temporary use of web-based computer software for displaying a digital image of a three-dimensional digital model, and more particularly, allows for the selection of a physical asset, material, or item displayed in the digital image which results in the display of physical, analytical, and identity data related to the selected physical asset, material, or item.

BACKGROUND

The current state of the art for a building design process between clients and designers with regard to material choices for various surfaces and other elements or items in the building typically involves the designer and client going back and forth between different options either in person, via telephone or email, or via videoconference, with new image renderings needing to be generated each time any material selections change. The parties can exchange and view various different lists, photos, and/or samples associated with available materials from which the client can choose. Some existing computerized building design applications may provide generic click through design options in a made-up room or hypothetical building environment (which feels more like a game interaction, as opposed to a real-world selection and imaging process).

However, the currently used processes and systems for building designs are inefficient, time consuming, and inconvenient. The number of options available to customers can often seem overwhelming, and any change orders along the design process can be costly. Existing building design solutions lack the ability for the customer to quickly and conveniently make design choices in a fully customized manner based on their needs, budgets, personal preferences, and the like. Instead of simulated renderings with hypothetical building materials, it would be desirable to provide simulated renderings of custom curated materials that are readily available from the manufacturer or supplier. Known technological solutions also do not allow for the designer to calculate, and for the client to quickly and easily understand, the cost consequences of different materials selections and combinations thereof. Therefore, there is a need for an online design tool that overcomes these deficiencies in existing in-person and computerized building design solutions, by enabling designers and clients to share and lock-in unique design materials selections in which digital models of the client's actual building environment are updated "live" (e.g., immediately, near real-time) to reflect designer-selected and/or client-selected options, in order to allow the client to feel more connected with their choices and increase both customer and designer satisfaction with the building design process overall. Such a solution should also be effective to decrease material ordering errors. Other disadvantages exist.

SUMMARY OF THE DISCLOSURE

A smart render design tool and method described herein addresses at least some of the deficiencies with existing building design technologies described above.

Example embodiments provide a smart render design tool including a designer side plug-in including computer-executable instructions configured to enable a designer to generate credentials for a client and associate the credentials with a model for the client, add one or more camera views to the model, select one or more surfaces in the one or more camera views to add in the model, specify one or more materials for each surface of the one or more surfaces of the model, and publish the model including the selected materials for the one or more surfaces of the model. The smart render design tool further includes a client side portal associated with the credentials and the model, including computer-executable instructions configured to enable the client to access the published model using the generated credentials, select desired materials from among the materials specified by the designer for each surface of the published model, and save the desired materials selections of the client for review by the designer via a synchronization function of the designer side plug-in.

According to some aspects, the one or more camera views are selected from among a plurality of created 3D camera views corresponding to different areas of the model.

According to some aspects, the one or more surfaces are selected from among a plurality of surfaces in the model including walls, floors, countertops, cabinets or combinations thereof, and the one or more materials for each surface are selected from among a plurality of available materials including different paint colors, tile, stone, wood, laminate, finishes, textures, patterns or combinations thereof.

According to some aspects, the client side portal is further configured to notify the designer that the client has saved the desired material selections via a pop-up notification in the designer side plug-in, an email message, a text (SMS) message or combinations thereof.

According to some aspects, the designer side plug-in is further configured to enable the designer to synchronize client-selected materials in the model based on the desired materials selections saved by the client, and display updated camera views of the client-selected materials in the model.

According to some aspects, the designer side plug-in is further configured to display identity data including updated calculated values for dimensions and costs associated with the desired materials selections saved by the client for the surfaces of the model for review by the designer.

According to some aspects, the designer side plug-in is further configured to generate and display a shopping list, including quantities, itemized prices, total prices or combinations thereof for respective materials, based on the updated calculated values for the dimensions and costs associated with the desired materials selections for the surfaces of the model.

According to some aspects, the designer side plug-in is further configured to enable the designer to edit the one or more surfaces of the model by adding new surfaces, removing existing surfaces, or changing the selected materials for the one or more surfaces.

According to some aspects, the designer side plug-in is implemented via a software add-in to an architectural design program that is stored in a memory and executed by a processor of a computer of the designer.

According to some aspects, the client side portal is implemented via a web-based program hosted on a website that is accessed by the client using a web browser on a computer or other electronic device of the client.

Example embodiments also provide a method implemented via a smart render design tool including generating credentials for a client and associating the credentials with a model for the client, adding one or more camera views to the model, selecting one or more surfaces in the one or more camera views to add in the model, specifying one or more materials for each surface of the one or more surfaces of the model, publishing the model including the selected materials for the one or more surfaces of the model, providing the client with access to the published model using the generated credentials, enabling the client to select desired materials from among the materials specified by the designer for each surface of the published model, and enabling the client to save the desired materials selections of the client for review by the designer via a synchronization function.

According to some aspects, the method further includes notifying the designer that the client has saved the desired material selections via a pop-up notification, an email message, a text (SMS) message or combinations thereof.

According to some aspects, the method further includes synchronizing client-selected materials in the model based on the desired materials selections saved by the client, and displaying updated camera views of the client-selected materials in the model.

According to some aspects, the method further includes displaying identity data including updated calculated dimensions and costs associated with the desired materials selections saved by the client for the surfaces of the model for review by the designer.

According to some aspects, generating and displaying a shopping list, including quantities, itemized prices, total prices or combinations thereof for respective materials, based on the updated calculated values for the dimensions and costs associated with the desired materials selections for the surfaces of the model.

According to some aspects, the method further includes editing the one or more surfaces of the model by adding new surfaces, removing existing surfaces, or changing the selected materials for the one or more surfaces.

Other objects and advantages of the present disclosure will become apparent from the following description taken in connection with the accompanying drawings, wherein is set forth by way of illustration and example, embodiments of this disclosure.

BRIEF DESCRIPTION OF THE DRAWINGS

The above-mentioned and other features and advantages of this disclosure, and the manner of attaining them, will become apparent and be better understood by reference to the following description of the disclosure in conjunction with the accompanying drawings, in which:

FIG. 1 is a schematic illustration of a system that can be used to implement a smart render design tool in accordance with one aspect of the present disclosure;

FIGS. 1A and 1B show a designer side graphical user interface (GUI) screen of the smart render design tool from the perspective of a designer side plug-in of a design software program, according to some example embodiments;

FIG. 3 shows a designer side GUI screen of the designer side plug-in of the smart render design tool for generating credentials (id/key) for the client and associating the credentials with the model for the client;

FIG. 11 shows example GUI screens of the designer side plug-in of the smart render design tool for selecting corresponding materials for the selected surface(s) and saving the desired materials selections, according to some example embodiments;

FIGS. 16A-16I show several example client side GUI screens of the client side web-based portal of the smart render design tool for navigating the model in different camera views, selecting different surface(s), selecting different materials for the surface(s), changing camera views, and saving desired materials selections in association with the published model, according to some example embodiments;

DETAILED DESCRIPTION OF THE DISCLOSURE

Figure 1C:
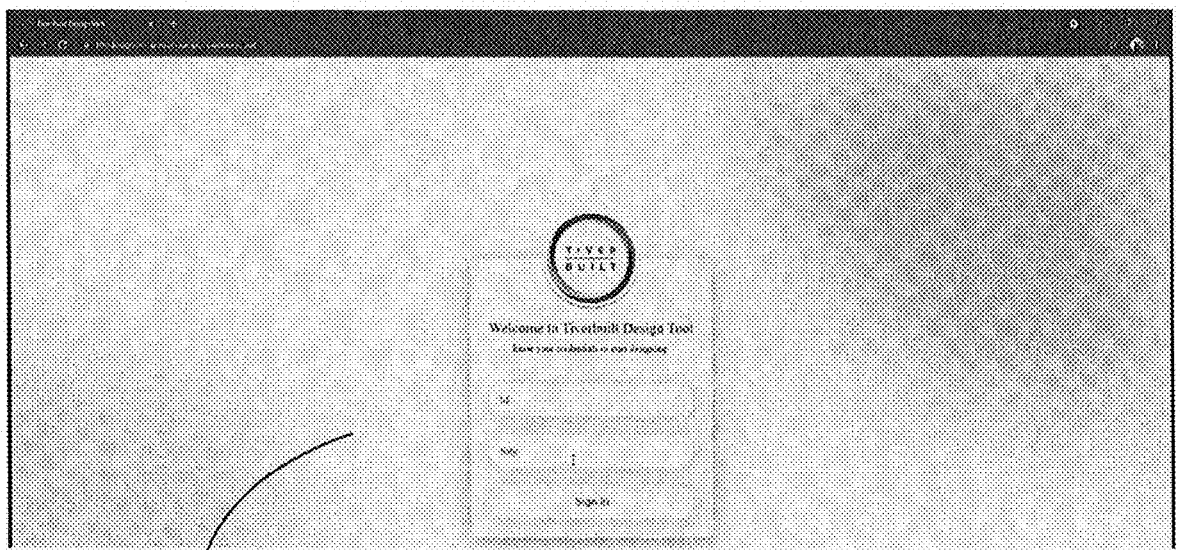
FIGS. 1C and 1D show a client side GUI screen of the smart render design tool from the perspective of a client side web-based portal, according to some example embodiments.

Generally, the systems and methods described herein may be implemented in hardware, software, and/or a combination thereof, and functionality may be distributed across a variety of computing devices. The present disclosure provides a computer-implemented method programmed for execution in a computing environment. FIG. 1 is a schematic illustration of a system 10 that may be used to implement the methods and aspects described herein may include one or more computing devices, such as a designer's electronic computing device 12 and a client's electronic computing device 14. These devices 12, 14 may include one or more memories storing computer-executable instructions (e.g., software, programs, applications) and processor(s) for executing the instructions, and may be in communication with each other over a network 16 via wired and/or wireless connections. It is also contemplated that system 10 may include one or more remote servers 18 that is accessible by computing devices 12, 14 through network 16 to store and execute any of the functionality and processes described below.

With additional reference to FIGS. 1A and 1B, a designer side graphical user interface (GUI) screen of a smart render design tool is shown from the perspective of a designer side plug-in of a design software program, according to some example embodiments. The smart render design tool includes a designer side plug-in 100. In some example embodiments, designer side plug-in 100 is implemented as customized add-in software that can be integrated with a design software program 101, including but not limited to the AUTODESK REVIT program (although other examples of design software programs are possible). It should be understood that software program 101 and/or designer side plug-in 100 may be stored in a memory of remote server 18 and be provided as a non-downloadable web-based software program to provide access to the functionality described below to designer and/or client computing devices 12, 14. It is also contemplated that relevant portions of the software program 101 and/or designer side plug-in 100 be stored in a memory of designer and/or client computing devices 12, 14.

With reference to FIGS. 1A and 1B, the designer side plug-in 100 includes multiple functional buttons: Export 110, Add Surfaces 120, Publish 130, Sync Materials 140, and Edit Surfaces 150, which will be described in detail below with reference to FIGS. 2-13 and 18-21.

Figure 1D:
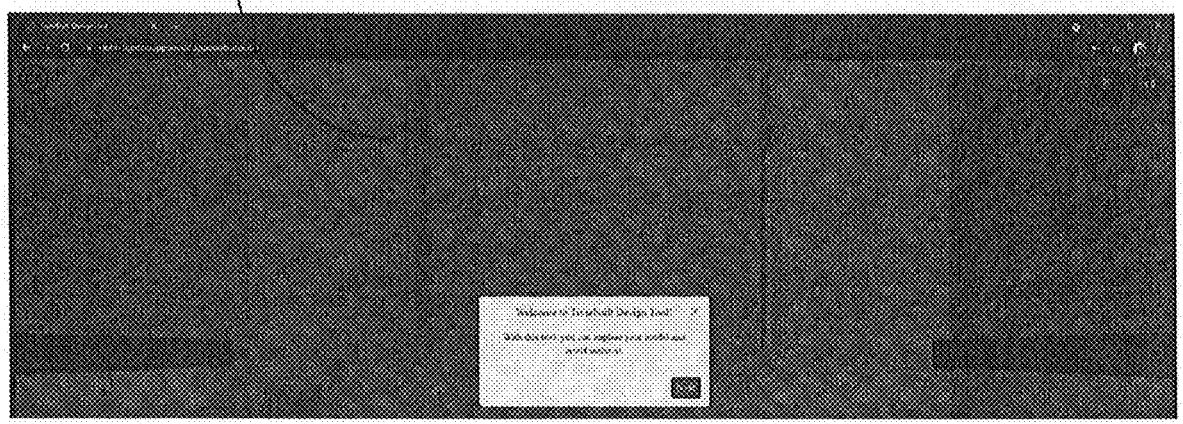

FIGS. 1C and 1D show a designer side GUI screen smart render design tool from the perspective of a client side web-based portal, according to some example embodiments. Referring to FIGS. 1C and 1D, the smart render design tool also includes a client side web-based portal 200 (login screen shown in FIG. 1C and client side GUI screen shown in FIG. 1D), where the client can enter their credentials to access the published model. Using a designer side GUI screen of the designer side plug-in 100, the designer can generate login credentials for the client (e.g., client ID 112 and key or password 114), as described below with reference to FIGS. 2-3. The term client refers to the end user such as a customer, but may also refer to manufacturers, trade partners, or trade professionals.

Figure 2:
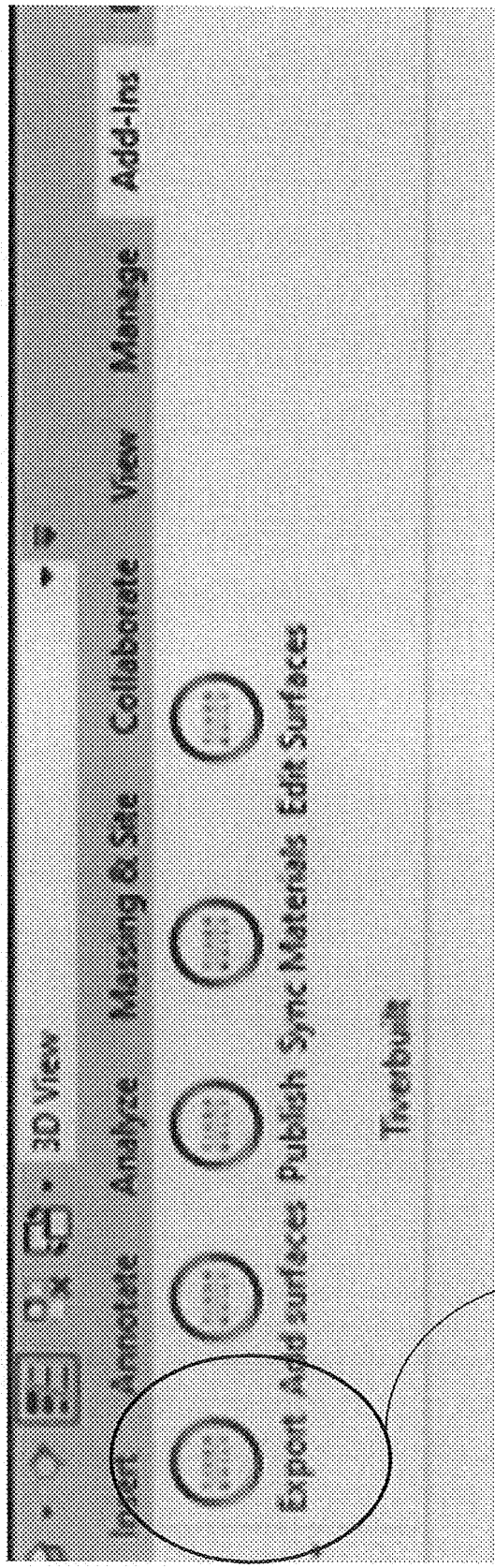
FIG. 2 shows an "Export" button of the designer side GUI of the designer side plug-in of the smart render design tool, according to some example embodiments.

FIG. 2 shows an "Export" button of the designer side GUI screen of the designer side plug-in of the smart render design tool, according to some example embodiments. In order to create login credentials for the client (e.g., client ID and password), the designer will click on the "Export" button 110. The designer side plug-in 100 will connect to a database and a window will open. The "General" tab 111 is selected by default, as shown in FIG. 3.

FIG. 3 shows a designer side GUI screen of the designer side plug-in of the smart render design tool for generating credentials for the client and associating the credentials with the model for the client. The designer will fill out the "ID" field 112 with a desired client identifier (e.g., ClientExample, client1, etc.), and click on the "key" button 113 (circular arrow shown at (1) in FIG. 3) to generate a random key 114 (e.g., a pseudo-random sequence of numbers/letters or other characters), which will be used as a password or access code for the client. When both "id" field 112 and "key" field 114 are filled, the designer will click on "Generate client" button 115 (shown at (2) in FIG. 3) to save the client login credentials in association with a particular model for the client (e.g., a floor plan of a specific building design).

Figure 4A:
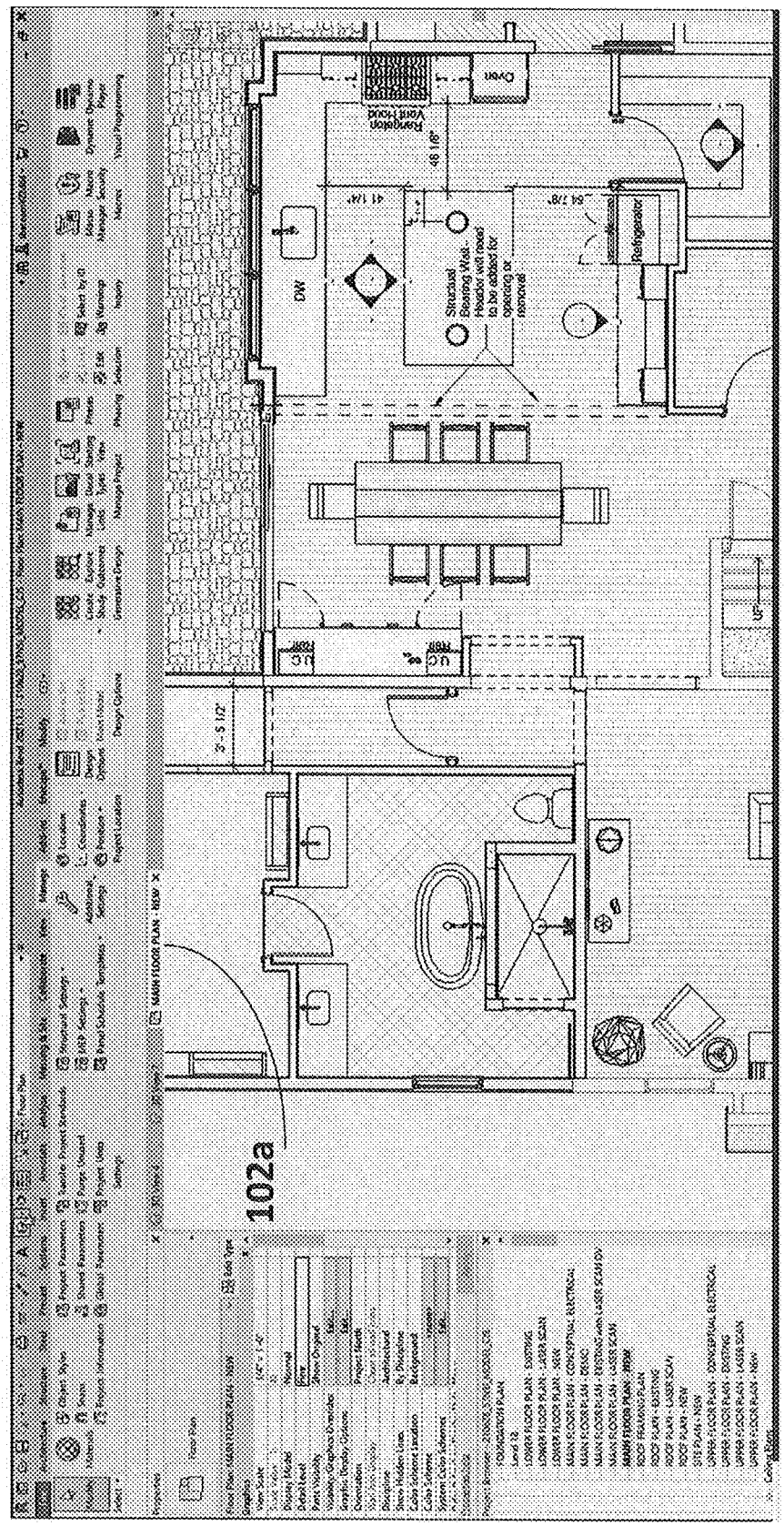
FIG. 4A shows an example GUI screen of the designer side plug-in for creating and navigating floorplans in the model.

Next, one or more 3D camera view(s) will be created and added to the model, as described below with reference with FIGS. 4A-5C. FIG. 4A shows an example GUI screen of the design software program for creating and navigating floorplans in the model. The designer can view floor plan(s), such as main floor plan 102*a*, in the design software program (e.g., REVIT). The process described below may be repeated for each floor plan, such as for different levels of the building, for example. The floor plan 102*a* can be created in various ways in Revit (e.g., using CAD designs, imported data, etc.).

Figure 4B:
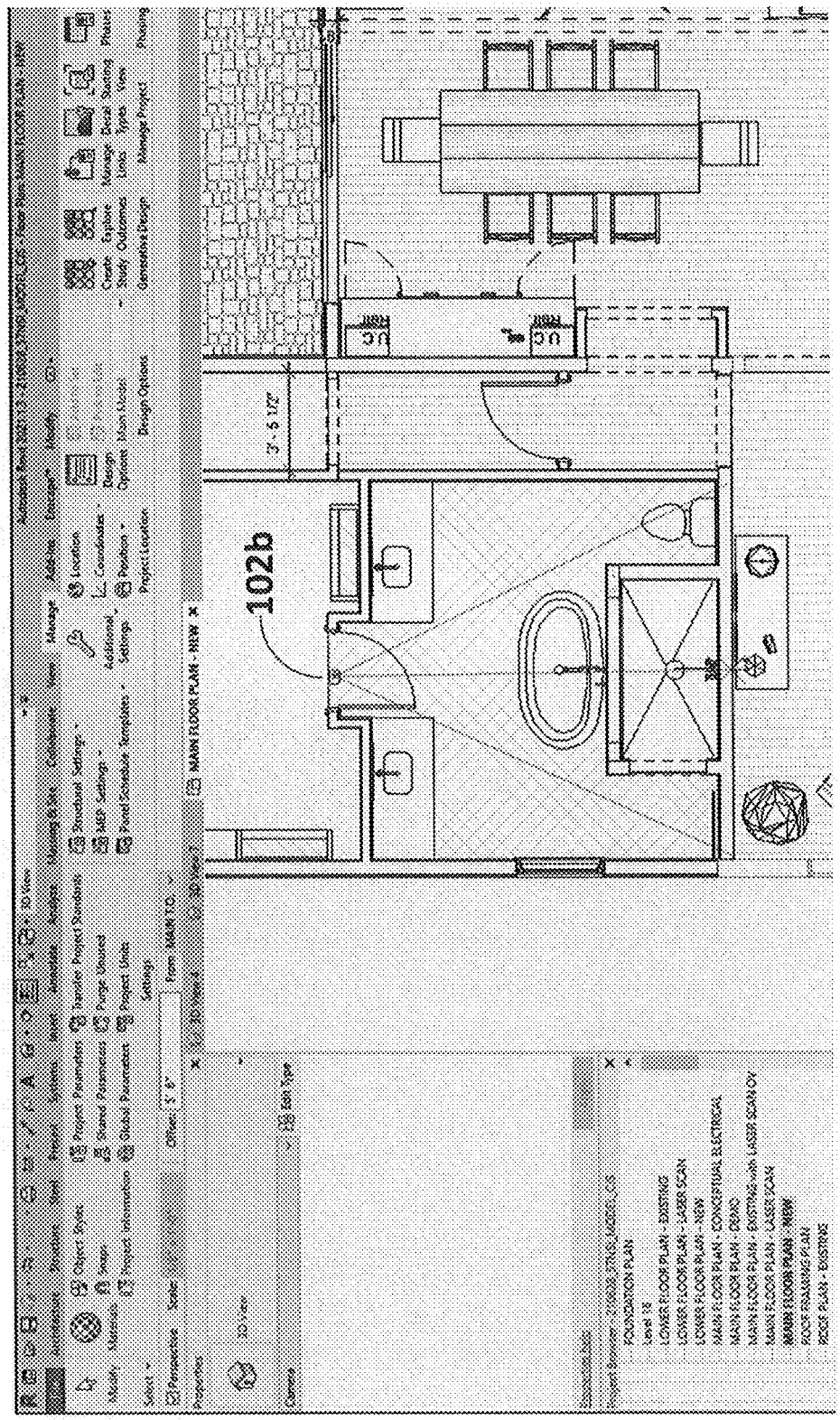
FIG. 4B shows an example GUI screen of the design software program for creating 3D camera view(s) in the model.
Figure 4C:
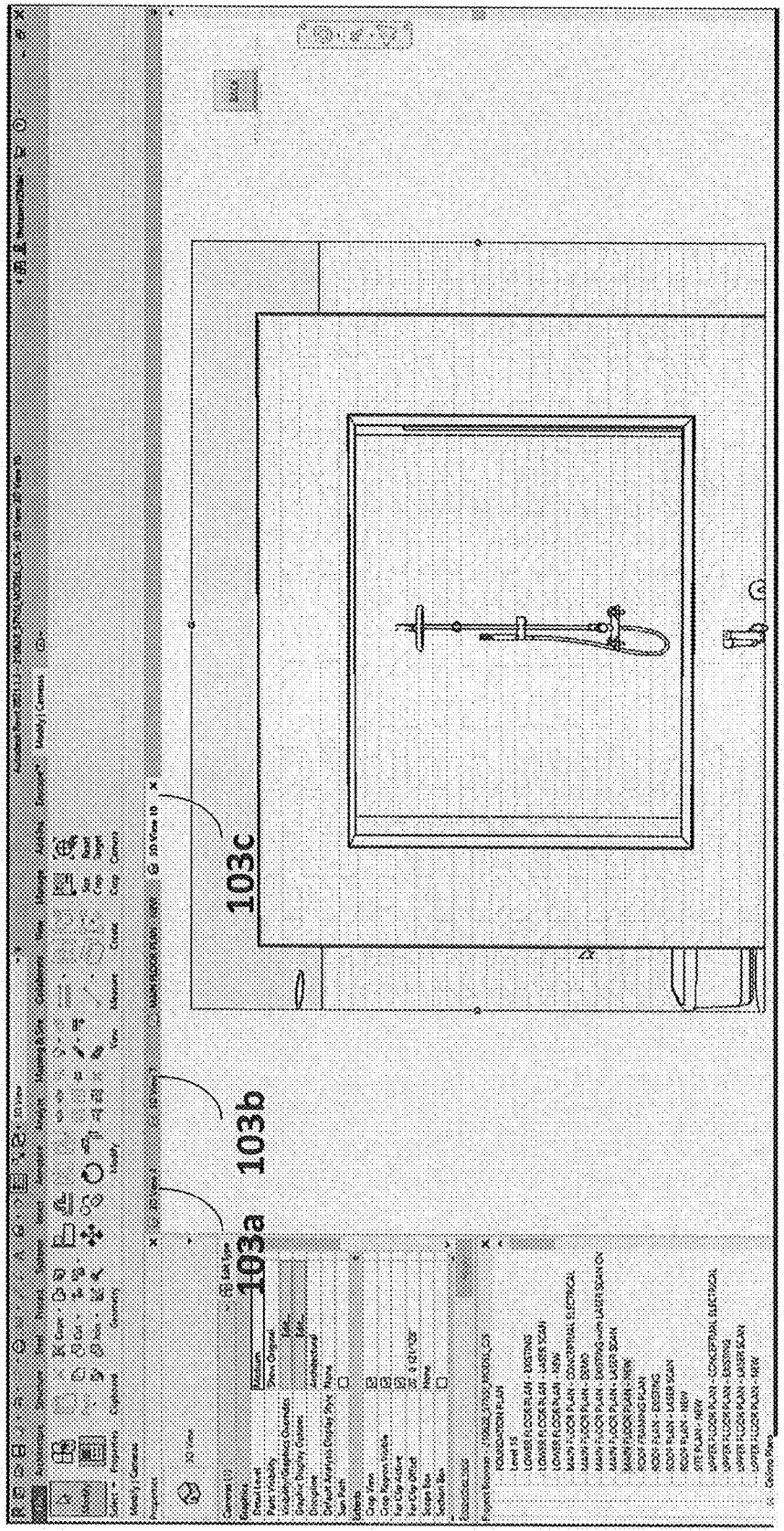
FIG. 4C shows an example GUI screen of the design software program displaying a created 3D camera view of the model.

FIG. 4B shows an example GUI screen of the design software program for creating 3D camera view(s) in the model. Referring to FIGS. 4B-4C, the designer can generate different 3D camera views for rooms, such as camera views 103*a* (3D view 4), 103*b* (3D view 7), 103*c* (3D view 10), etc. As shown in FIG. 4B, camera views may be created by placing a camera perspective 102*b* at a particular point within the model and dragging over an area of the model (e.g., to cover an area of a specific room within the floor plan). The designer may create multiple views for each room to show different angles and features, for example. In this manner, the designer can create one or more custom viewpoint(s) in the building design model to help clients make decisions on different items and materials.

FIG. 4C shows an example GUI screen of the design software displaying a created 3D camera view of the model. As shown in FIG. 4C, the designer can then view the created camera view such as the camera view 103*c* (3D view 10), which may be shown in a 3D view in REVIT, for example. The designer may have previously created, and can view, the camera views 103*a* (3D view 4) and 103*b* (3D view 7), with corresponding tabs also shown in FIG. 4C. From each of the created camera viewpoint(s) 103, the designer will be able to select which surface(s) 121 can be identified in the client side portal 200, as described further below with reference to FIGS. 7-9B. The camera view 103*c* shown in FIG. 4C corresponds to what the client will see when selecting this camera view within the client side portal 200 later.

Figure 5A:
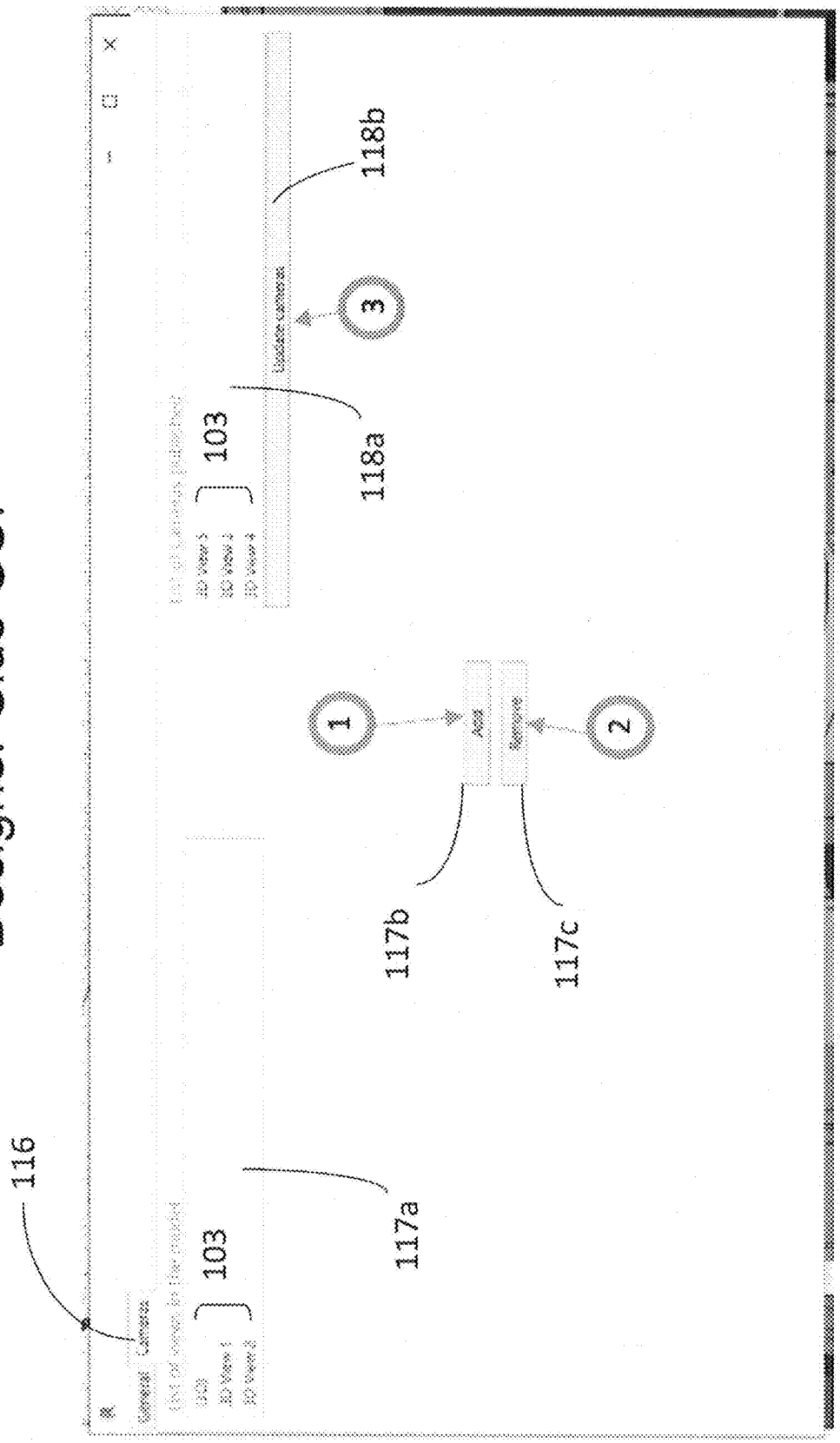
FIGS. 5A and 5B show example GUI screens of the design software program for updating (adding or removing) 3D camera view(s) associated with the model, according to some example embodiments.
Figure 5B:
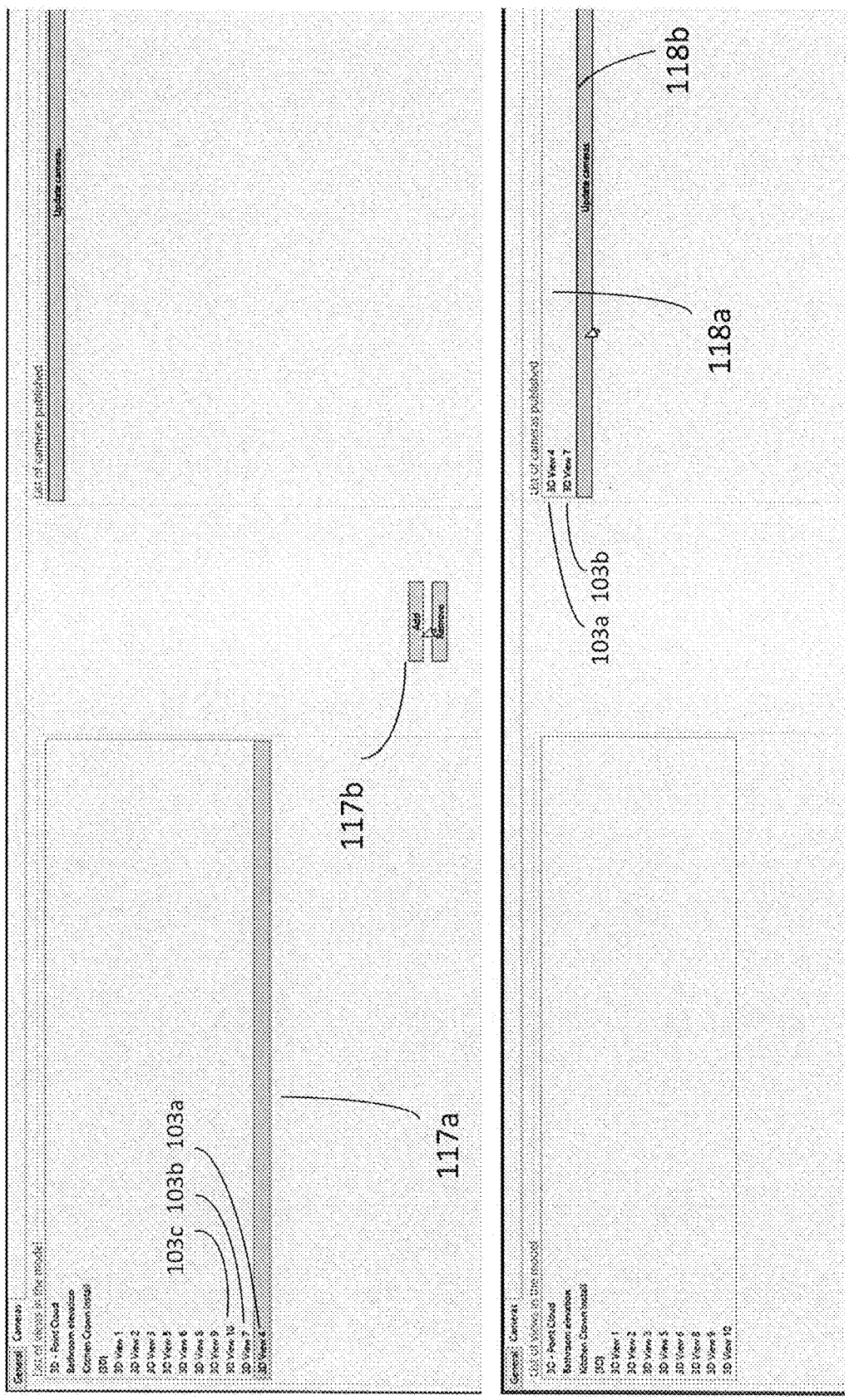
Figure 5C:
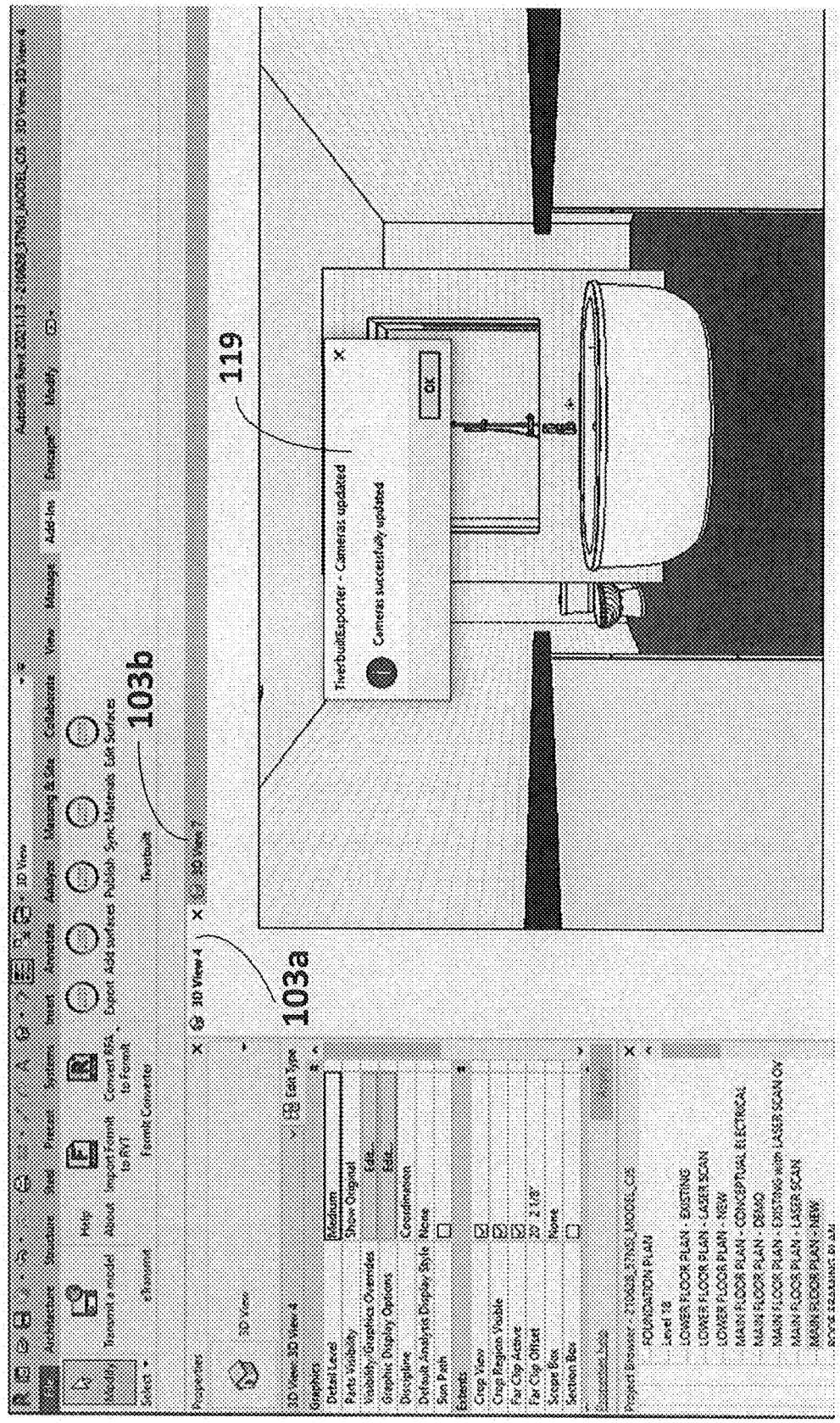
FIG. 5C shows an example GUI screen of the design software program displaying a notification that the 3D camera view(s) have been updated successfully.

FIGS. 5A and 5B show example GUI screens of the designer side plug-in of the smart render design tool for adding, removing, and updating 3D camera view(s) associated with the model, according to some example embodiments. FIG. 5C shows an example GUI screen of the design software program displaying a notification that the 3D camera view(s) have been updated successfully. To add created camera(s) (e.g., 103*a*, 103*b*, 103*c*, etc.) to the model, and/or change camera(s) for the model, the designer will click on the "Export" button 110, referring again to FIG. 2, and the designer side plug-in 100 will connect to the database and a pop-up window will open as shown in FIGS. 5A and 5B. Then, the designer will select the "Cameras" tab 116 in the pop-up window to manage which created camera views are included in a list of cameras published 118*a*, examples of which are shown in FIGS. 5A and 5B. To add a camera, select a created camera view 103 from the list of views in the model 117*a* in the left column and click "Add" button 117*b* (as shown at (1) in FIG. 5A). To remove a camera, select a created camera view 103 from the list of cameras published 118*a* on the right column and click "Remove" button 117*c* (as shown at (2) in FIG. 5A). To apply the modification(s), the designer will click on the "Update cameras" button 118*b* (as shown at (3) in FIG. 5A). The pop-up window will close and then a "Cameras successfully updated" pop-up notification 119 will be displayed in a GUI screen of the design software program 101 (e.g., Revit), as shown in FIG. 5C.

Figure 6:
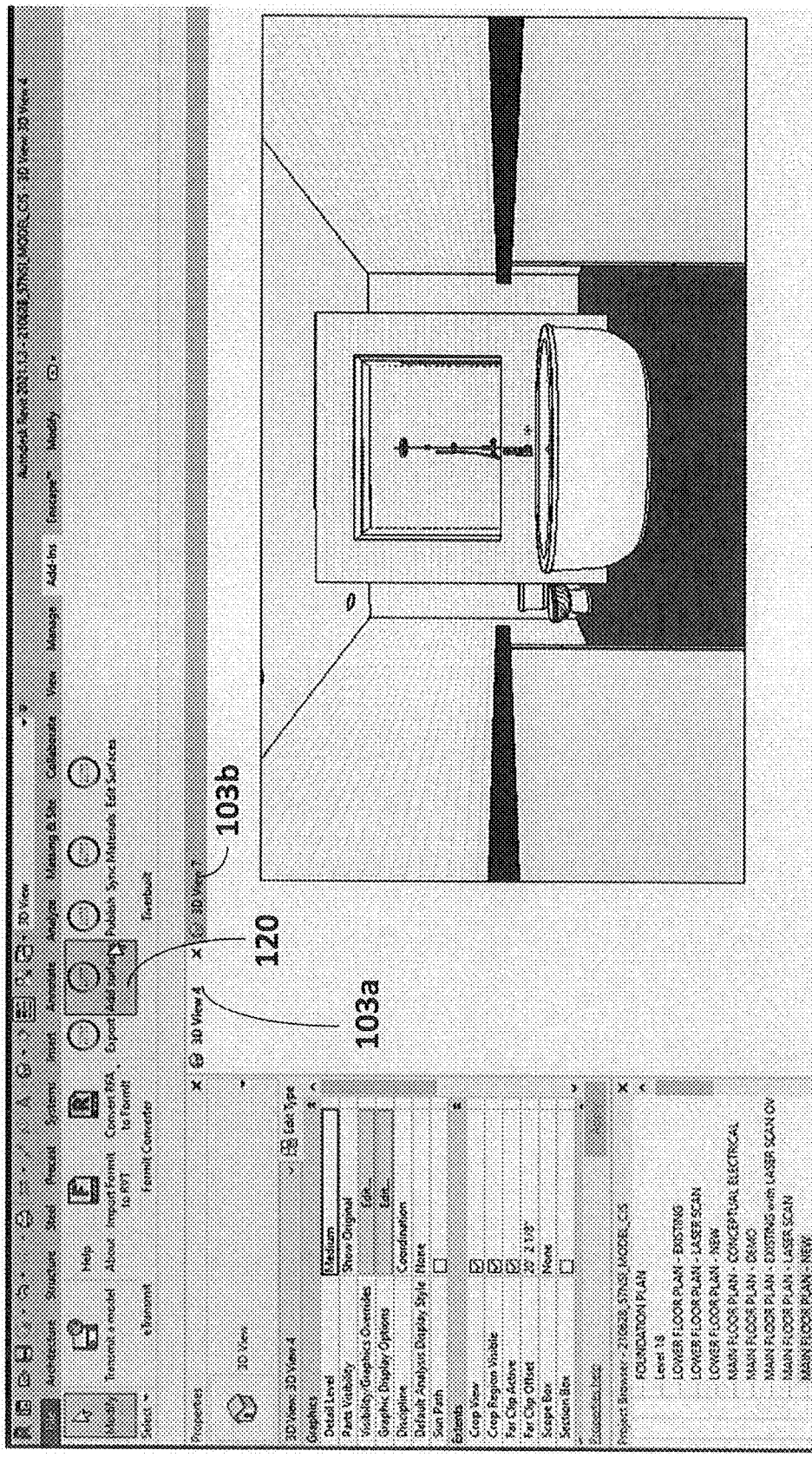
FIG. 6 shows an "Add Surfaces" button of the designer side GUI screen of the designer side plug-in of the smart render design tool, according to some example embodiments.

After all desired camera view(s) are added to the model, the designer can then select surfaces to the model, and add corresponding materials in association with the selected surfaces, respectively, as described further below with reference to FIGS. 6-11. FIG. 6 shows an "Add Surfaces" button of the designer side GUI screen of the designer side plug-in of the smart render design tool, according to some example embodiments. To give the client the possibility to modify the material of an element (surfaces), the designer will click on the "Add surfaces" button 120, as shown in FIG. 6. The add surfaces feature enables the designer to click on items in the model to select any walls, floors, countertops, cabinets, appliances, etc. for which the designer wants the client to be able to select desired materials. Each of the surfaces may have certain attributes associated with respective identifiers and/or identity data, including dimensions (e.g., length, width, area in sq. ft.). These can be based on real measurements from the CAD designs, laser scans, imported data, or the like.

Figure 7:
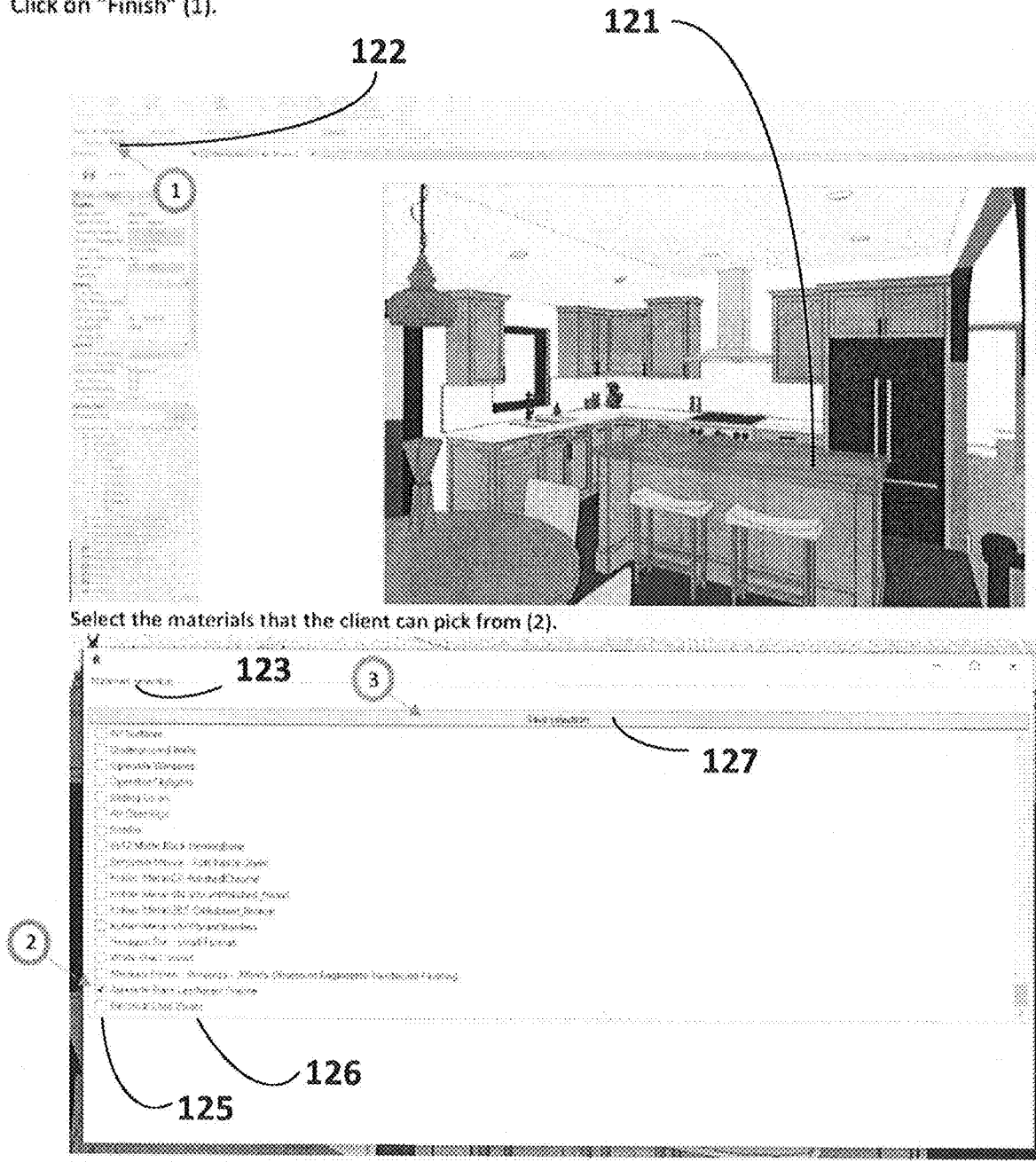
FIG. 7 shows example GUI screens of the designer side plug-in of the smart render design tool for selecting surface(s) for which the client will be able to choose respective materials, and selecting corresponding materials for the surface(s) that are available to the client, according to some example embodiments.

FIG. 7 shows example GUI screens of the designer side plug-in of the smart render design tool for selecting surface(s) for which the client will be able to choose respective materials, and selecting corresponding materials for the surface(s) that are available to the client, according to some example embodiments. Referring to FIGS. 7-11, after the desired camera view(s) 103 (e.g., 103*a*, 103*b*, etc.) are assigned to the model, the designer will then select desired surfaces 121 (e.g., 121*a*, 121*b*, 121*c*, etc. corresponding to walls, floors, countertops, cabinets, appliances, etc.) for which the client will be able to choose from among various materials 126 selected by the designer for each surface.

Figure 8A:
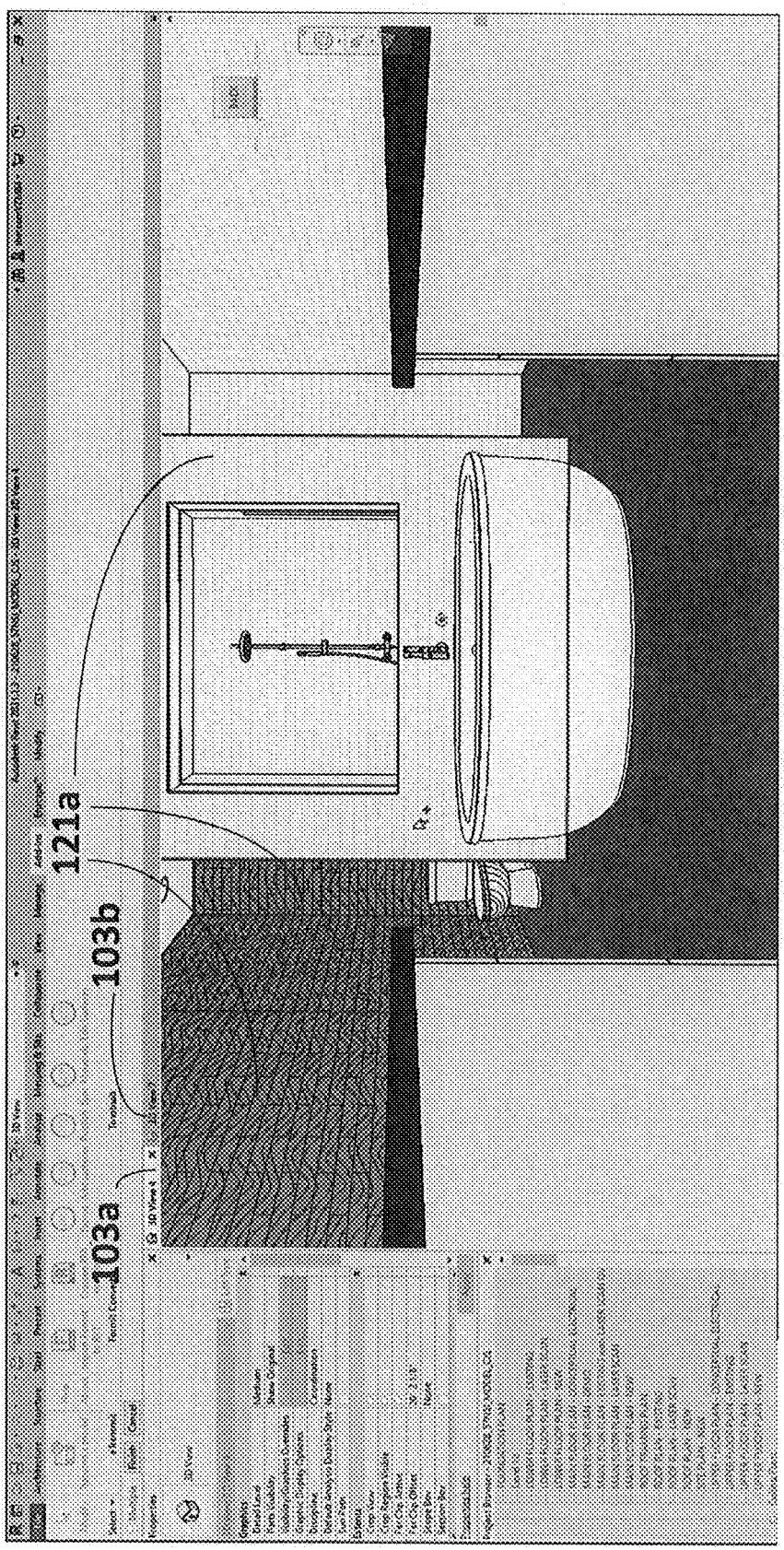
FIGS. 8A and 8B show examples of GUI screens of the designer side plug-in of the smart render design tool for selecting surfaces (e.g., walls with tile, full screen and zoomed-in views) for a first 3D camera view, according to some example embodiments.
Figure 8B:
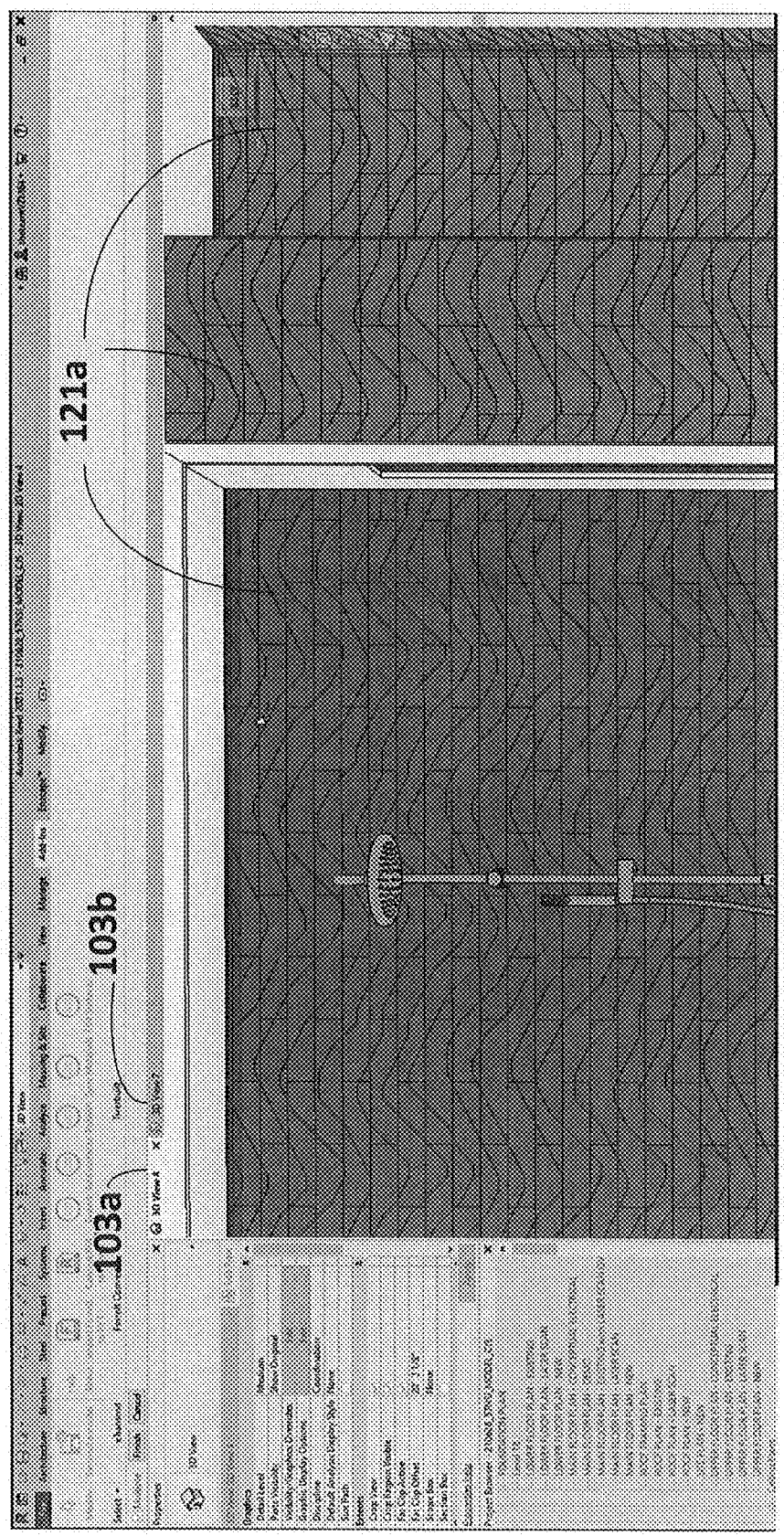

FIGS. 8A and 8B show examples of GUI screens of the designer side plug-in of the smart render design tool for selecting surfaces (e.g., walls with tile, full screen and zoomed-in views) for a first 3D camera view, according to some example embodiments.

Referring to FIGS. 7, 8A, and 8B, in order to add surface(s) to the model, the designer will click on any surface 121 (e.g., surface 121*a*) that the designer wants the client to be able to choose the material 126 for (e.g., walls with tile). As shown in FIG. 8A, the designer may select surfaces 121*a* for a first 3D camera view 103*a* (e.g., tile walls). As shown in FIG. 8B (close up/zoomed in), the designer may also select surfaces 121*a* for the first 3D camera view 103*a* (e.g., tile walls).

Figure 8C:
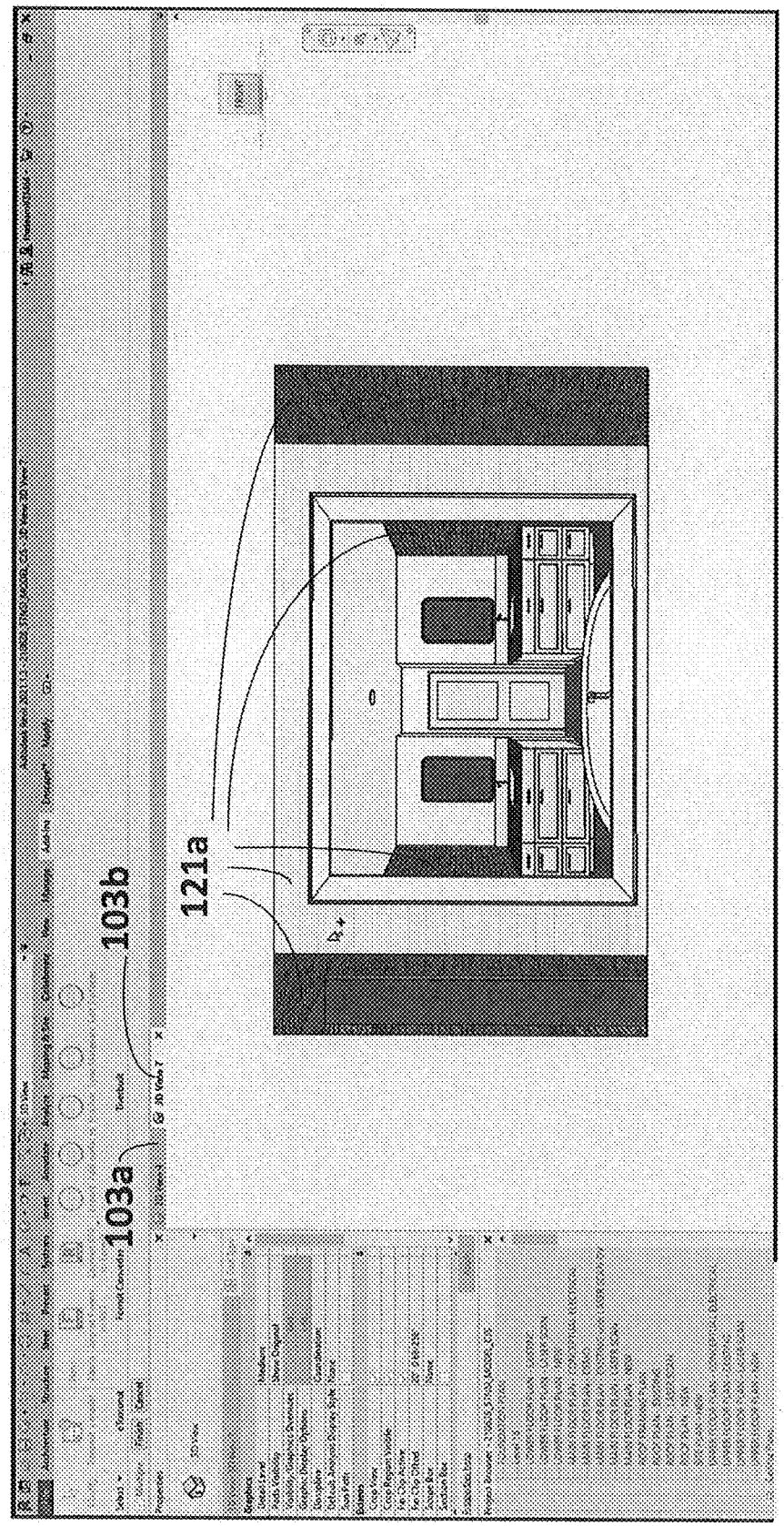
FIGS. 8C and 8D show examples of GUI screens of the designer side plug-in of the smart render design tool for selecting surfaces (e.g., walls with tile, full screen and zoomed-in views) for a second 3D camera view, according to some example embodiments.
Figure 8D:
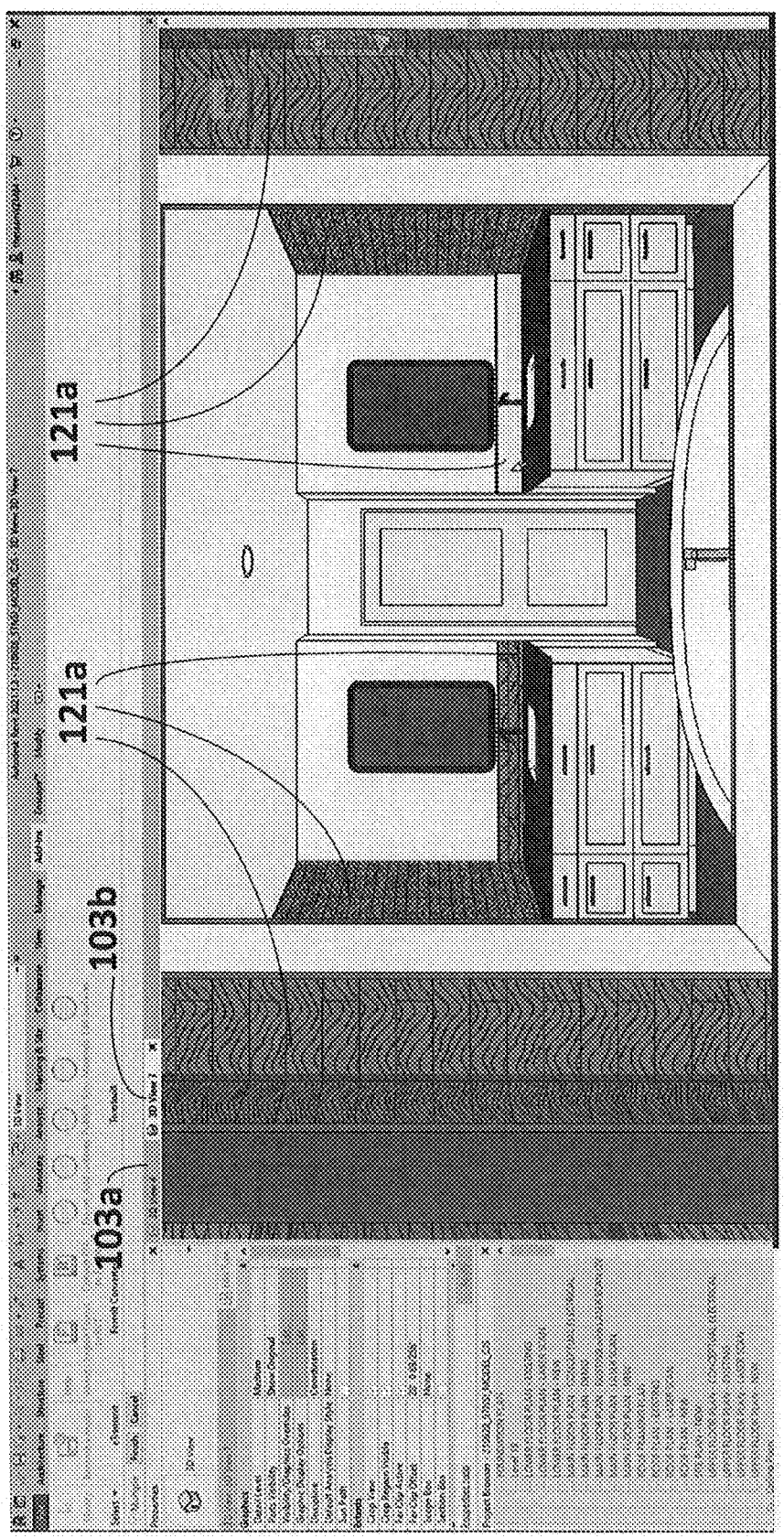

FIGS. 8C and 8D show examples of GUI screens of the designer side plug-in of the smart render design tool for selecting surfaces (e.g., walls with tile, full screen and zoomed-in views) for a second 3D camera view, according to some example embodiments. Referring to FIGS. 7, 8C, and 8D, the designer can also repeat this process for different camera view(s) 103. As shown in FIG. 8C, the designer may select surfaces 121*a* for a second created 3D camera view 103*b* (e.g., tile walls). As shown in FIG. 8D (close up/zoomed in), the designer may also select surfaces 121*a* for the second created 3D camera view 103*b* (e.g., tile walls).

Figure 10:
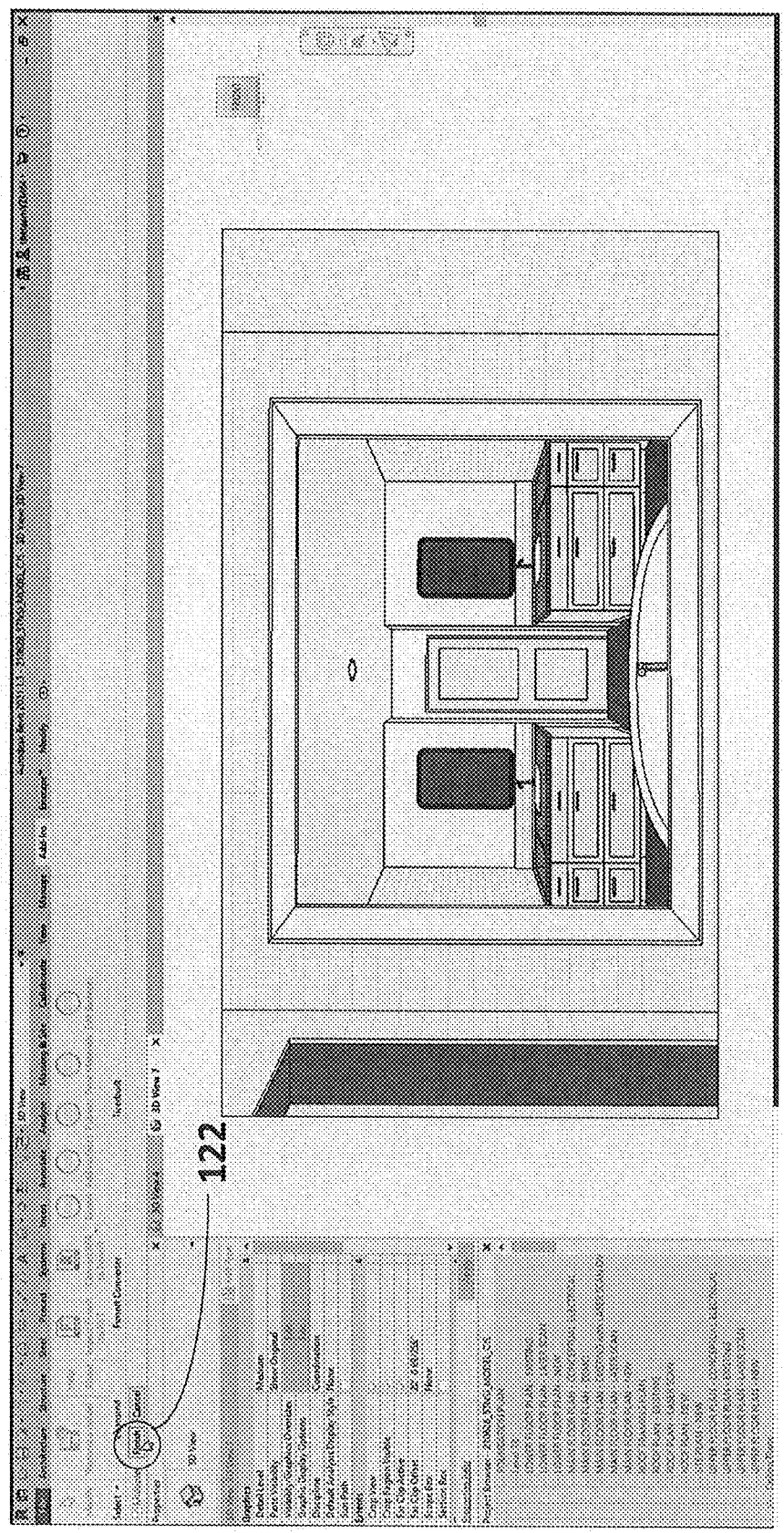
FIG. 10 shows a "Finish" button of an example GUI screen of the designer side plug-in of the smart render design tool, according to some example embodiments.

FIG. 10 shows a "Finish" button of an example GUI screen of the designer side plug-in of the smart render design tool, according to some example embodiments. Referring to FIGS. 7 and 10, once the designer is finished selecting all desired surfaces 121*a* to add to the model, the designer will click the "Finish" button 122 (as shown at (1) in FIG. 7). This will cause a "materials selection" pop-up window 123 to be displayed, as shown in FIGS. 7 and 11.

FIG. 11 shows example GUI screens of the designer side plug-in of the smart render design tool for selecting corresponding materials for the selected surface(s) and saving the desired materials selections, according to some example embodiments. Referring to FIGS. 7 and 11, then for each selected surface 121 (e.g., 121*a* in FIGS. 8A-8C, 121*b* in FIG. 9A, 121*c* in FIG. 9B), the designer can use the search field 124 and the check boxes 125 to select any corresponding materials 126 that client will be able to choose from (e.g., subway tile, marble, etc.) for the respective surface 121 (e.g., 121*a*, 121*b*, 121*c*, etc. in FIGS. 8-9) (as shown at (2) in FIG. 7). The "materials selection" feature enables the designer to select any colors, tiles, stones, woods, laminates, textures, patterns, appliance models, etc. for which the designer want the client to be able to choose for each respective surface.

The currently existing way to apply specific materials in the design software program 101 (e.g., REVIT or similar alternative) is cumbersome. For example, it can take several "clicks" (e.g., up to nine or more, generally) through a number of different dialog windows to create, duplicate, or change a material in the design software program 101. The designer side plug-in 100 of the smart render design tool provides a convenient way to navigate and select materials using the search field 124 and, as a result of a keyword search, displaying a list of check boxes 125 with associated materials 126 corresponding to the keyword(s), for example, as shown in FIGS. 7 and 11. Thus, designer side plug-in 100 of the smart render design tool provides a streamlined technique for designers, to click multiple materials in a single dialog box.

A library of available materials 126 may be stored in a database. For example, a snapshot of tile in a tile shop can be used to create a custom material in the design software program 101 and displayed along with pricing in a designer side GUI screen of the designer side plug-in 100. The client can send the designer inspiration photos that can be used in selecting materials for corresponding surfaces. Each of the materials 126 may have certain attributes associated with respective identifiers and/or identity data (e.g., refer to FIGS. 7 and 11), including costs (e.g., per unit, per box or package, per dimensions/area/sq. ft.). The materials 126 for the surfaces 121 can be tied into supplier chains (e.g., with lead times based on supply) and thereby assist with placing orders. This can reduce change orders by about 30%.

In some example embodiments, the identifiers and/or identity data associated with selected surfaces 121 and corresponding materials 126 (e.g., dimensions/area/sq. ft. required and costs for required quantities of materials) can be used to generate a "shopping list" of client-selected materials, including quantities or square feet and per unit and/or total prices for the client's desired selections. The shopping list function will be further described below with reference to FIG. 17C.

Referring again to FIGS. 7 and 11, when finished selecting all desired materials 126 for the selected surface(s) 121 (e.g., 121*a*, 121*b*, 121*c*, etc.) using the search field 124 and check boxes 125, the designer can then click the "Save selection" button 127 (as shown at (3) in FIG. 7) and close the window (e.g., to return to the camera views in the design software program 101). The process described above with reference to FIGS. 8A-8D, 10, and 11 for selecting surface(s) such as the surface 121*a* (e.g., walls with tile) can then be repeated for different surfaces 121*b*, 121*c*, etc. (e.g., counters, cabinets, etc.) to select additional corresponding materials 126, as desired, as described below with reference to FIGS. 9A and 9B, respectively.

Figure 9A:
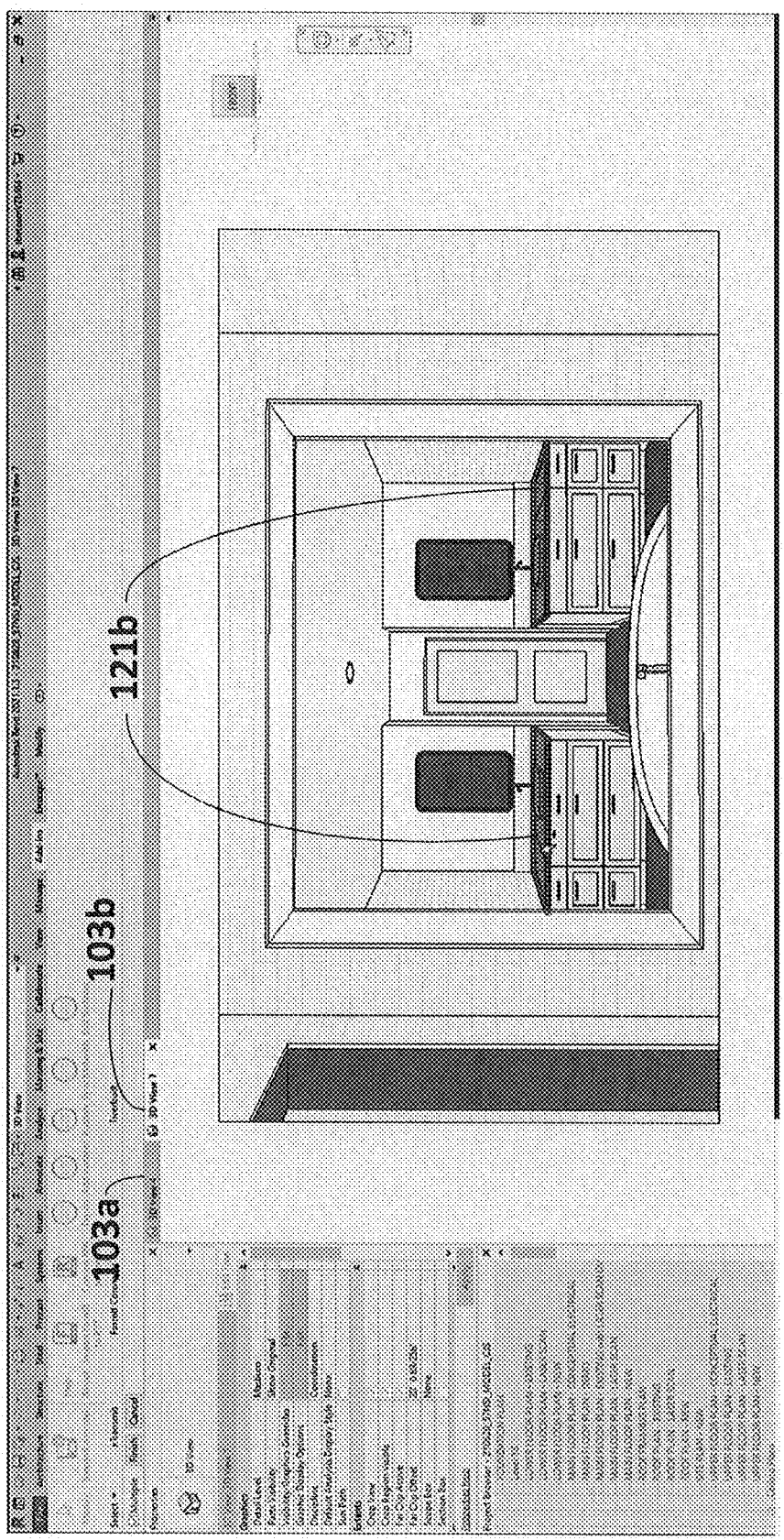
FIGS. 9A and 9B show examples of GUI screens of the designer side plug-in of the smart render design tool for selecting additional surfaces (e.g., countertops, cabinets) for which corresponding materials will be selected for the client, according to some example embodiments.
Figure 9B:
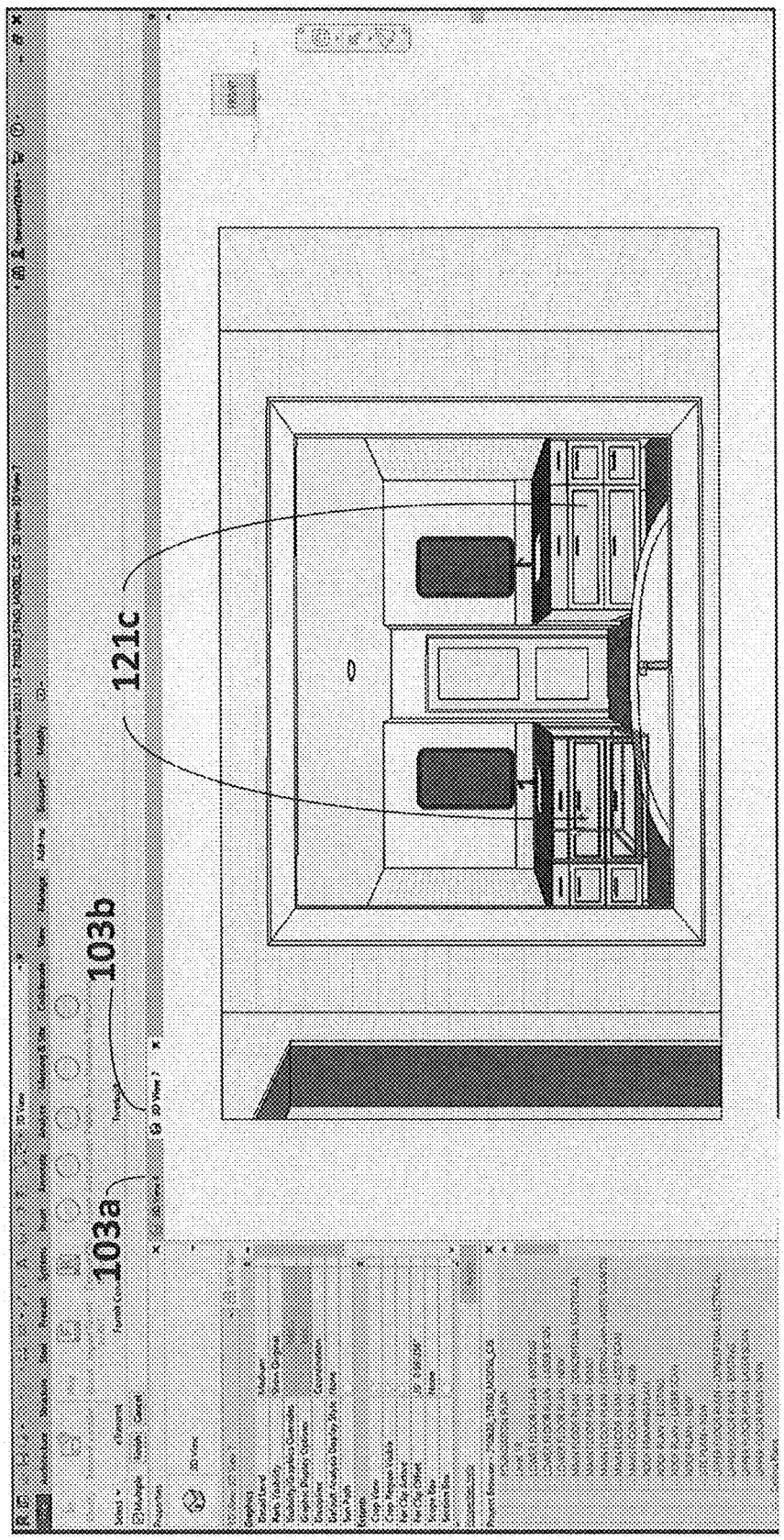

FIGS. 9A and 9B show examples of GUI screens of the designer side plug-in of the smart render design tool for selecting additional surfaces (e.g., countertops, cabinets) for which corresponding materials will be selected for the client, according to some example embodiments. As shown in FIG. 9A, the designer can also continue to select additional surface(s) 121, such as surface 121*b* (e.g., counters), for the created 3D camera views 103, and repeat materials selections 126 (e.g., different kinds of stone materials, colors, etc. for countertops). As shown in FIG. 9B, the designer can also continue to select additional surface(s) 121, such as surface 121*c* (e.g., cabinets), for the created 3D camera views 103, and repeat materials selections 126 (e.g., different kinds of wood materials, colors, etc. for cabinets). Similarly, the designer can select different kinds of paint and colors for walls, and/or various other combinations of surfaces 121 and materials 126 (not shown in FIGS. 8-9). Once all of the desired surfaces 121 are selected and corresponding materials 126 selections are made by the designer, the designer will then need to publish the model to apply the selected surfaces 121 and corresponding materials 126 to the model, as described below with reference to FIG. 12.

Figure 12A:
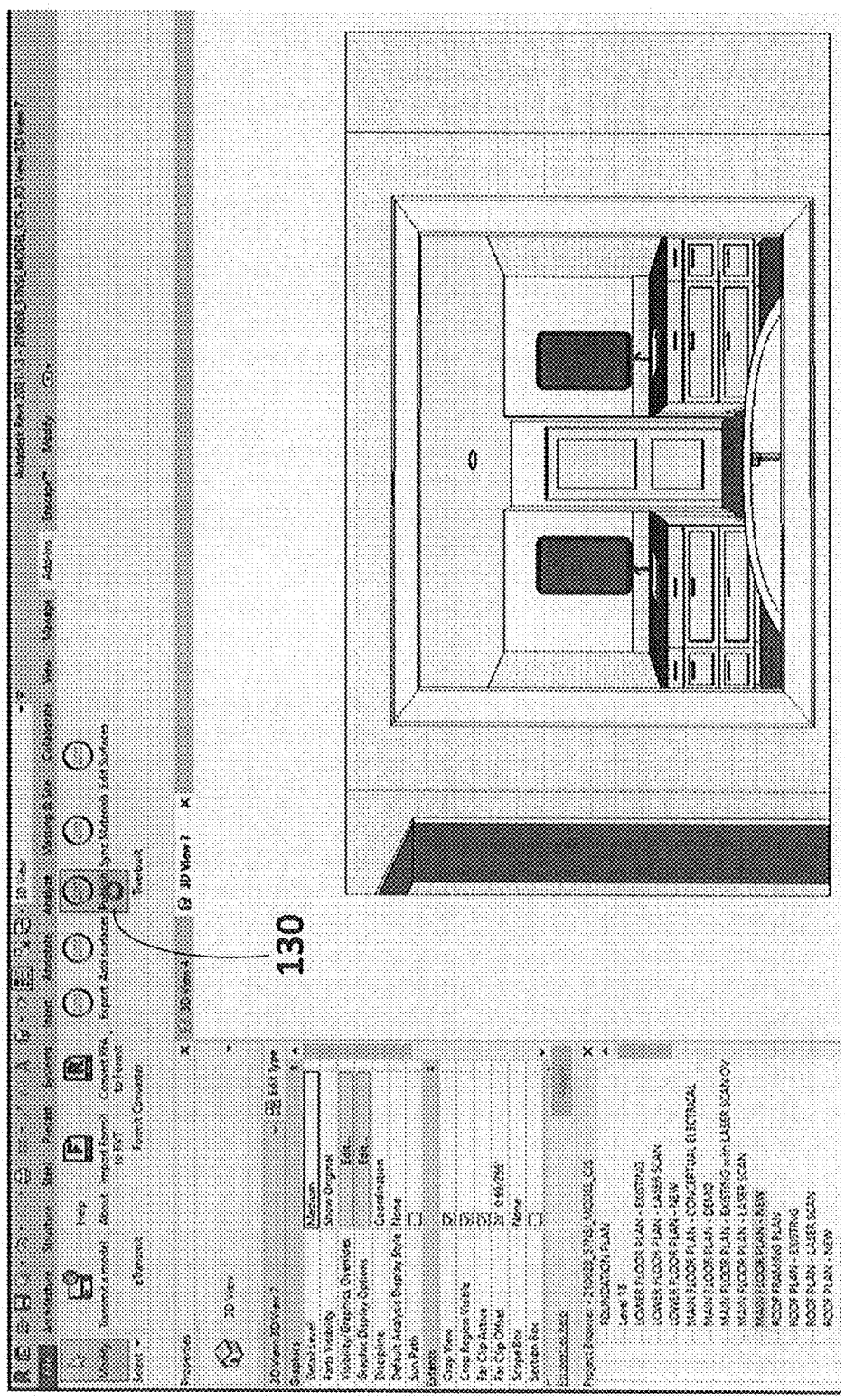
FIG. 12A shows a "Publish" button of an example GUI screen of the designer side plug-in of the smart render design tool, according to some example embodiments.

FIG. 12A shows a "Publish" button of the designer side GUI screen of the designer side plug-in of the smart render design tool, according to some example embodiments. Whenever a new surface 121 is added to the model, an existing surface 121 is removed from the model, or a surface 121 is otherwise modified (e.g., change selected surfaces 121 and/or corresponding materials 126), the model will need to be published (or re-published again after an edit/update to surface(s) and/or material selection(s) by the designer). The designer will click on the "Publish" button 130 to start the process (this may take a few minutes), as shown in FIG. 12A. The model can be updated to add surfaces 121 and corresponding materials 126 and published once (e.g., all rooms and floor levels at the same time, all surface/material choices during various stages of construction, etc.), for example. Additionally or alternatively, the model can be updated and published multiple times throughout the design process in real-time (e.g., different rooms or floors at a time, different surface/material choices and various stages of construction, etc.). This can help the client and designer quickly adapt to changing material availability, lead times, pricing, design themes, etc.

Figure 12B:
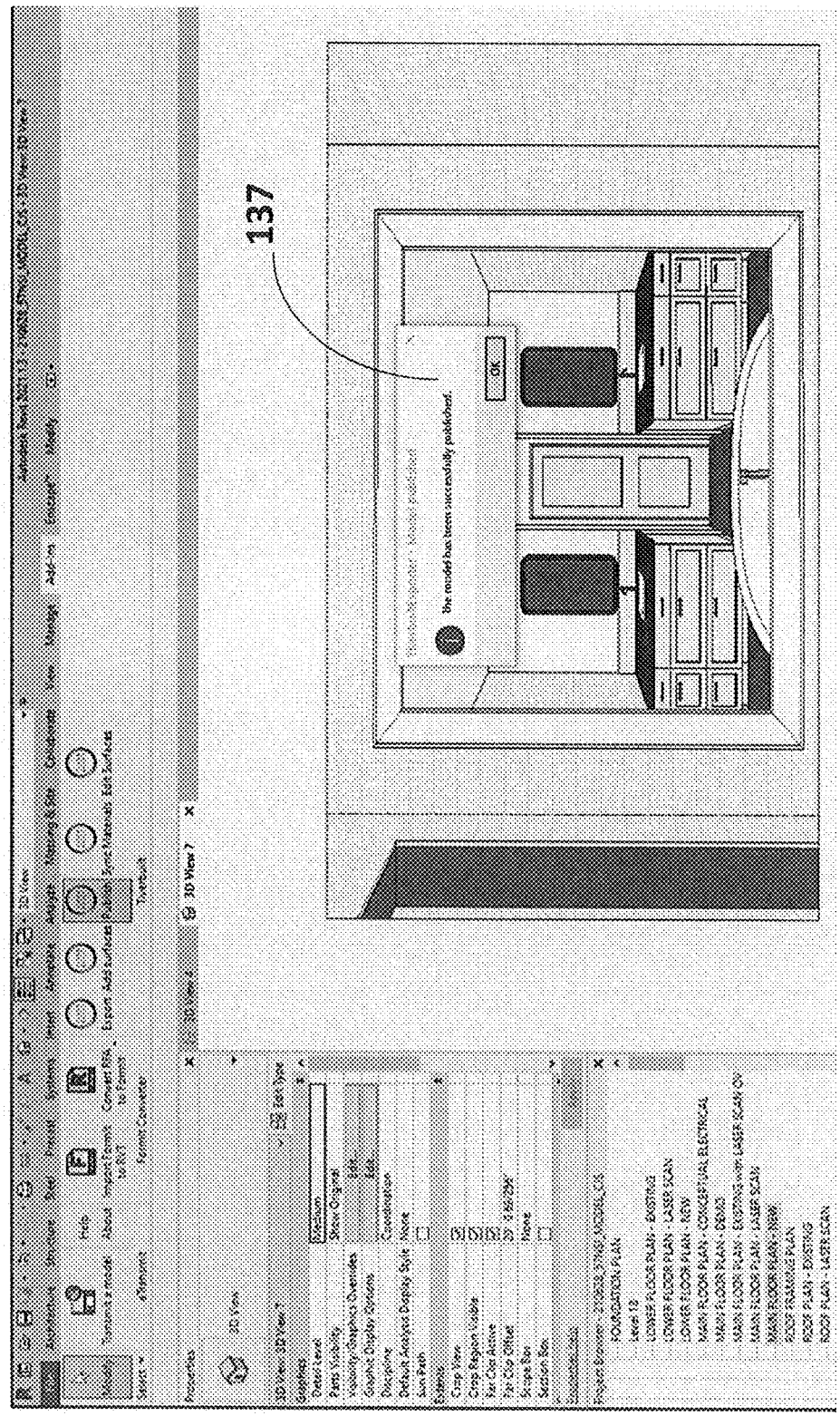
FIG. 12B shows an example GUI screen of the designer side plug-in of the smart render design tool displaying a notification that the model has been published successfully.

FIG. 12B shows an example GUI screen of the designer side plug-in of the smart render design tool displaying a notification that the model has been published successfully. Once publication of the model is completed, a pop-up notification 137 indicating that "The model has been successfully published" will be displayed in the GUI screen of the design software program 101 (e.g., Revit), as shown in FIG. 12B.

Figure 13:
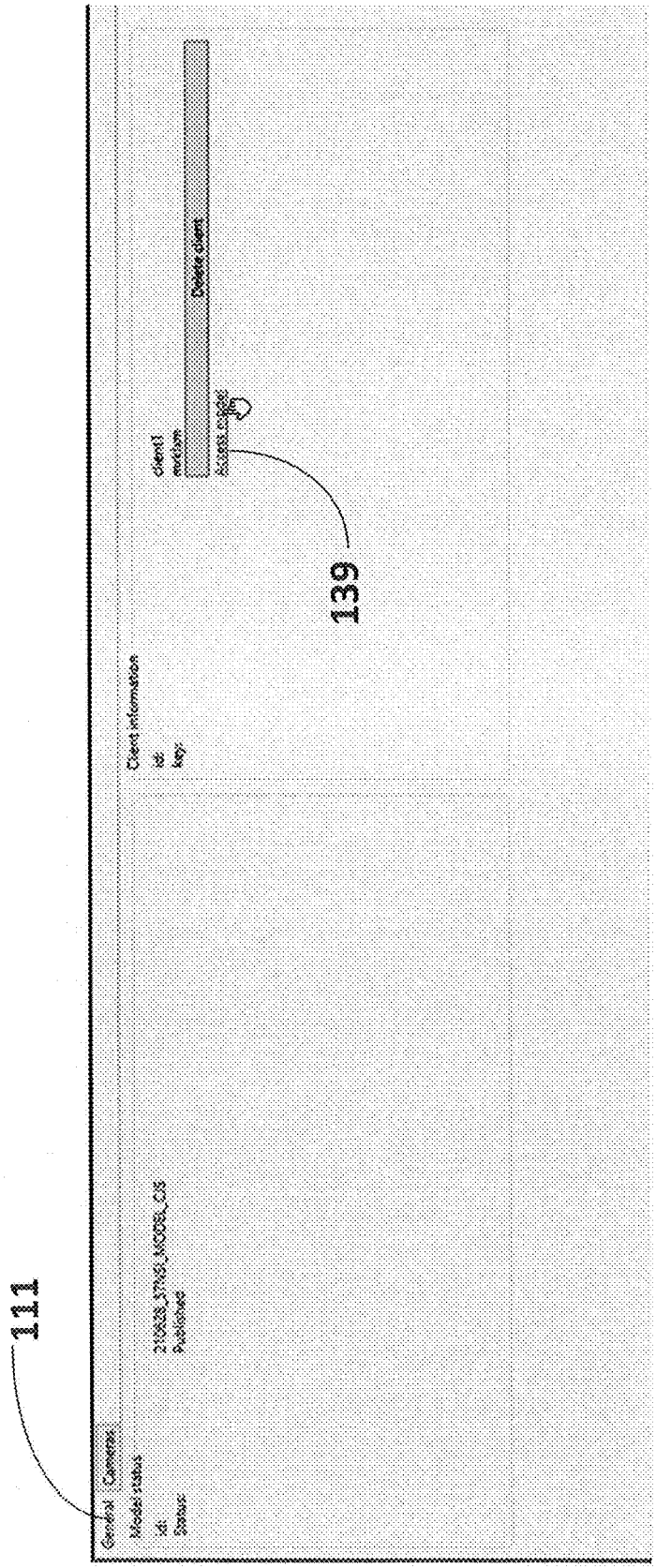
FIG. 13 shows an example GUI screen of the designer side plug-in of the smart render design tool including a link for accessing the published model using client credentials (id/key), according to some example embodiments.

When the model is published, the client can now be provided with access to the published model, as described below with reference to FIGS. 13-17C. FIG. 13 shows an example GUI screen of the designer side plug-in of the smart render design tool including a link for accessing the published model, according to some example embodiments. To access the published model (from the design software program side), the designer will click on the "Export" button 110, referring to FIG. 2. Again, the plug-in 100 will connect to the Database and open a pop-up window, where the "General" tab 111 is selected by default. The designer can then click on an "Access model" link 139, as shown in FIG. 13. In this example, this is a direct link (e.g., hyperlink) that takes the designer to the client side web-based portal 200 (welcome/login screen of FIGS. 1C and 14). This step for accessing the model may take the designer to the client side portal 200 directly from the design software program 101 in order to enter their client login credentials associated with the published model (e.g., client id 112, key/password 114, from FIG. 3 above). Additionally or alternatively, the client side portal 200 may also be accessed by the client (customer) via a link or URL (refer to FIG. 14) that is sent to the client in an email or text message, so that the client may access the client side portal 200 and make their materials 226 selections for the selected surfaces 221 of the published model.

Figure 14:
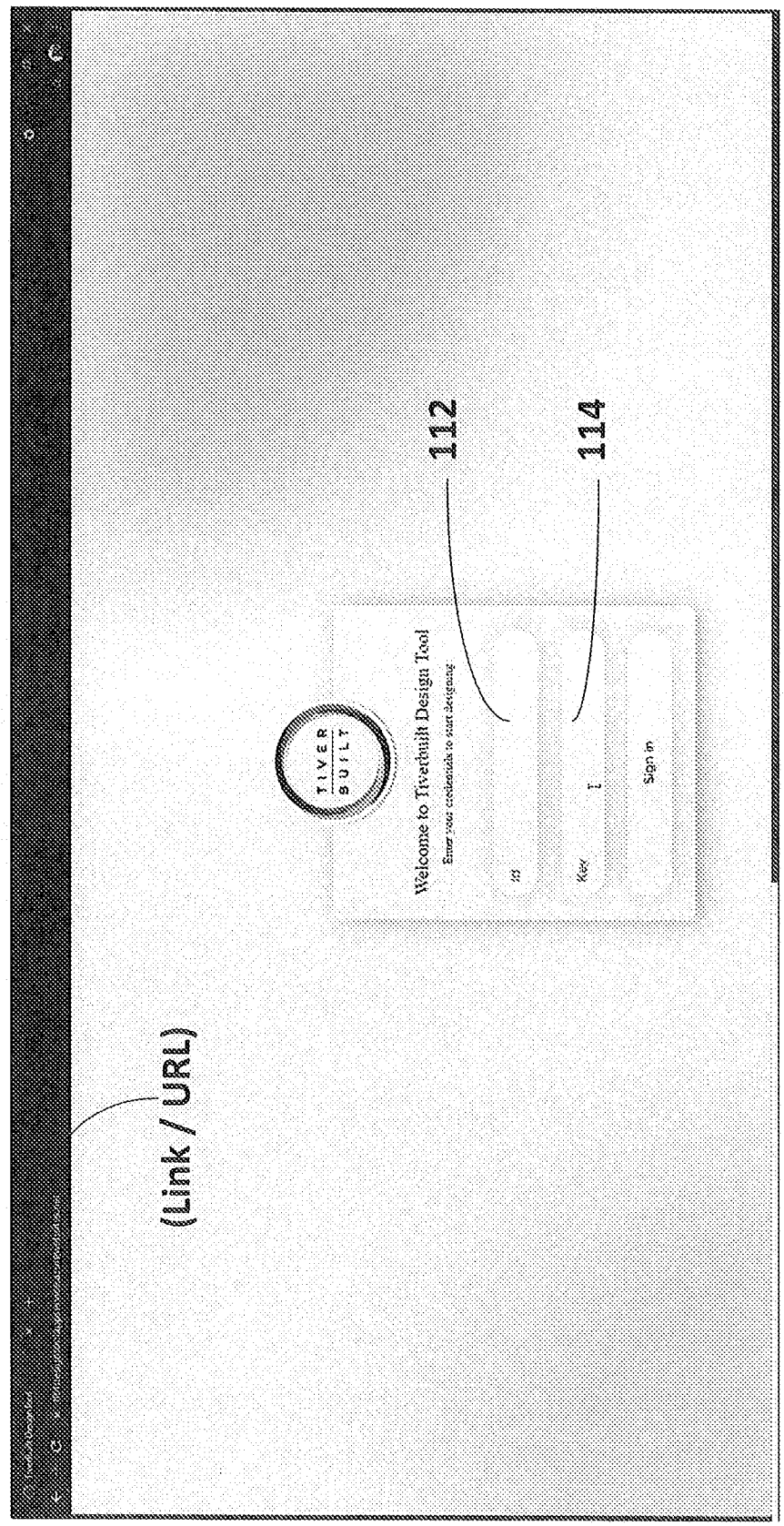
FIG. 14 shows an example GUI screen of the client side web-based portal for login to the smart render design tool, according to some example embodiments.

FIG. 14 shows an example GUI screen of the client side web-based portal for login to the smart render design tool, according to some example embodiments. The client can login to the client side web-based portal 200 by accessing a website address (e.g., URL) or clicking on a link (e.g., a hyperlink) associated therewith, and then input their client identifier (ID) 112 and password (key) 114 to gain access to view the model (e.g., using the client credentials that were previously generated as shown in FIG. 3). Although described above with reference to FIG. 13 from the designer side, the client will typically access the client side web-based portal 200 by entering a website address (URL) or clicking on a link (hyperlink) provided to the client by the designer via email, text message, or the like after the designer creates the login credentials 112, 114 for the client and associates them with the corresponding model for the client. Once the client successfully logs into the client side web-based portal 200, the client's electronic device will display various instructions on how to use the smart render design tool (e.g., how to explore model, select materials, and save selections), as described below with reference to FIGS. 15A-15D.

Figure 15A:
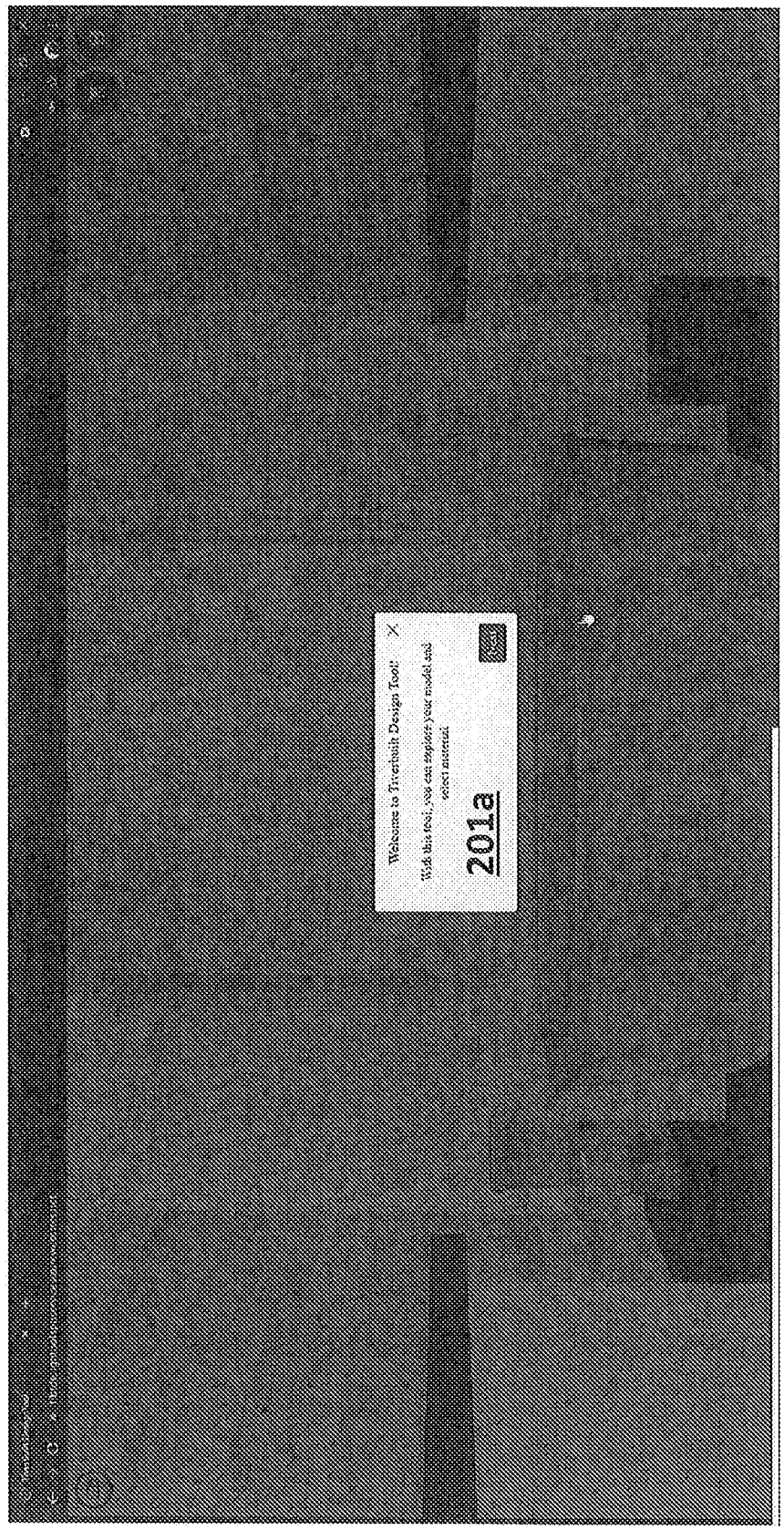
FIG. 15A shows a first instruction screen of a client side GUI screen of the client side web-based portal of the smart render design tool, according to some example embodiments.

FIG. 15A shows a first instruction screen of the client side GUI screen of the client side web-based portal of the smart render design tool, according to some example embodiments. Referring to FIG. 15A, the first instruction screen 201a welcomes the client to the smart render design tool and informs the client to explore the building model and select materials using the graphical user interface (GUI).

Figure 15B:
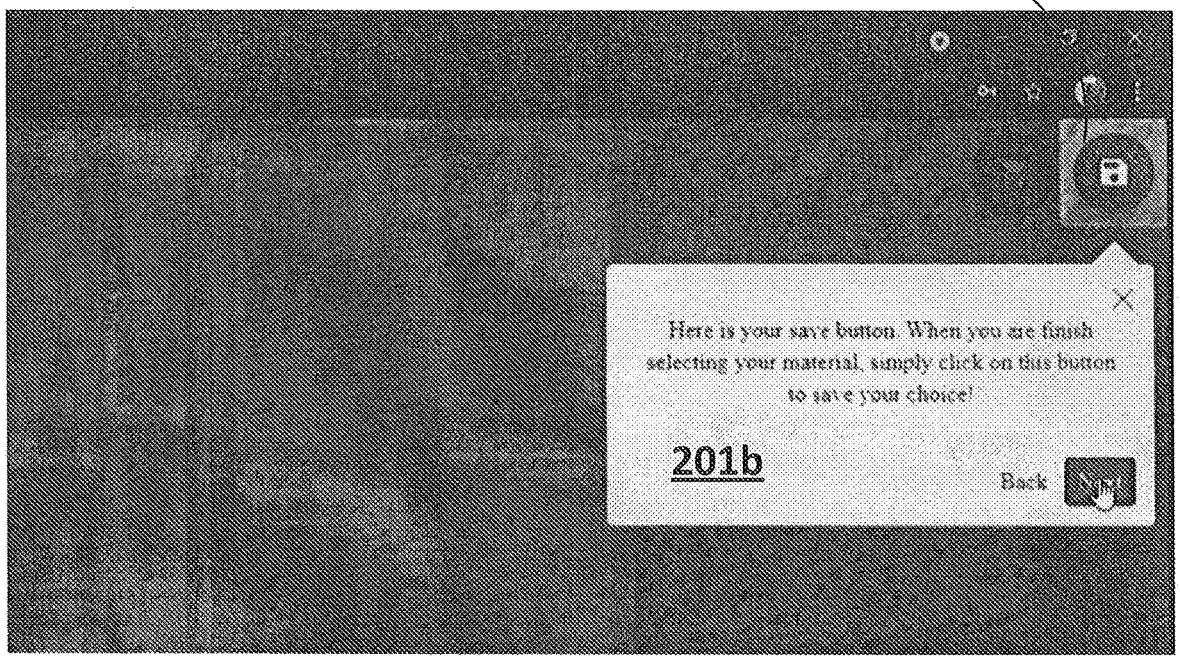
FIG. 15B shows a second instruction screen (saving materials selections) of the client side GUI screen of the client side web-based portal of the smart render design tool, according to some example embodiments.
Figure 15C:
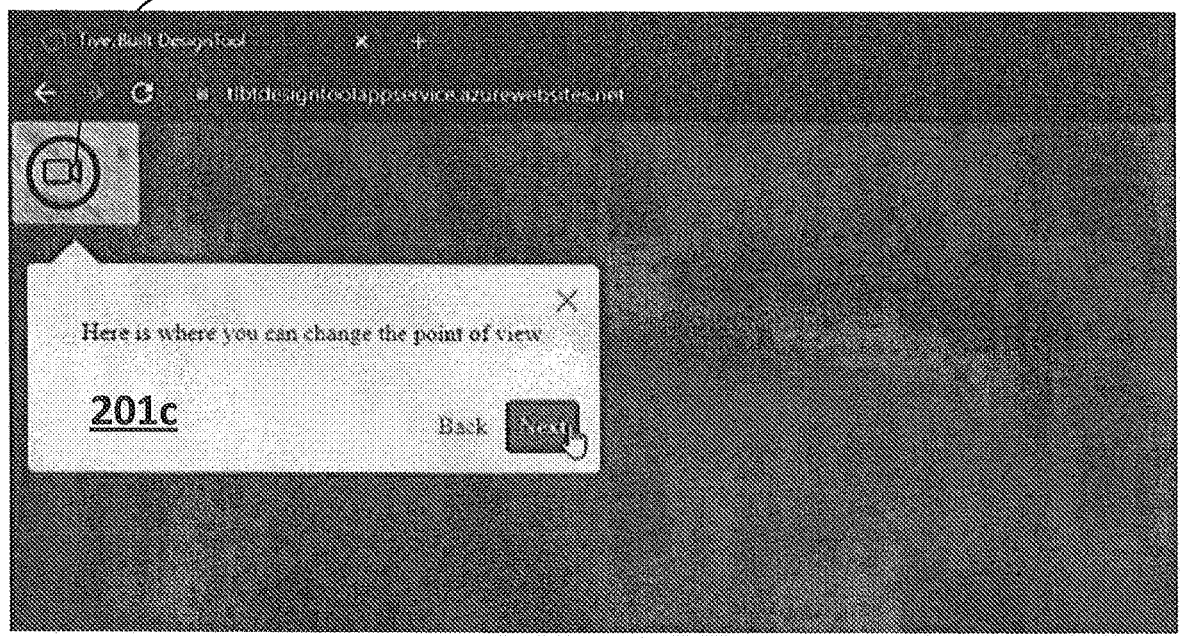
FIG. 15C shows a third instruction screen (changing camera views) of the client side GUI screen of the client side web-based portal of the smart render design tool, according to some example embodiments.

FIG. 15B shows a second instruction screen (saving materials selections) and FIG. 15C shows a third instruction screen (changing camera views) of the client side GUI screen of the client side web-based portal of the smart render design tool, according to some example embodiments. Referring to FIG. 15B, the second instruction screen 201b shows the client how to save material selections by clicking the "Save" button 207 (upper right corner of GUI, for example). Referring to the FIG. 15C, the third instruction screen 201c shows the client how to change the point of view (between the different created 3D camera views applied in the published model) by clicking the "Camera" button 203 (upper left corner of GUI, for example).

Figure 15D:
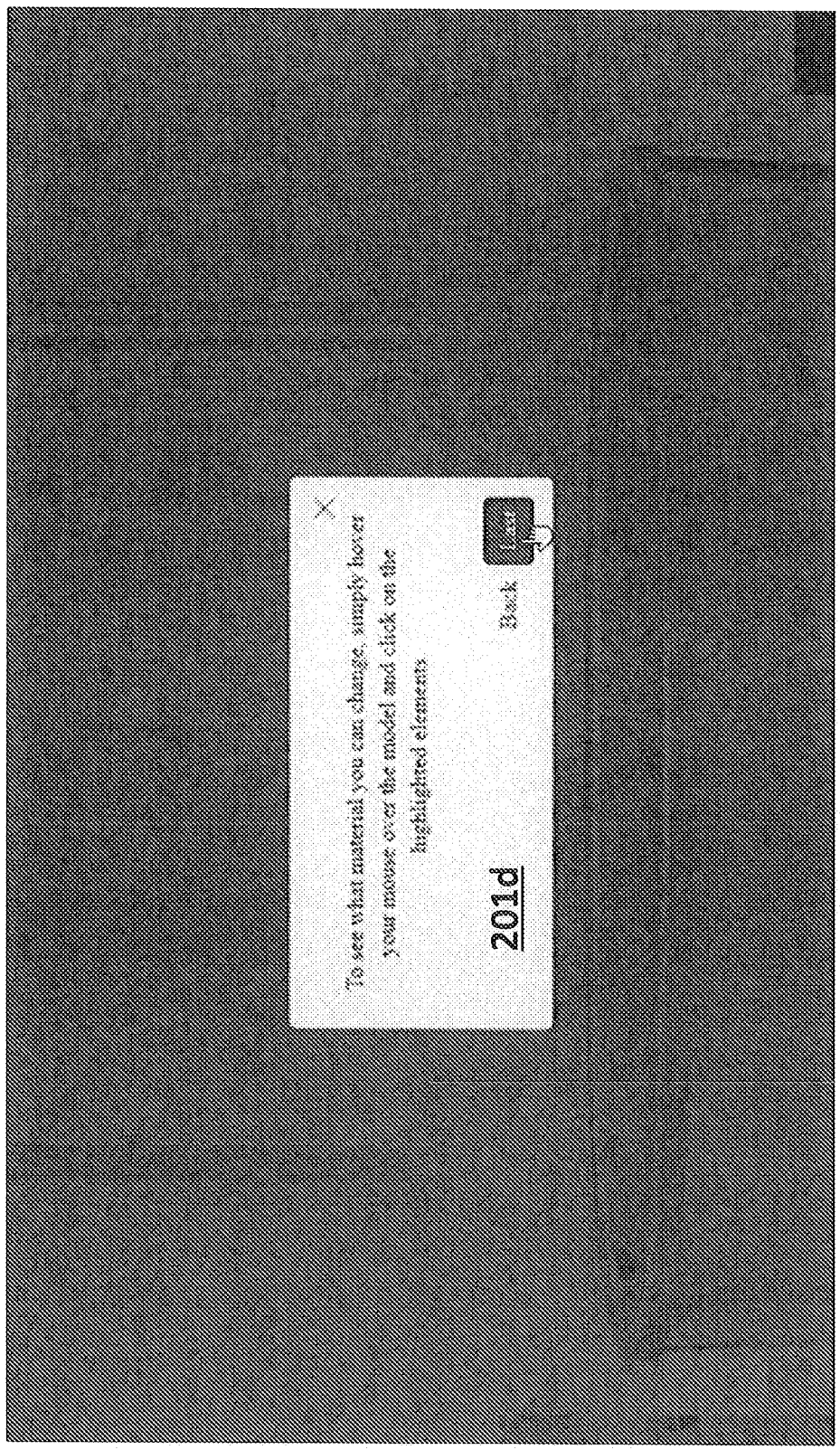
FIG. 15D shows a fourth instruction screen (changing materials) of the client side GUI screen of the client side web-based portal of the smart render design tool, according to some example embodiments.

FIG. 15D shows a fourth instruction screen (changing materials) of the client side web-based portal of the smart render design tool, according to some example embodiments. Referring to FIG. 15D, the fourth instruction screen 201d instructs the client to hover their mouse (pointer) over the model and click on the highlighted elements (surfaces) in order to see what materials the client can select and/or change. During operation, the client side portal 200 provides a high level of owner-controlled confirmation that allows the client to feel connected to their choices.

Once the client has progressed through the instruction screens 201a-201d of FIGS. 15A-15D, the client can then select surface(s) 221 and see different materials 226 (selectable options) that the designer has given them for each respective surface 221 (via the designer side GUI screens of the designer side plug-in 101 as described above), referring to FIGS. 16A-16I. These materials selections can be customized or curated for a given client based on various factors, including but not limited to, the client's budget, readily obtainable from the manufacturer or supplier, and looking good together aesthetically with other existing client selections and/or available selections, which can vary widely depending on personal preferences for each client and/or designer.

Figure 16A:
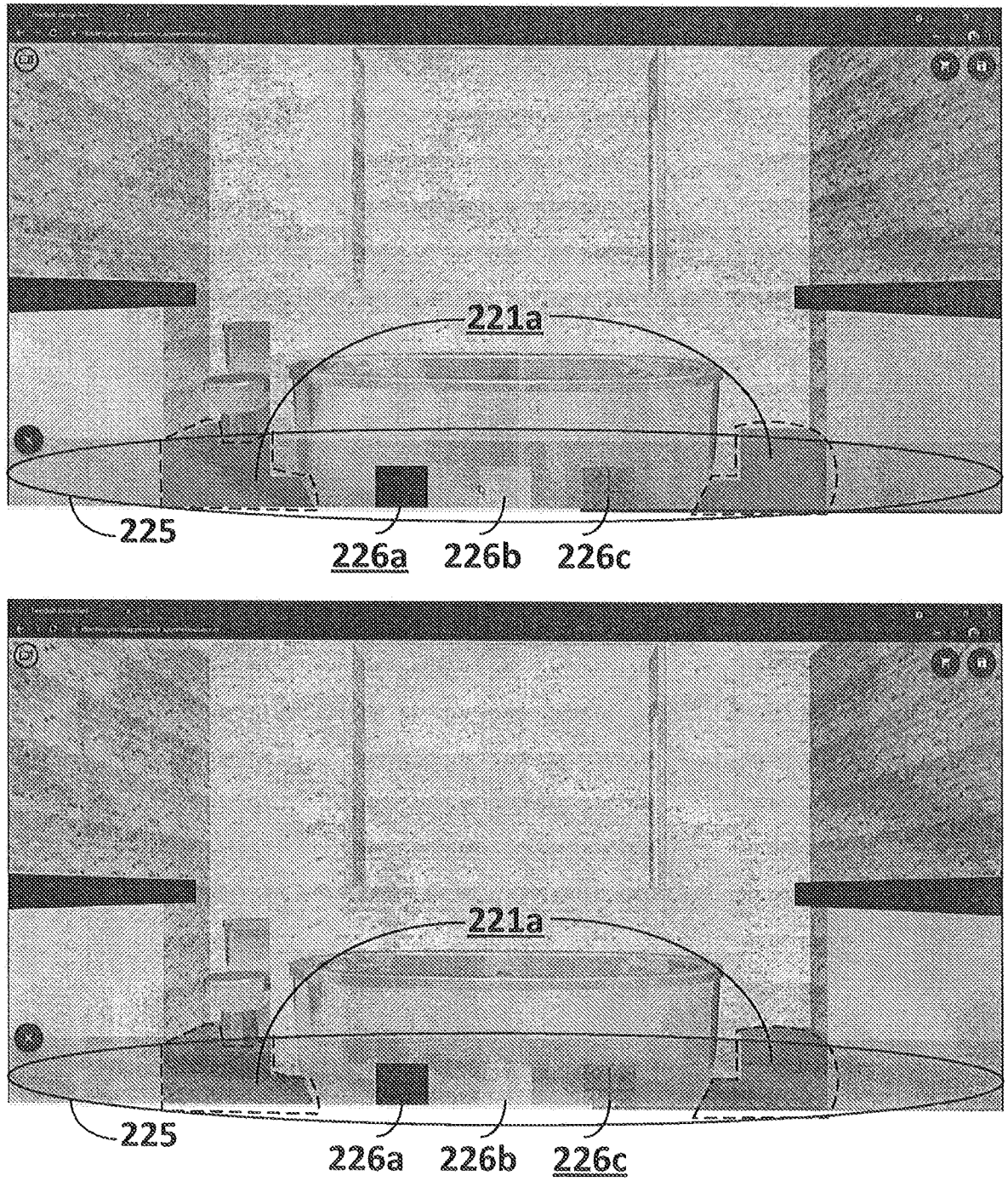

FIGS. 16A-16I show several example GUI screens of the client side web-based portal of the smart render design tool for navigating the model in different camera views, selecting different surface(s), selecting different materials for the surface(s), and changing camera views in association with the published model, according to some example embodiments;

Referring to the client side GUI screen of FIG. 16A, during operation of the client side web-based portal 200, the client can select a surface 221, such as surface 221a (e.g., flooring), and choose a corresponding material 226, such as material 226a (top part of FIG. 16A) or material 226c (bottom part of FIG. 16A) for a first 3D camera view 203a (e.g., floor tile 1 or floor tile 3, respectively).

Referring to the client side GUI screen of FIG. 16B, in order to change to a different created 3D camera view 203 associated with the published model, the client can click on the camera button 203 and select a second 3D camera view 203b (e.g., Camera 1), for example. The client can then select additional surfaces 221 and select and/or change corresponding materials 226 in the second 3D camera view 203b, as described below with reference to FIGS. 16C, 16D, and 16E.

Figure 16C:
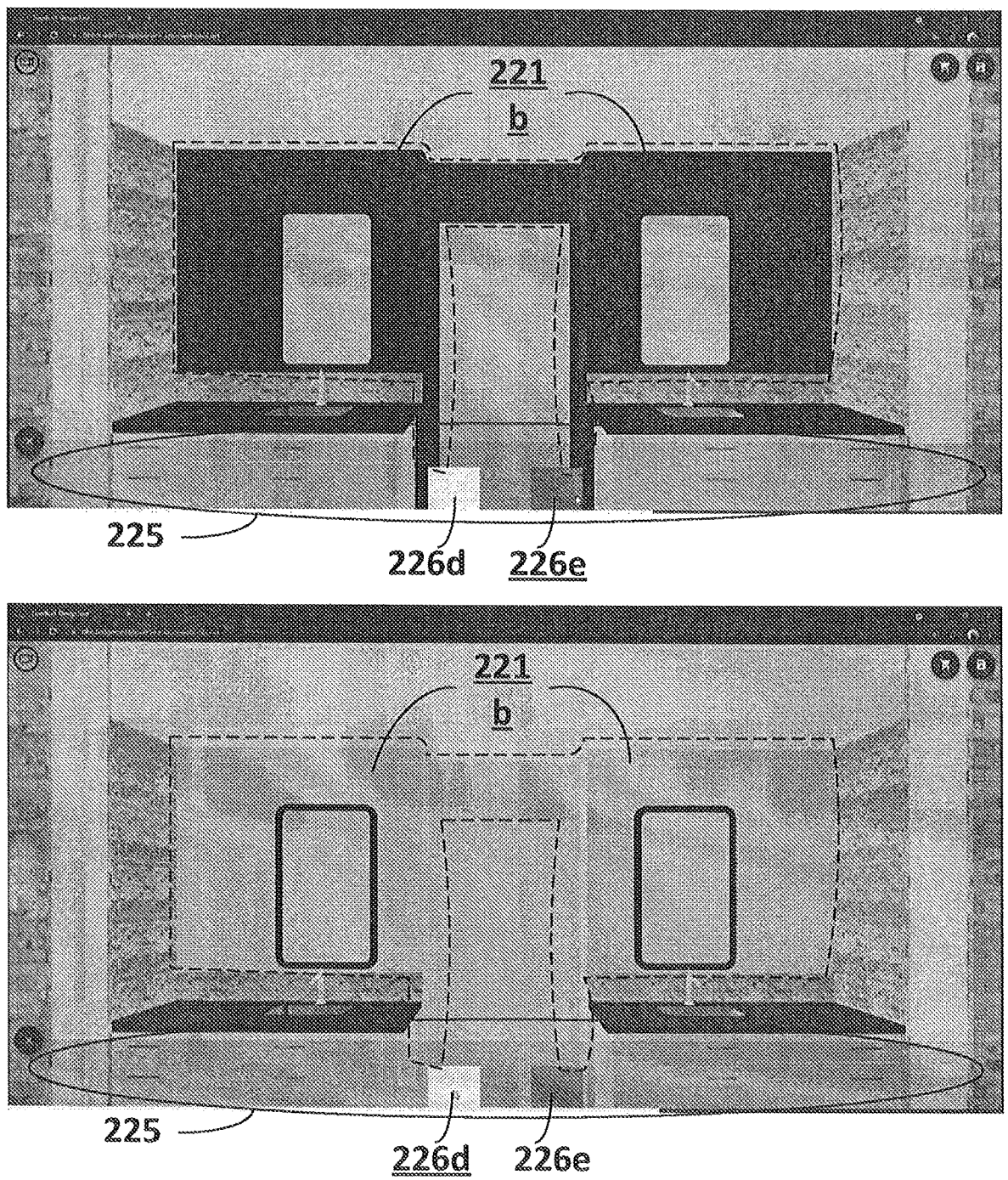

Referring to the client side GUI screen of FIG. 16C, the client can select another surface 221, such as surface 221b (e.g., painted walls), and choose a corresponding material 226, such as material 226e (top part of FIG. 16C) or material 226d (bottom part of FIG. 16C) for the second 3D camera view 203b (e.g., wall paint color 2 or wall paint color 1, respectively).

Figure 16D:
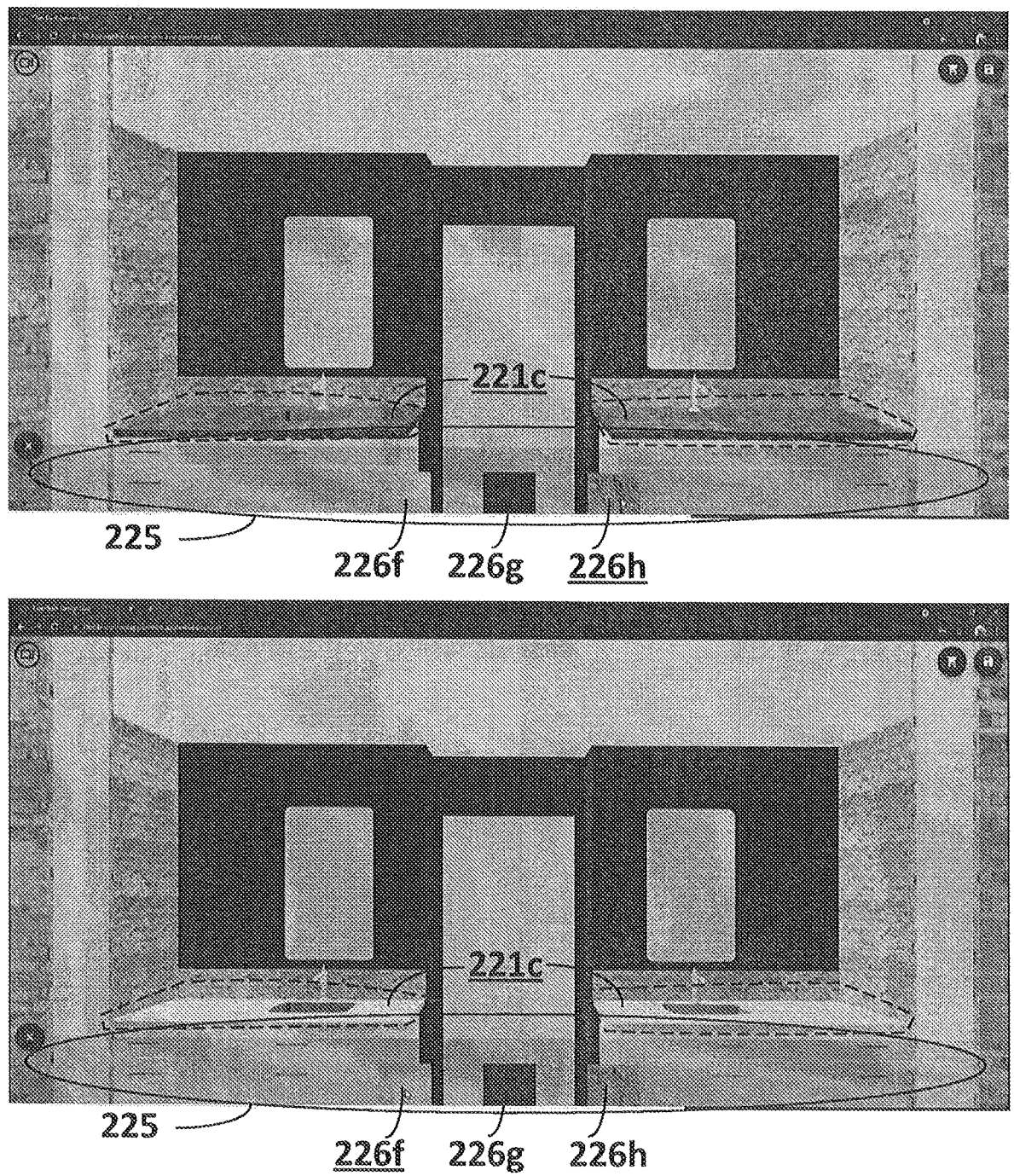

Referring to the client side GUI screen of FIG. 16D, the client can select another surface 221, such as surface 221c (e.g., counters), and choose a corresponding material 226, such as material 226h (top part of FIG. 16D) or material 226f (bottom part of FIG. 16D) for the second 3D camera view 203b (e.g., countertops 3 or countertops 1, respectively).

Figure 16E:
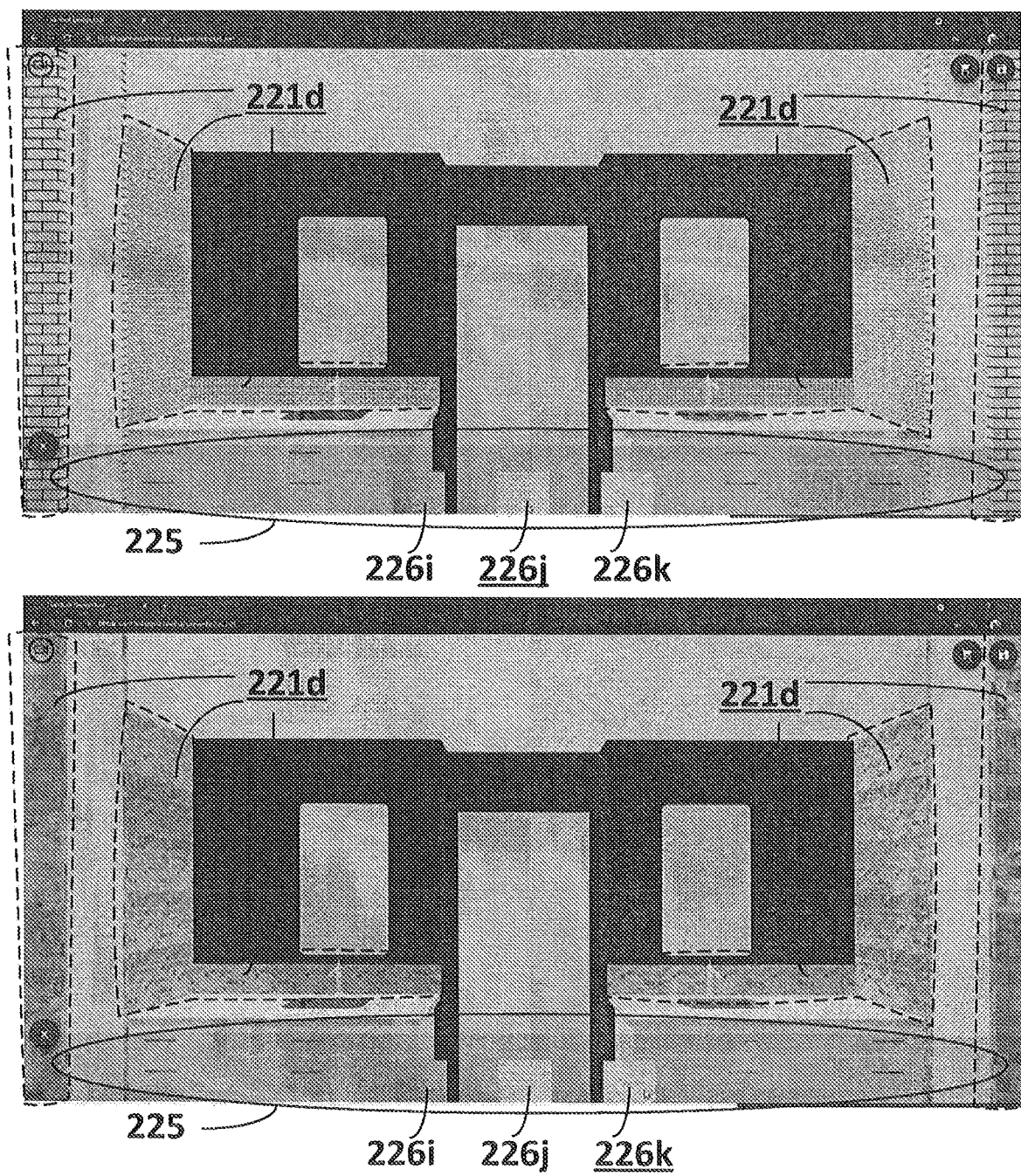

Referring the client side GUI screen of FIG. 16E, the client can select another surface 221, such as surface 221d (e.g., tiled walls), and choose a corresponding material 226, such as material 226j (top part of FIG. 16E) or material 226k (bottom part of FIG. 16E) for the second 3D camera view 203b (e.g., wall tile 2 or wall tile 3, respectively).

Figure 16F:
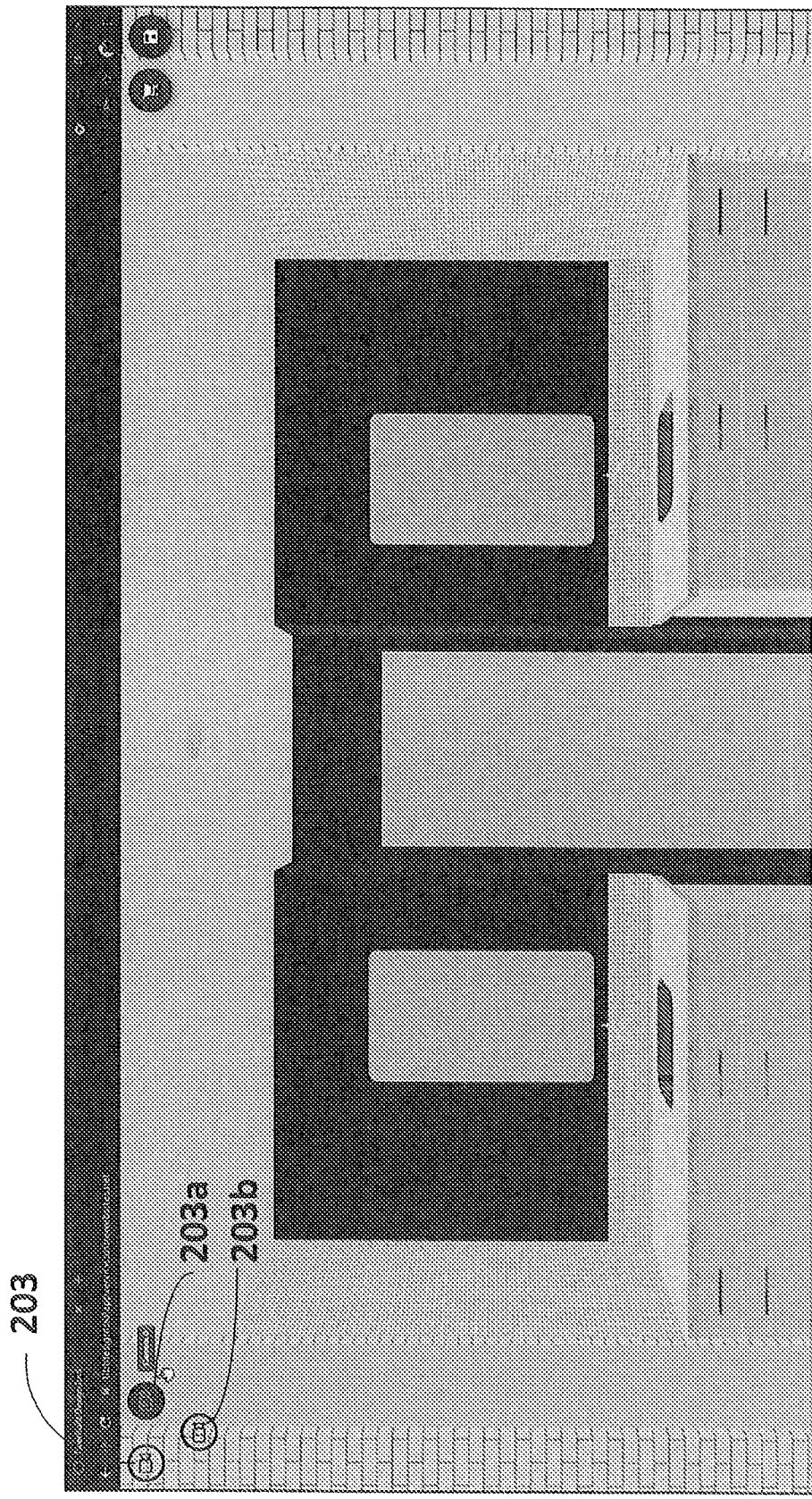

Referring to the client side GUI screen of FIG. 16F, in order to change to a different created 3D camera view 203 associated with the published model, the client can click on the camera button 203 and select the first 3D camera view 203a (e.g., Camera 0), for example.

As shown in the client side GUI screen of FIG. 16G, the materials 226 selections for the surfaces 221 (e.g., countertops 1, wall tile 2, etc.) that were made by the client in the second 3D camera view 203*b* (e.g., refer to FIGS. 16C, 16D, 16E) are now also displayed in the first 3D camera view 203*a* (Camera 0). The client can then select any surfaces 221 and select and/or change any corresponding materials 226 in the first 3D camera view 203*a*, as described below with reference to FIG. 16H.

Figure 16H:
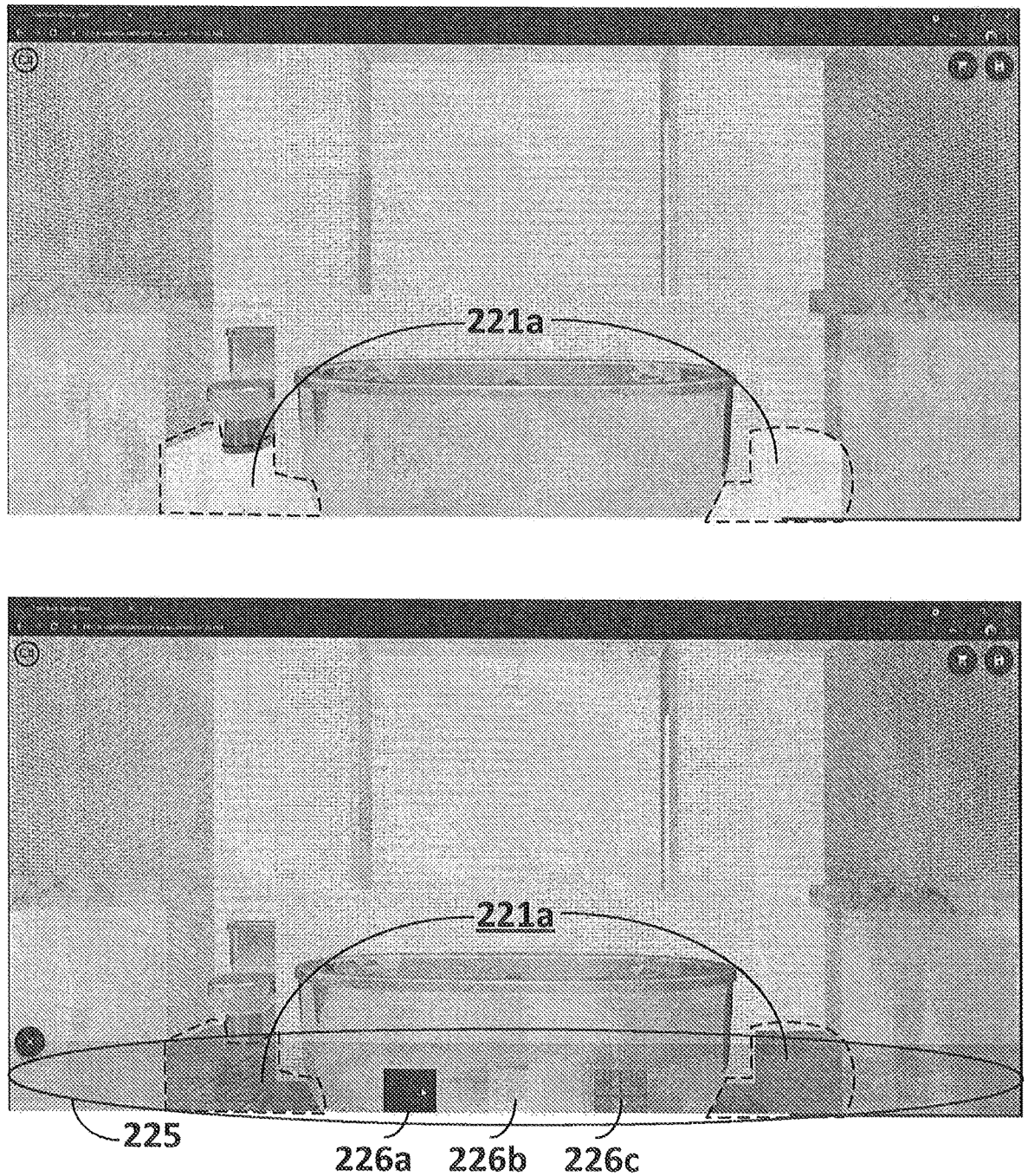

Referring to the client side GUI screen of FIG. 16H, the client can select a surface 221, such as surface 221*a* (top part of FIG. 16H) (e.g., floor), and then select or change materials 226*a*, 226*b*, 226*c* for that surface in the first 3D camera view 203*a* (e.g., floor tile 1, 2, or 3).

Referring to the client side GUI screen of FIG. 16I, then client can similarly return to the second 3D camera view 203*b* (with any materials 226 selections or changes made in Camera 0 now being displayed in Camera 1), select another surface 221, such as surface 221*e* (e.g., cabinets), and choose a corresponding material 226, such as material 226*m* (top part of FIG. 16I) or material 226*n* (bottom part of FIG. 16I) for the second 3D camera view 203*b* (e.g., cabinet wood/color 2 or cabinet wood/color 3, respectively).

The examples described above with reference to FIGS. 16A-16I are intended to be illustrative and are non-limiting in nature. Many different examples of navigating the various camera views 203, selecting the available surfaces 221, and selecting the desired materials 226 are also contemplated within the scope of the present disclosure. In addition, the specific number and/or types of surfaces and the specific number and/or types of materials are not limited to those described in connection with example embodiments herein. Thus, operation of the client side web-based portal 200 of the smart render design tool via the example client side GUI screens described herein provides the client with the ability to quickly and easily choose materials from a limited list for each respective surface of the published model, render and view these materials selections and changes in real time, to quickly and conveniently complete the building design process with assistance of the designer.

Figure 17A:
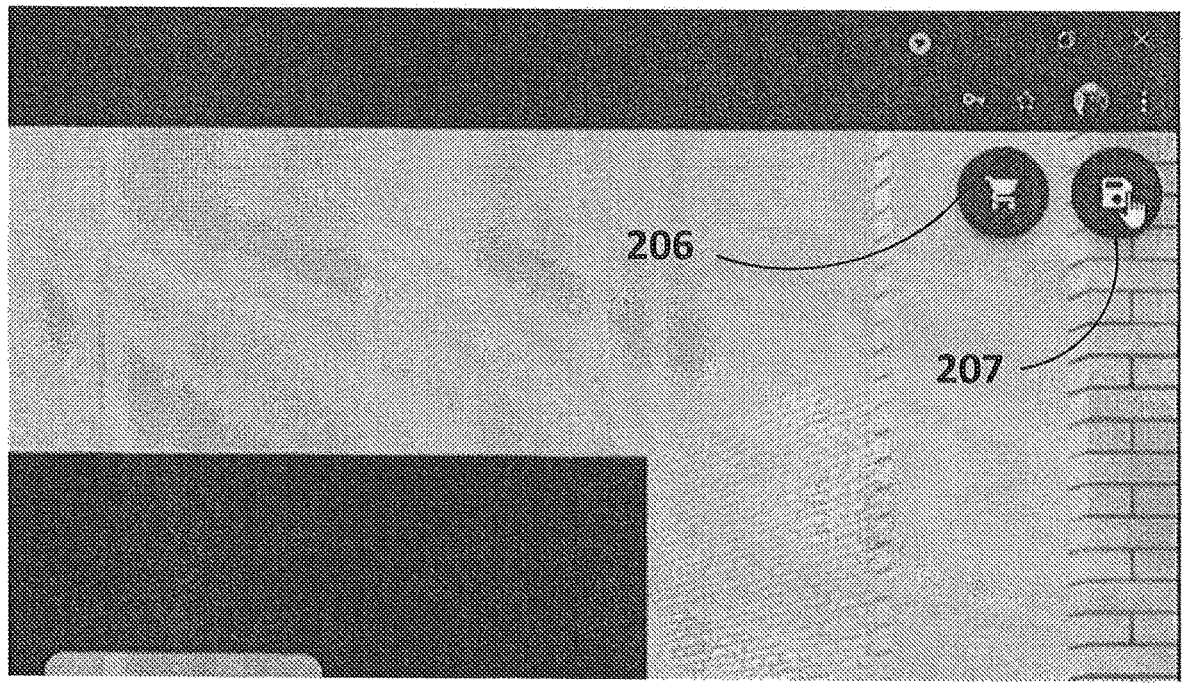
FIGS. 17A and 17B show example client side GUI screens of the client side web-based portal of the smart render design tool, including a "Save" button to save the desired materials selections of the client in association with the published model and displaying a notification that the material selection has been saved, according to some example embodiments.
Figure 17B:
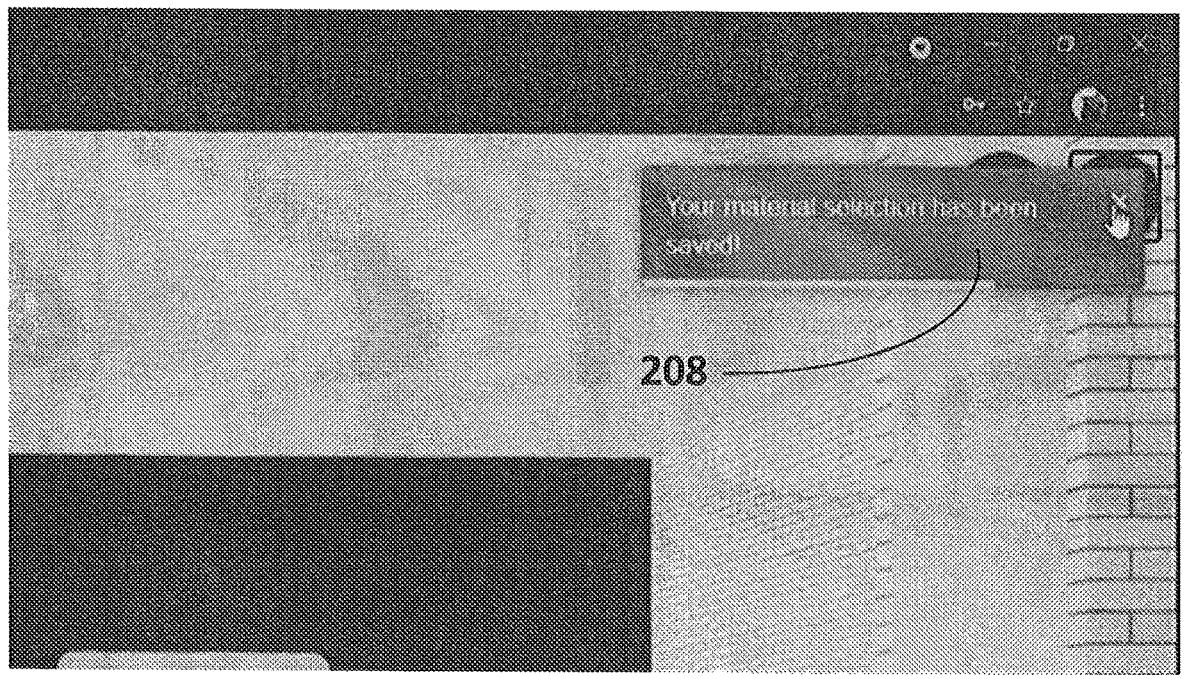

FIG. 17A shows example GUI screens of the client side web-based portal of the smart render design tool, including a "Save" button to save the desired materials selections of the client in association with the published model and displaying a notification that the material selection has been saved, according to some example embodiments. Once the client has selected all desired materials that they like and are satisfied with it, they will save their selections. The client will click the "Save" button 207 (upper right corner of GUI), as shown in FIG. 17A. As shown in FIG. 17B, the client side web-based portal 200 will then display a pop-up notification 208 indicating that "Your material selection has been saved!", in the GUI of client side portal 200.

Figure 17C:
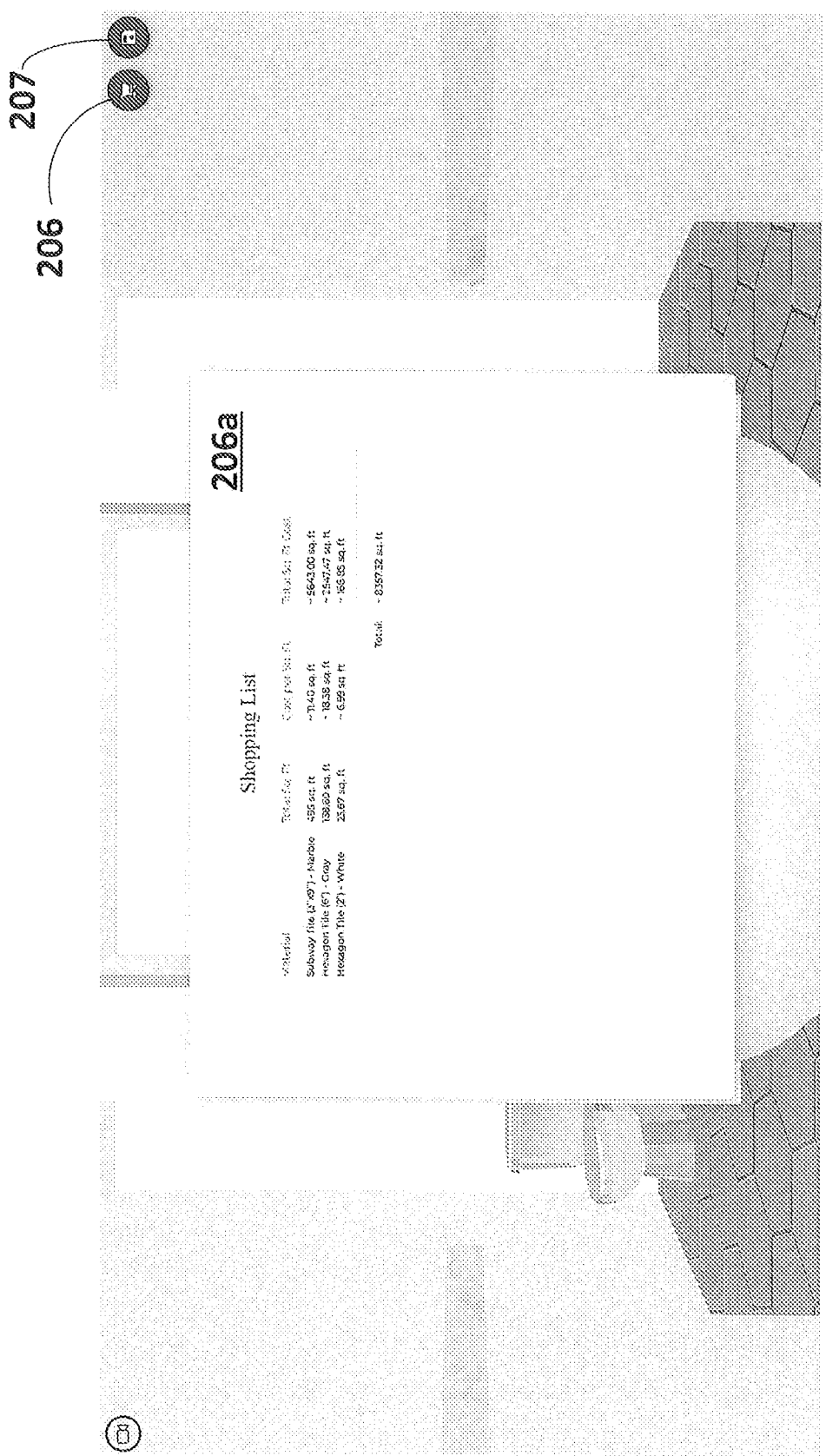
FIG. 17C shows an example client side GUI screen of the client side web-based portal of the smart render design tool, including a "Shopping Cart" button to generate a list of materials and corresponding quantities and/or costs based on the materials selections of the client, according to some example embodiments.

In some example embodiments, the client side GUI screen of the client side web-based portal 200 may also include a "Shopping Cart" button 206 (upper right corner of GUI in FIG. 17A). As shown in FIG. 17C, the client may click this button 206 to generate and display a "shopping list" (which may include a list of surfaces, materials for each surface, quantities, square footage, costs (per unit, itemized, and/or total), number of items, photos or images, etc.) based on the materials selections of the client. In the example client side GUI screen of the client side web-based portal of the smart render design tool shown in FIG. 17C, a shopping list 206*a* is then displayed in a pop-up window and includes columns for materials, total square feet, cost per square foot, and total square footage cost, along with a final total cost for all of the client's selected materials. However, some other example embodiments are not limited to this specific information, and some other quantity and pricing schemes may be used as appropriate or desired to enhance the accuracy of the materials ordering process for a given building design project.

After the client has selected surfaces 221 and saved their desired materials 226 selections for the selected surfaces 221 as described above with reference to FIGS. 16A-16I and 17A-17C, the selected materials 126 for the surfaces 121 of the designer side model (e.g., in the designer side plug-in 100) can be synchronized with the selected materials 226 for the surfaces 221 of the client side model (e.g., from the client side web-based portal 200).

Figure 18:
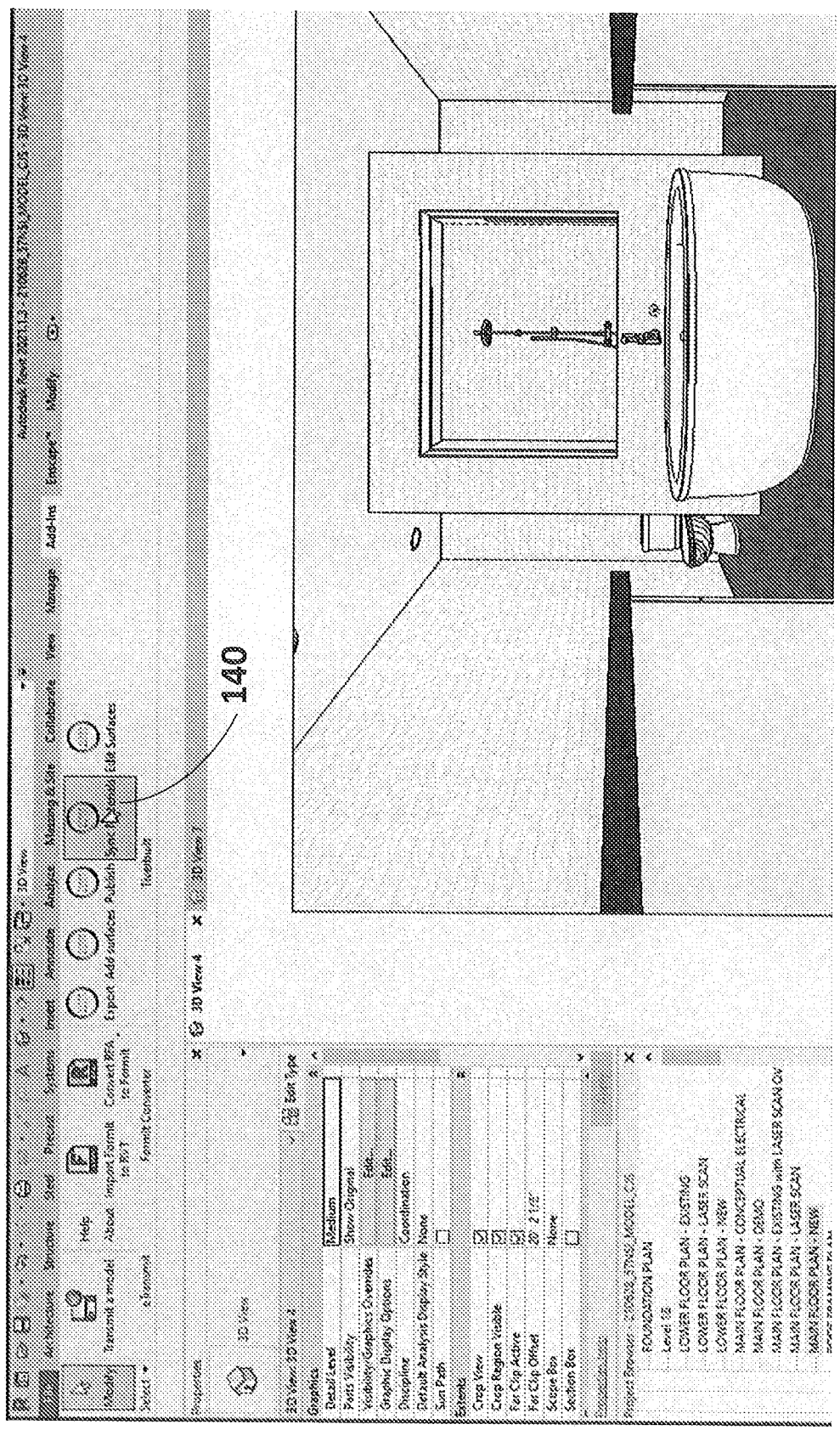
FIG. 18 shows a "Sync Materials" button of the designer side GUI screen of the designer side plug-in of the smart render design tool, according to some example embodiments.

FIG. 18 shows a "Sync Materials" button of the designer side GUI screen of the designer side plug-in of the smart render design tool, according to some example embodiments. Referring again to the designer side plug-in 100, once the client has selected and saved the material choices (via the GUI of the client side portal 200), the designer can click the "Sync materials" button 140. The synchronization function causes the model and all views to be automatically updated to reflect the materials selections of the client for the selected surfaces.

Figure 19A:
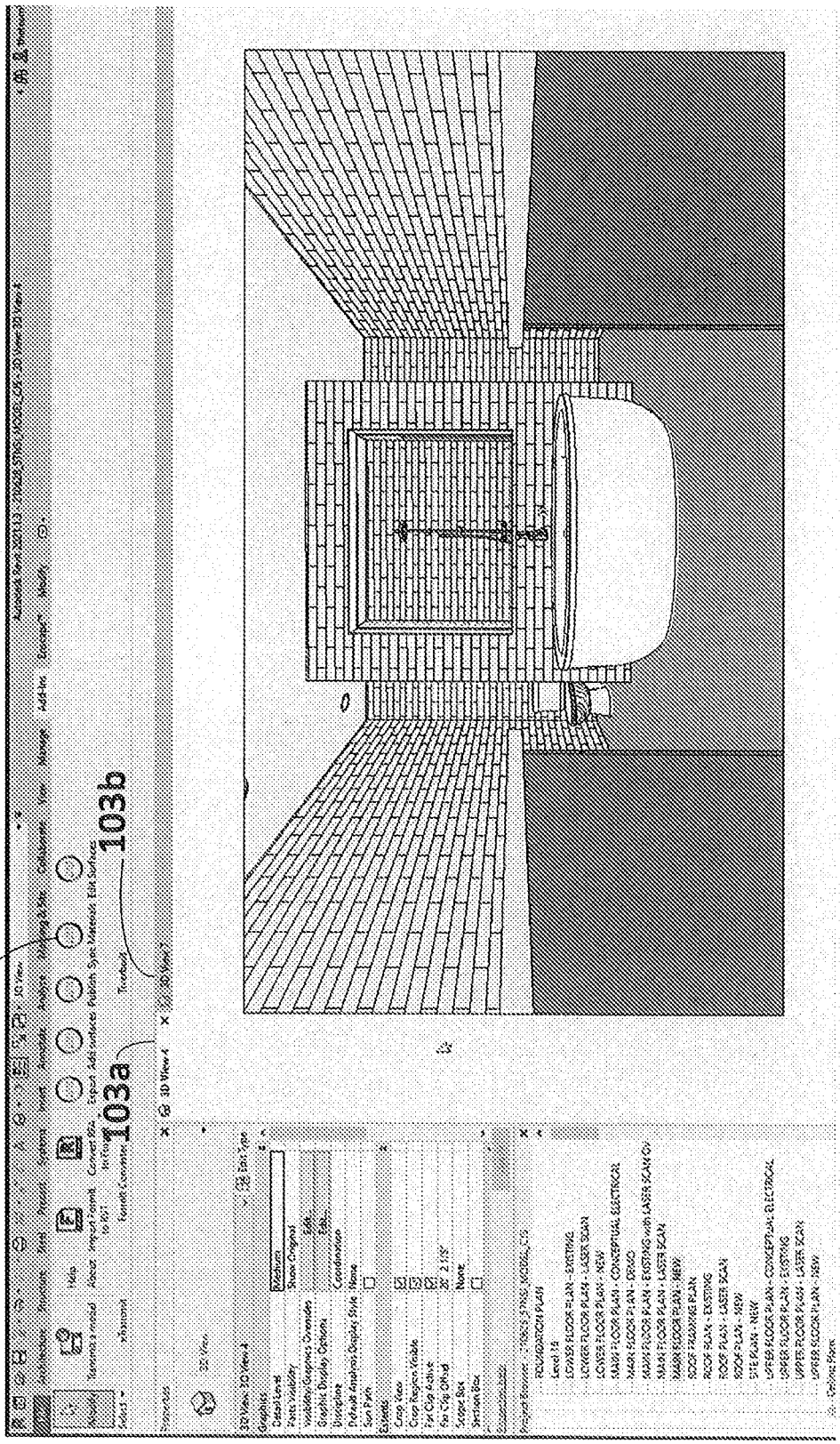
FIGS. 19A and 19B show example designer side GUI screens of the designer side plug-in of the smart render design tool for viewing the synchronized materials selections of the client for the selected surfaces in different camera views, according to some example embodiments.
Figure 19B:
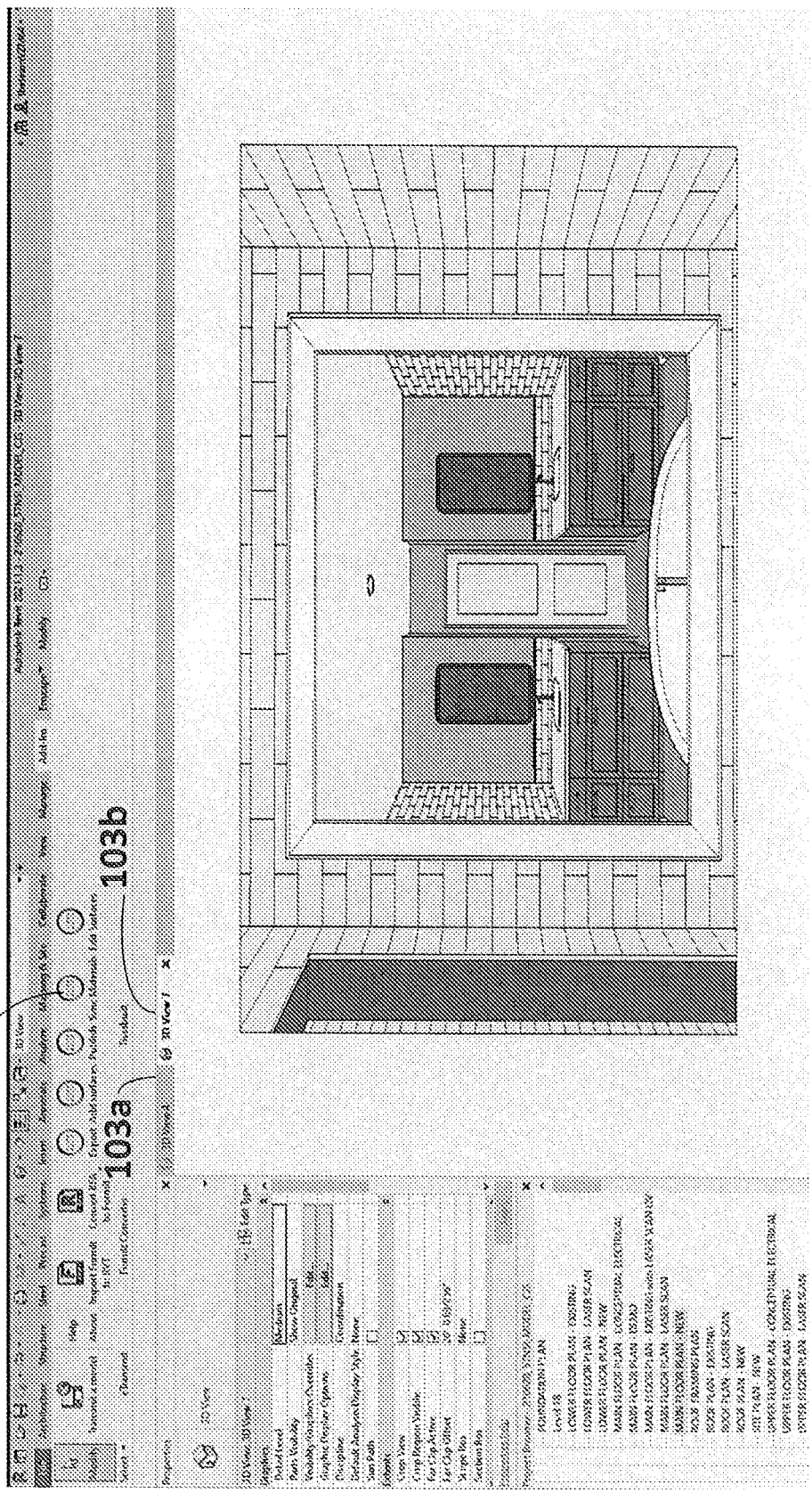

FIGS. 19A and 19B show example GUI screens of the designer side plug-in of the smart render design tool for viewing the synchronized materials selections of the client for the selected surfaces in different camera views, according to some example embodiments. After the client has saved the desired material selections 226 for the surfaces 221 of the model, they can be synchronized with the backend system in real-time, as described above with reference to FIG. 18. Accordingly, all of the client's materials 226 selections for the respective surfaces 221 are now displayed in the GUI screen of the design software program 101 (e.g., Revit), as shown in FIG. 19. In this manner, the materials of the elements selected by the client will change in the designer side GUI screen of the designer side plug-in 100. For example, FIGS. 19A and 19B show the client's materials 126 selections in the first 3D camera view 103*a* and the second 3D camera view 103*b*, respectively.

Figure 19C:
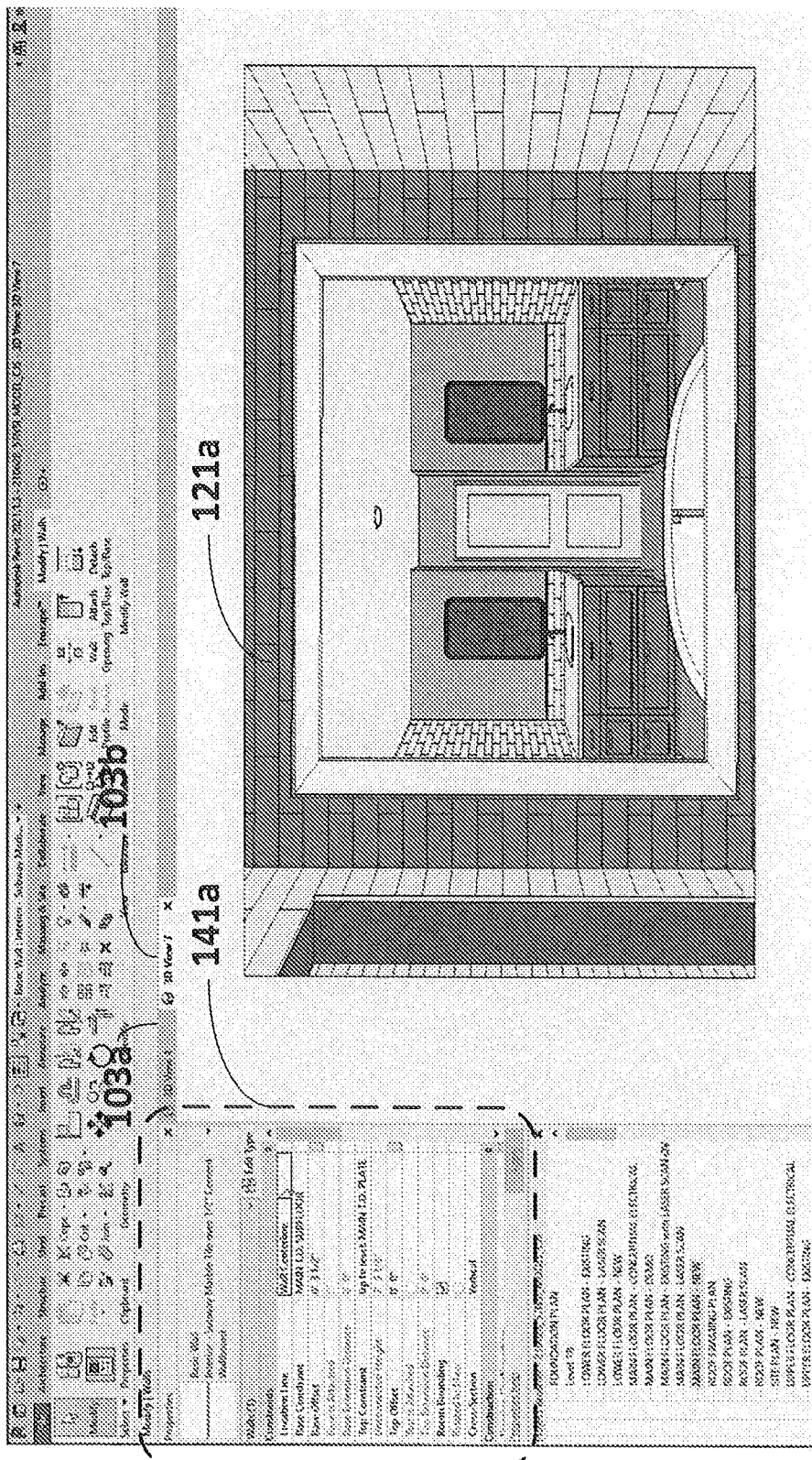
FIG. 19C shows an example designer side GUI screen of the designer side plug-in of the smart render design tool for viewing identity data associated with the desired materials selected by the client for the selected surfaces, according to some example embodiments.

FIG. 19C shows an example GUI screen of the design software program updated by the designer side plug-in of the smart render design tool for viewing identity data associated with the desired materials selected by the client for the selected surfaces, according to some example embodiments. Referring to FIG. 19C, the designer can select a surface 121, such as surface 121*a*, in the synchronized model, and view various properties 141*a* associated with that surface. Various information 141*a* (e.g., materials, quantities, locations, price/cost, perimeter, volume, area, etc.) can be automatically updated based on the process of the synchronization function 140 provided by the designer side plug-in 100.

Figure 19D:
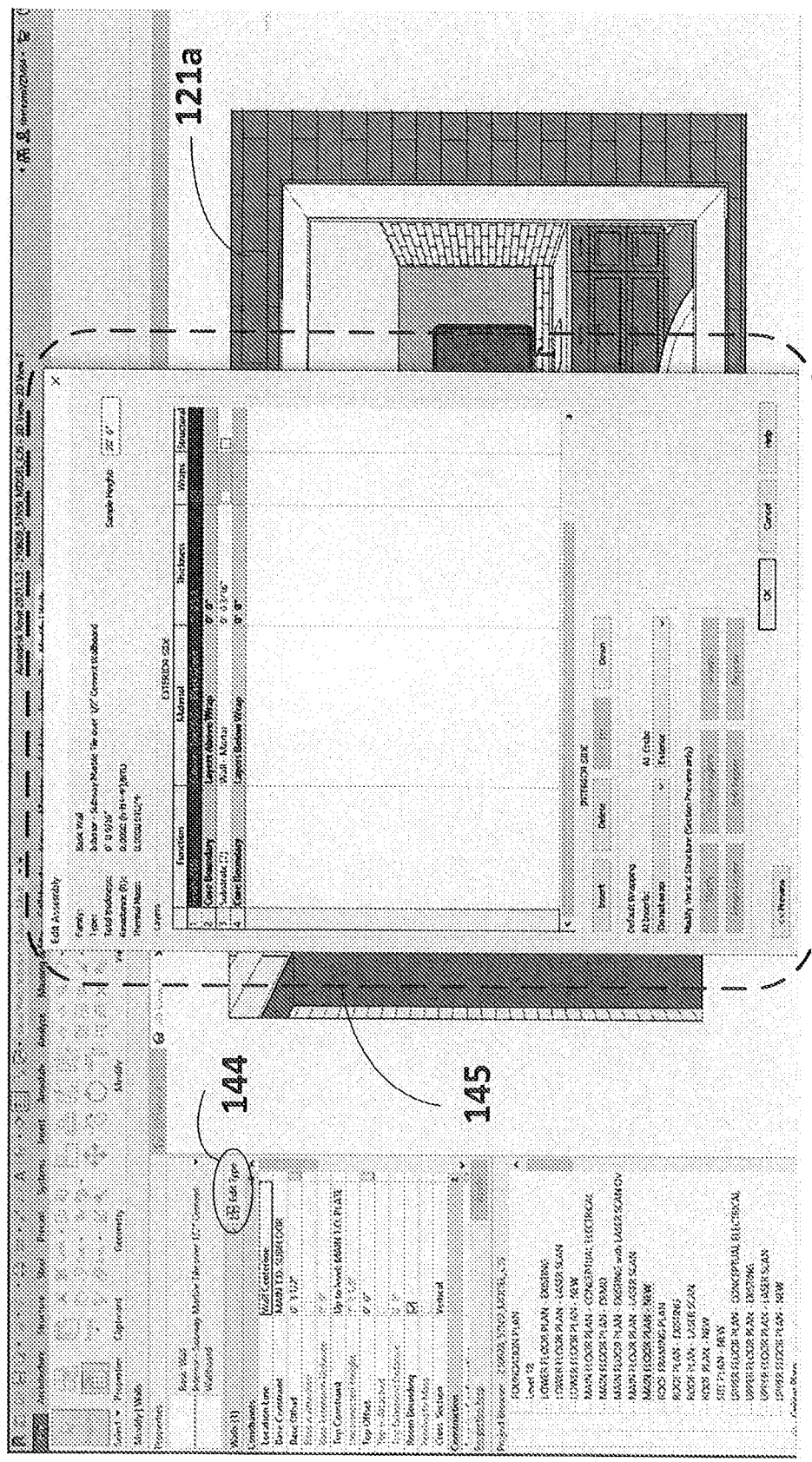
FIG. 19D shows an "Edit Type" button of the example GUI screen of the design software program.

FIG. 19D shows an "Edit Type" button of the GUI screen of the design software program. The designer can click on an "Edit Type" button 144 in the properties 141*a*, which will cause an "Edit Assembly" pop-up window 145 to be displayed. This is a native function of the design software program 101 that is automatically updated based on the process of the synchronization function 140 provided by the designer side plug-in 100.

Figure 19E:
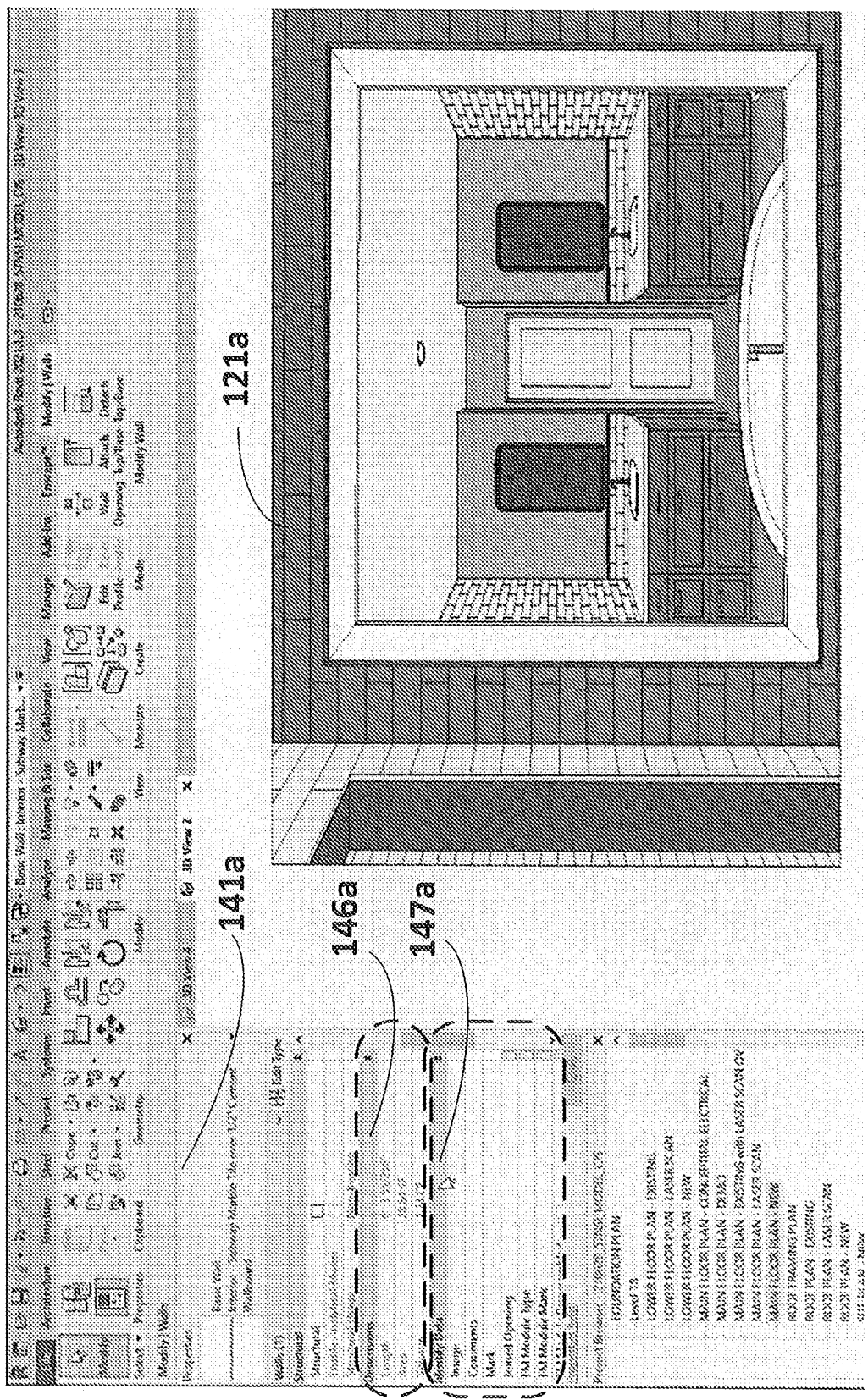
FIG. 19E shows an example GUI screen of the design software program for viewing dimensions and/or costs associated with the desired materials selections of the client.

FIG. 19E shows an example GUI screen of the design software program for viewing dimensions and/or costs associated with the desired materials selections of the client, according to some example embodiments. Referring to FIG. 19E, the designer side plug-in 100 can also display various other information to the designer, such as calculated dimensions 146a (e.g., area in sq. ft.), identity data 147a, costs 148a (not shown in FIG. 19E), etc. of materials that were chosen by the client. Native identity data properties can be automatically updated based on the process of the synchronization function 140 provided by the designer side plug-in 100. Thus, the smart render design tool documents dimensions, identity data, and/or cost consequences of various different combinations of materials selections made by the client.

Referring again to FIGS. 14 and 17C, the designer may also access the client's model and saved materials selections via the client side web-based portal 200 to view a list of materials selected by the client and corresponding quantities and/or pricing. For example, the designer may login using the client's id/key as shown in FIG. 14 to view the shopping list 206a that is generated and displayed in response to operation of the shopping cart button 206 of FIG. 17C. The designer can then quickly and easily identify a list of surfaces, materials for each surface, costs (per unit, itemized, and/or totals), number of items, etc.) to improve the speed and accuracy of the materials ordering process for a given building design project by using the smart render design tool described herein.

Figure 20:
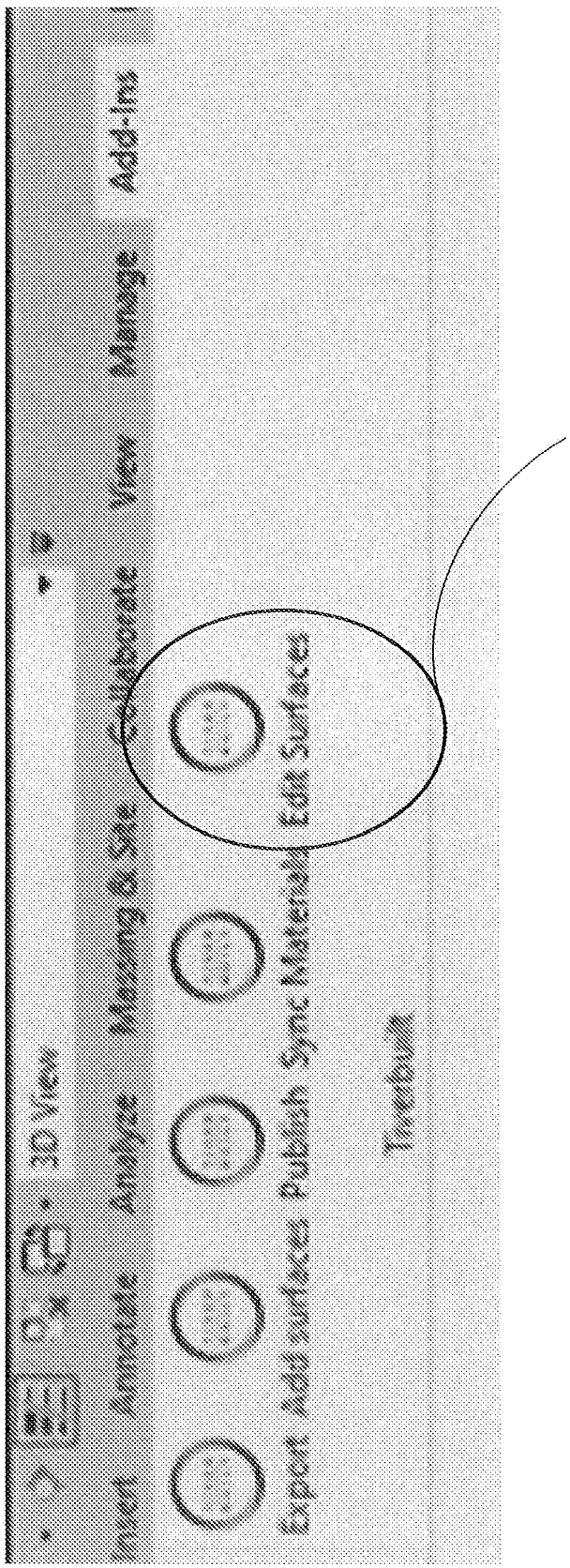
FIG. 20 shows an "Edit Surfaces" button of the designer side GUI screen of the designer side plug-in of the smart render design tool for modifying selected surface(s) and/or corresponding materials, according to some example embodiments.

FIG. 20 shows an "Edit Surfaces" button of the designer side GUI screen of the designer side plug-in of the smart render design tool for modifying selected surface(s) and/or corresponding materials, according to some example embodiments. Referring to FIG. 20, in order to modify surfaces 121 and/or materials 126 later (e.g., sometime after initial selections are made and saved) if needed, the designer can click on the "Edit surfaces" button 150. The designer can then repeat the processes described above with reference to FIGS. 7-11 to add/remove new surfaces 121 and/or to modify existing surfaces 121 (e.g., floors, countertops, cabinets, etc.) and/or add/remove/modify corresponding materials 126 (e.g., tile, paint, stone, granite, marble, paint colors, patterns, designs, textures, etc.). For example, this feature could be useful if the client wants different options to choose from compared to the original selections provided by the designer, due to dynamic inventory updates (in or out of stock materials), budget changes (add/remove higher or lower end materials), better color or pattern coordination of available materials for certain surfaces with other materials selections made by the client for other surfaces, etc.

Next, example methods for using the smart render design tool from the designer side and the client side, respectively, will be described with reference to the flowcharts shown in FIGS. 21-22.

Figure 21:
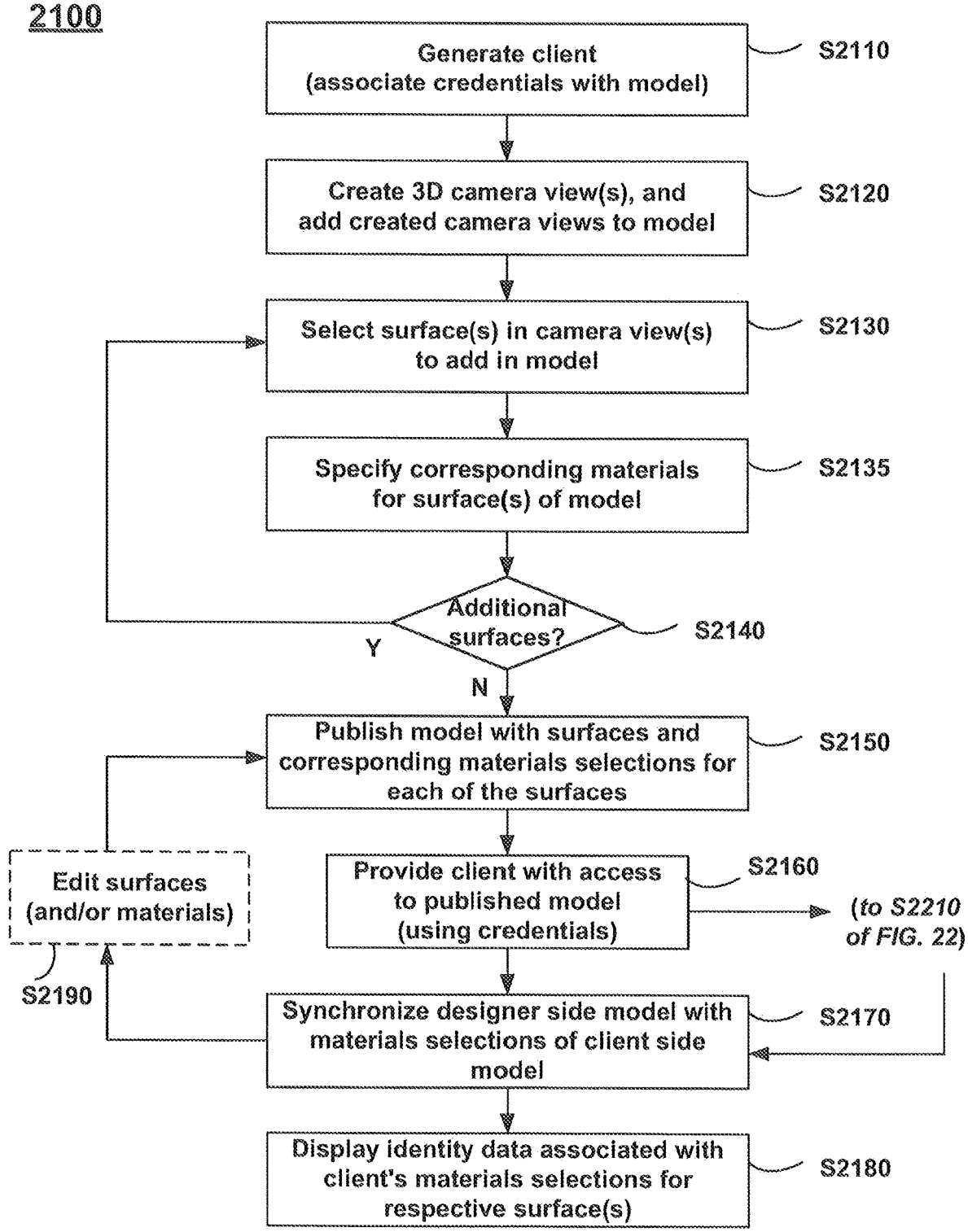
FIG. 21 shows a method for using the designer side plug-in of the smart render design tool via designer side GUI screen(s), according to some example embodiments.

FIG. 21 shows a method for using the designer side plug-in of the smart render design tool, according to some example embodiments. Referring to FIG. 21, an example method 2100 is performed by the designer using the designer side plug-in 100. Method 2100 begins by generating a client (e.g., a client side web-based portal 200), at step S2110. This step includes creating credentials (e.g., ID 112 and key/password 114) for the client to access the published model using the client side web-based portal 200, and associating the client credentials with the model for the client, as described above with reference to FIG. 3. At step S2120, the method 2100 includes creating 3D camera view(s) 103, and adding the created camera view(s) to the model, as described above with reference to FIGS. 4A-5C, respectively. At step S2130, the method 2100 includes selecting surface(s) 121 in the camera view(s) 103 to add to the model. At step S2135, the method includes selecting corresponding material(s) 126 for the selected surfaces 121 of the model. This process is described above with reference to FIGS. 6-11. At step S2140, it is determined whether there are any additional surface(s) 121 to add to the model with corresponding materials 126 selections to be made. If there are additional surface(s) 121 (and/or corresponding material(s) 126) to add to the model ("Yes" at step S2140), then the method 2100 can loop back and repeat step S2130 to select additional surface(s) 121 and step S2135 to select additional corresponding material(s) 126. If there are no further surface(s) 121 and/or corresponding material(s) 126 to add to the model ("No" at step S2140), then the method 2100 can proceed to step S2150. At step S2150, the method 2100 includes publishing the model with the selected surface(s) 121 and corresponding material(s) 126 selections for the selected surface(s) 121, as described above with reference to FIG. 12. Once the client credentials 112, 114 are created and the surface(s) 121 and corresponding material(s) 126 selections are added to the model, and the model is published, the method 2100 includes providing the client with access to the published model (e.g., by entering their client credentials in the client side web-based portal 200), at step S2160. This is described above with reference to FIGS. 13-14.

Figure 22:
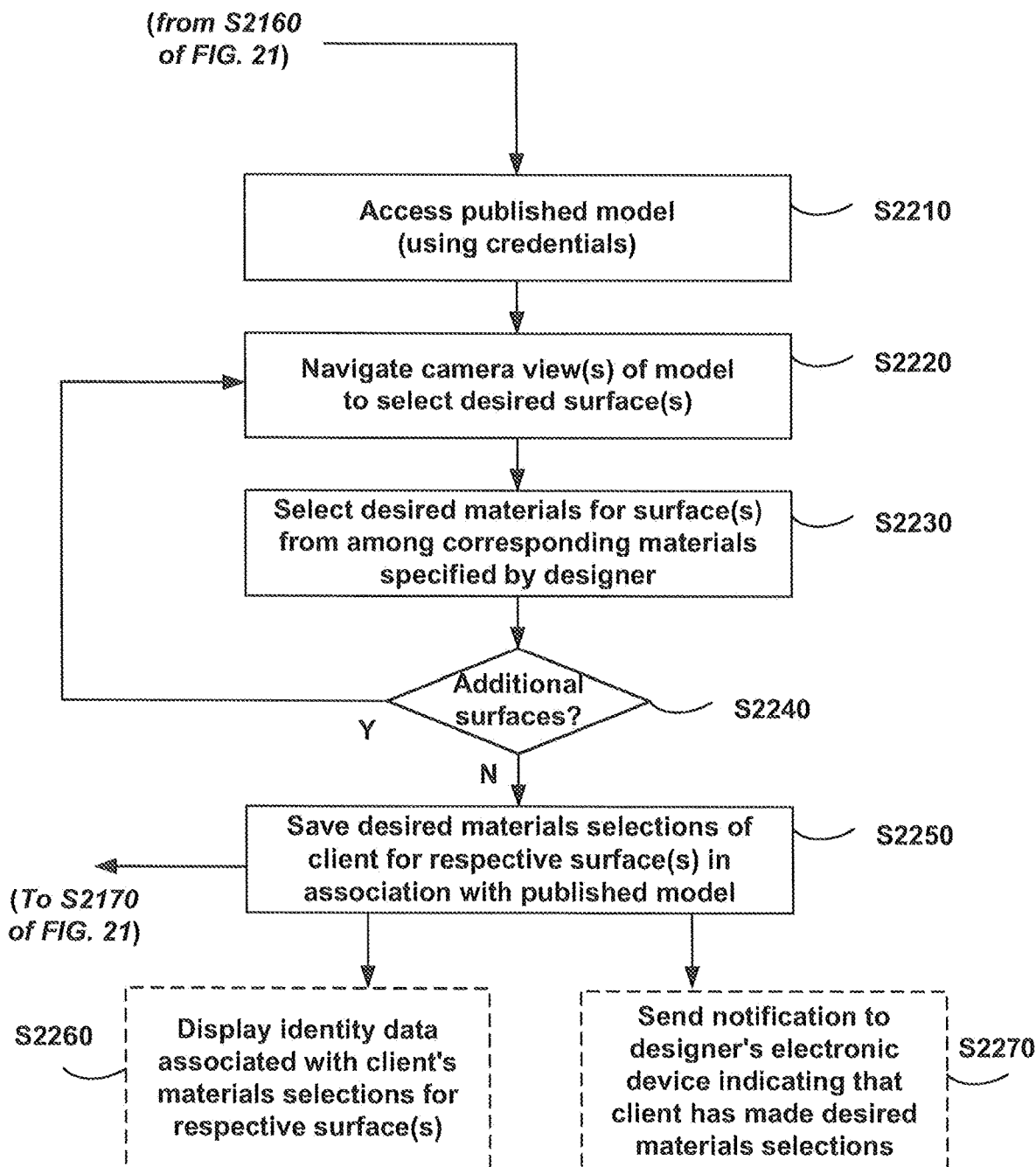
FIG. 22 shows a method for using the client side web-based portal of the smart render design tool via client side GUI screen(s), according to some example embodiments.

Next, referring to FIG. 22, an example method 2200 is performed by the client using the client side web-based portal 200 as described above with reference to FIGS. 13-17, prior to performing the next step (S2170) of the method 2100. FIG. 22 shows a method for using the client side web-based portal of the smart render design tool, according to some example embodiments. Method 2200 begins by accessing the published model (e.g., by entering their client credentials 112, 114 in the client side web-based portal 200), at step S2210, as described above with reference to FIGS. 13-14. After the client views the instructions screens 201 in the GUI of the client side web-based portal 200 (refer to FIG. 15), the method 2200 includes navigating the camera view(s) of the model to select desired surface(s) 221, at step S2220, and selecting desired materials 226 for selected surfaces 221 from among the corresponding materials 126 selected by the designer for the respective surfaces 121 (using the designer side plug-in 100), at step S2230. This is described above with reference to FIGS. 16A-16I.

At step S2240, it is determined whether there are any additional surface(s) 221 to select in the published model with corresponding materials 226 selections to be made. If there are additional surface(s) 221 (and/or corresponding material(s) 226) to select in connection with the published model ("Yes" at step S2240), then the method 2300 can loop back and repeat step S2220 to select additional surface(s) 221 and step S2230 to select additional corresponding material(s) 226. If there are no further surface(s) 221 and/or corresponding material(s) 226 to select in the published model ("No" at step S2240), then the method 2200 can proceed to step S2250. At step S2250, the method 2200 includes saving desired materials selections of the client for the respective surfaces in association with the published model, as described above with reference to FIG. 17.

At this point, the process may revert back to S2170 of FIG. 21, to synchronize the client's materials selections 226 for the respective surfaces 221 shown in the client side web-based portal 200 with the surfaces 121 and materials 126 shown in the designer side plug-in 100.

However, in some example embodiments, the method 2200 may also include displaying various identity data, quantity data and/or price data associated with the client's materials selections for the respective surfaces, at step S2260. For example, the client may click on the "Shopping Cart" button 206 at any point in the process to view a shopping list 206a associated with their current materials 226 selections for the surfaces 221 of the published model, as described above with reference to FIG. 17C.

Optionally, method 2200 may also include sending a notification (e.g., pop-up, push, email, SMS/text, etc.) to the designer's electronic device indicating that the client has made and saved their desired materials selections 226 for the selected surfaces 221, at step S2270.

Referring again to method 2100 of FIG. 21, after the client has made and saved their desired materials 226 selections for the selected surfaces 221 at step S2250 when performing method 2200 of FIG. 22 (and optionally once the designer has received the notification regarding the client's saved materials 226 selections for the surfaces 221), method 2100 then includes synchronizing the surfaces 121 and corresponding materials 126 shown in the designer side model with the surfaces 221 and corresponding materials 226 selections that are saved in connection with the client side model, at step S2170. This is described above with reference to FIGS. 18-19.

At step S2180, once the surfaces 121 and materials 126 of the designer side model are synchronized with the surfaces 221 and materials 226 of the client side model, the method may include displaying various identity data associated with the client's materials selections for the respective surfaces. In some example embodiments, this may include displaying dimensions (e.g., area in sq. ft.) of surfaces and costs of corresponding materials, referring to FIGS. 19C and 19E. In some other example embodiments, the designer can also access the client's model via the client side web-based portal 200 to generate and view a shopping list 206a for the client by clicking on the shopping cart button 206 as shown in FIG. 17C. Optionally, in step S2190, the method 2100 may further include editing selected surfaces and/or materials options for the client, as described above with reference to FIG. 20.

Thus, the smart render design tool according to example embodiments described above improves the process of clients choosing materials for their building designs, and builders/designers being able to see the client's selections on their end (e.g., to quickly and accurately update orders). The system and methods described above go beyond simple superficial updates (e.g., changing a finish or color) by allowing designers and clients to swap out different materials with a model-based update for each material change. By selecting the options that are available to the customer in a quantifiable manner (e.g., considering product availability, varied budgets for each client, different personal tastes of each client, etc.), the smart render design tool provides an automated way to assist designers and clients to come to decisions on customized design choices in near real-time. The smart render design tool can help avoid or reduce owner indecision and owner-caused delays, and decrease errors in orders (e.g., wrong materials ids and/or needed quantities, omissions, transcription errors, etc.). There is no need for users to repeatedly click through a large catalog of individual surfaces and materials (selections can be made with just one or a few clicks). In addition to reducing the overall effort and time to complete the building design process, the smart render design tool can also provide a digital footprint that manufacturers can use to plan their production timing and quantities and provide lead times for material availability. The system and methods described above to prepare separate schedules for each individual surface and/or a comprehensive scheduling for all surfaces at once.

An exemplary computing environment can be used to implement any of the processing described above. The computing environment may include one or more computers (such as designer's electronic device and client's electronic device), input/output devices, memories, processors (e.g., CPUs, microprocessors), displays with graphical user interfaces (GUIs), and the like, which allow the users to implement the present disclosure. Other peripheral devices (e.g., USB drives) may be connected to the computers to transfer information (e.g., files, documents, images, text, data, instructions, messages, etc.) to and from the computers. The system memories may include various non-transitory computer-readable media including program modules, data structures, application programs, operating systems, and other data for the computers, as known in the relevant art. The computers may operate in a networked environment using logical connections with each of the system components described above. Known network interfaces provide communication paths between the computers and allows for the methods described above to be performed.

While the disclosure has been described with reference to example embodiments, it will be understood by those skilled in the art that various changes may be made and equivalents may be substituted for elements thereof to adapt to particular situations without departing from the scope of the disclosure. Therefore, it is intended that the disclosure not be limited to the particular embodiments disclosed herein, but that the disclosure will include all embodiments falling within the scope and spirit of the appended claims. Since many possible embodiments of the disclosure may be made without departing from the scope thereof, it is also to be understood that all matters herein set forth or shown in the accompanying drawings are to be interpreted as illustrative and not limiting.

What is claimed is:

1. A smart render design tool comprising:
   a designer side plug-in including computer-executable instructions configured to enable a designer computing device to:
      generate credentials for a client and associate the credentials with a model for the client,
      add one or more camera views to the model,
      select one or more surfaces in the one or more camera views to add in the model,
      specify two or more different material options for the client for each selected surface of the one or more surfaces of the model, and
      publish the model including the two or more different material options for each selected surface of the one or more surfaces of the model specified by the designer for the client; and
   a client side portal associated with the credentials and the model, including computer-executable instructions configured to enable a client computing device to:
      access the published model using the generated credentials,
      view the two or more different material options for each surface of the one or more surfaces of the published model specified by the designer computing device for the client,
      select a desired material, from among the two or more different material options specified by the designer computing device for the client, for each surface of the one or more surfaces of the published model,
      save the desired material selected by the client computing device for each surface of the one or more surfaces of the published model in a first memory for display by the designer computing device via the designer side plug-in, wherein the designer side plug-in is further configured to enable the designer computing device to:
synchronize the desired material selected and saved by the client computing device for each surface of the one or more surfaces in the model, and
display updated camera views including the desired material selected and saved by the client computing device and synchronized in the model by the designer computing device.

2. The smart render design tool of claim 1, wherein the one or more camera views are selected from among a plurality of created 3D camera views corresponding to different areas of the model.

3. The smart render design tool of claim 1, wherein:
the one or more surfaces are selected from among a plurality of surfaces in the model including walls, floors, countertops, cabinets or combinations thereof, and
the one or more materials for each surface are selected from among a plurality of available materials including different paint colors, tile, stone, wood, laminate, finishes, textures, patterns or combinations thereof.

4. The smart render design tool of claim 1, wherein the client side portal is further configured to notify the designer computing device that the client computing device has saved the desired material selections via a pop-up notification in the designer side plug-in, an email message, a text (SMS) message or combinations thereof.

5. The smart render design tool of claim 1, wherein the designer side plug-in is further configured to:
display on the designer computing device identity data including updated calculated values for dimensions and costs associated with the desired material selections saved by the client computing device for the one or more surfaces of the model.

6. The smart render design tool of claim 5, wherein
the designer side plug-in is further configured to:
generate and display on the designer computing device a shopping list, including quantities, itemized prices, total prices or combinations thereof for the desired material selected by the client computing device for each surface of the one or more surfaces, based on the updated calculated values for the dimensions and costs associated with the desired material selected for each surface of the one or more selected surfaces of the published model.

7. The smart render design tool of claim 1, wherein the designer side plug-in is further configured to enable the designer computing device to:
edit the one or more surfaces of the model by selecting one or more new surfaces in the one or more camera views to add to the model, removing of one or more of the selected one or more surfaces in the model, or changing one or more of the specified two or more different material options for the selected one or more surfaces.

8. The smart render design tool of claim 1, wherein the designer side plug-in is implemented via a software add-in to an architectural design program that is stored in a second memory and executed by a processor of the designer computing device.

9. The smart render designer tool of claim 1, wherein the client side portal is implemented via a web-based program hosted on a website that is accessed by the client using a web browser on a computer or other electronic device of the client.

10. A method implemented via a smart render design tool, the method comprising:
generating credentials for a client and associating the credentials with a model for the client;
adding one or more camera views to the model;
selecting one or more surfaces in the one or more camera views to add in the model;
specifying two or more different material options for the client for each selected surface of the one or more surfaces of the model;
publishing the model including the two or more different material options for each selected surface of the one or more surfaces of the model specified by the designer for the client;
providing the client with access to the published model using the generated credentials;
enabling the client to select a desired material from among the two or more different material options specified by the designer for the client, for each surface of the one or more surfaces of the published model; and
enabling the client to save the desired material selected by the client for each surface of the one or more surfaces of the published model in a first memory for review by the designer.

11. The method of claim 10, wherein the one or more camera views are selected from among a plurality of created 3D camera views corresponding to different areas of the model.

12. The method of claim 10, wherein:
the one or more surfaces are selected from among a plurality of surfaces in the model including walls, floors, countertops, cabinets or combinations thereof, and
the one or more materials for each surface are selected from among a plurality of available materials including different paint colors, tile, stone, wood, laminate, finishes, textures, patterns or combinations thereof.

13. The method of claim 10, further comprising:
notifying the designer that the client has saved the desired material selections via a pop-up notification, an email message, a text (SMS) message or combinations thereof.

14. The method of claim 10, further comprising:
displaying identity data including updated calculated dimensions and costs associated with the desired material selections saved by the client for the one or more surfaces of the published model.

15. The method of claim 14, further comprising:
generating and displaying a shopping list, including quantities, itemized prices, total prices or combinations thereof for the desired material selected by the client for each surface of the one or more surfaces, based on the updated calculated values for the dimensions and costs associated with the desired material selected for each surface of the one or more selected surfaces of the published model.

16. The method of claim 10, further comprising:
editing the one or more surfaces of the model by selecting one or more new surfaces in the one or more camera views to add to the model, removing one or more of the selected one or more surfaces in the model, or changing one or more of the specified two or more different material options for the selected one or more surfaces.

17. The smart render design tool of claim 8, wherein the first memory and the second memory are included in at least one of the designer computing device, the client computing device, or a remote server.

18. The smart render design tool of claim 1, wherein each of the one or more camera views is a digitally generated 3D view of the model.

19. A non-transitory computer readable medium having thereon computer executable instructions for executing a method utilizing a processor, the method comprising:
generating credentials for a client and associating the credentials with a model for the client;
adding one or more camera views to the model;
selecting one or more surfaces in the one or more camera views to add in the model;
specifying two or more different material options for the client for each selected surface of the one or more surfaces of the model;
publishing the model including the two or more different material options for each selected surface of the one or more surfaces of the model specified by the designer for the client;
providing the client with access to the published model using the generated credentials;
enabling the client to select a desired material from among the two or more different material options specified by the designer for the client, for each surface of the one or more surfaces of the published model; and
enabling the client to save the desired material selected by the client for each surface of the one or more surfaces of the published model in a first memory for review by the designer.

20. The non-transitory computer readable medium in accordance with claim 19, wherein the one or more camera views are selected from among a plurality of created 3D camera views corresponding to different areas of the model.

21. The non-transitory computer readable medium in accordance with claim 19, wherein:
the one or more surfaces are selected from among a plurality of surfaces in the model including walls, floors, countertops, cabinets or combinations thereof, and
the one or more materials for each surface are selected from among a plurality of available materials including different paint colors, tile, stone, wood, laminate, finishes, textures, patterns or combinations thereof.

22. The non-transitory computer readable medium in accordance with claim 19, further comprising:
notifying the designer that the client has saved the desired material selections via a pop-up notification, an email message, a text (SMS) message or combinations thereof.

23. The non-transitory computer readable medium in accordance with claim 19, further comprising:
displaying identity data including updated calculated dimensions and costs associated with the desired material selections saved by the client for the one or more surfaces of the published model.

24. The non-transitory computer readable medium in accordance with claim 23, further comprising:
generating and displaying a shopping list, including quantities, itemized prices, total prices or combinations thereof for the desired material selected by the client for each surface of the one or more surfaces, based on the updated calculated values for the dimensions and costs associated with the desired material selected for each surface of the one or more selected surfaces of the published model.

25. The non-transitory computer readable medium in accordance with claim 19, further comprising:
editing the one or more surfaces of the model by selecting one or more new surfaces in the one or more camera views to add to the model, removing one or more of the selected one or more surfaces in the model, or changing one or more of the specified two or more different material options for the selected one or more surfaces.

\* \* \* \* \*